United States Patent [19]

Mussatt

[11] 4,214,284

[45] Jul. 22, 1980

[54] METHOD AND APPARATUS FOR CONTROLLING TAPE RECORDER

[75] Inventor: Thomas J. Mussatt, Riverton, Ill.

[73] Assignee: Sangamo Weston, Inc., Atlanta, Ga.

[21] Appl. No.: 897,136

[22] Filed: Apr. 17, 1978

[30] Foreign Application Priority Data

Apr. 18, 1977 [GB] United Kingdom ............... 16063/77

[51] Int. Cl.² ............................................. G11B 15/48
[52] U.S. Cl. .................................. 360/72.1; 360/74.1; 360/27
[58] Field of Search ....................... 360/72, 74, 27, 62, 360/105

[56] References Cited

U.S. PATENT DOCUMENTS

| | | | |
|---|---|---|---|
| 3,911,487 | 10/1975 | Ladriere | 346/74 |
| 3,950,782 | 4/1976 | Carey | 360/72 |
| 3,956,740 | 5/1976 | Jones | 360/72 |
| 3,988,778 | 10/1976 | Swenson | 360/72 |
| 3,996,671 | 12/1976 | Foster | 360/72 |
| 4,000,518 | 12/1976 | Stearns | 360/72 |
| 4,041,249 | 8/1977 | Matz | 346/74 |
| 4,054,924 | 10/1977 | Zimmerman | 360/74 |
| 4,054,930 | 10/1977 | Terada | 360/74 |
| 4,066,872 | 1/1978 | Karp | 360/72 |
| 4,089,027 | 5/1978 | Grigoletti | 360/72 |

*Primary Examiner*—John H. Wolff

*Attorney, Agent, or Firm*—Emrich, Root, Lee, Brown & Hill

[57] ABSTRACT

Control apparatus for a tape recorder includes a Central Processor Unit (CPU) and a Control Panel having data entry switches, mode selection switches, speed selection switches, a multiposition function select switch and other controls and a display, all of which communicate with the CPU. The system enables the operator to enter commands to be executed by the CPU in controlling the tape transport at predetermined footage locations on the tape (such as Beginning of Data or End of Data) or at a predetermined value of parameters, such as tape pack diameters of the reel being emptied or filled (Beginning of Tape or End of Tape). The operator may enter data to set or change such locations or other parameter; and he may change commands in the CPU via the data entry switches. The operator may retrieve data or command signals from the CPU and view them on a display. A footage indicator is stored and continually updated in the CPU, and it may be changed to any desired footage setting by the operator. A wide range of operating speeds may be selected in the various modes of operation. Actual operating speeds during start-up and reversals are under program control until the speed set by the operator is reached. Under control of the CPU and at the direction of the operator, the system may thus be programmed to execute any one of a number of commands at predetermined but settable footage locations or tape pack dimensions.

39 Claims, 60 Drawing Figures

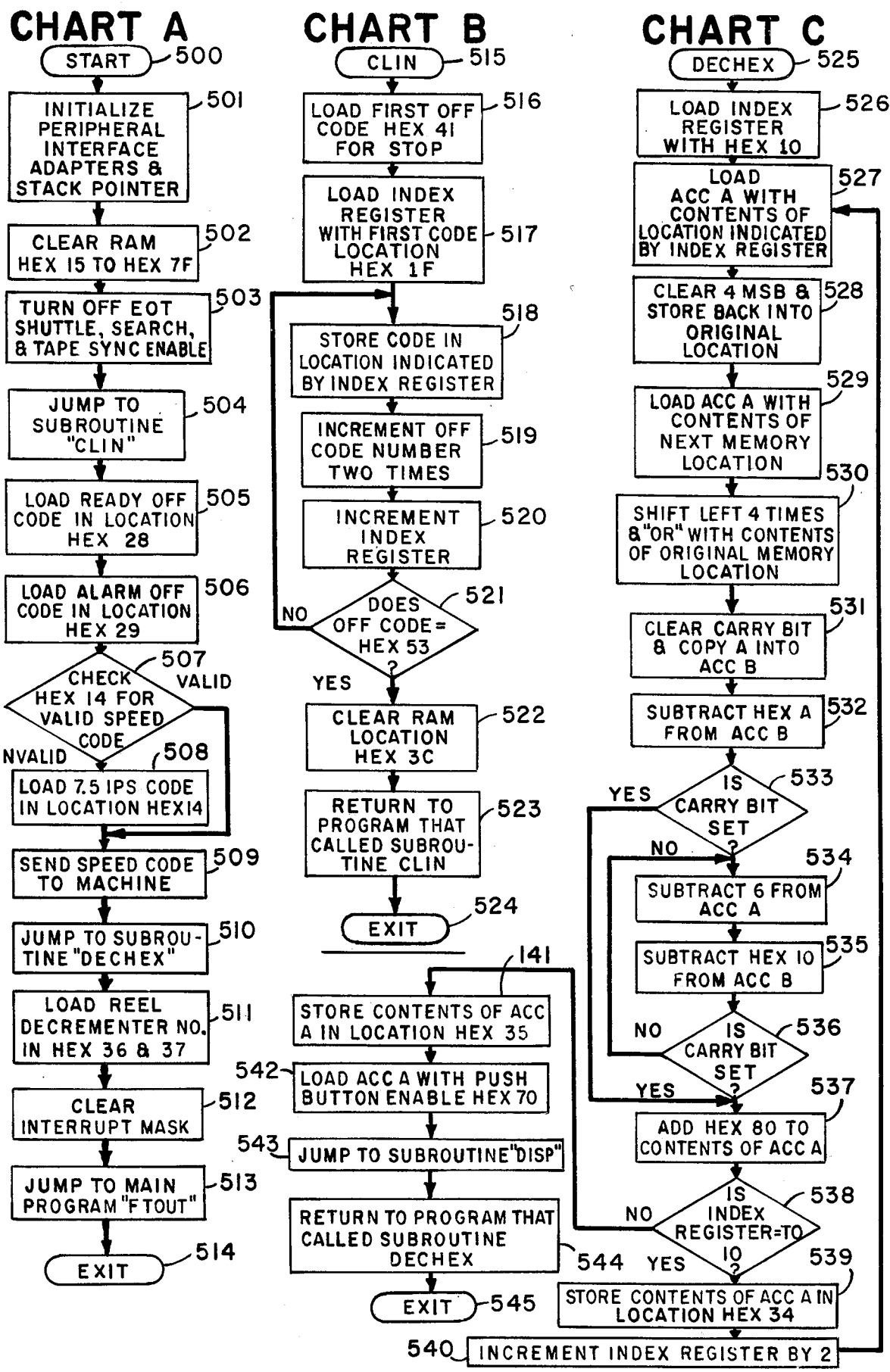

CHART D
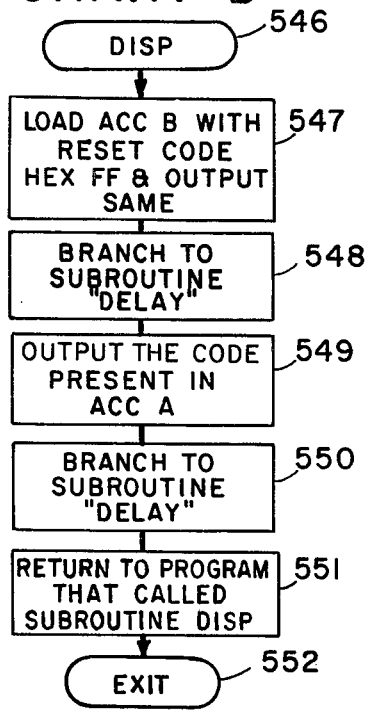
CHART E
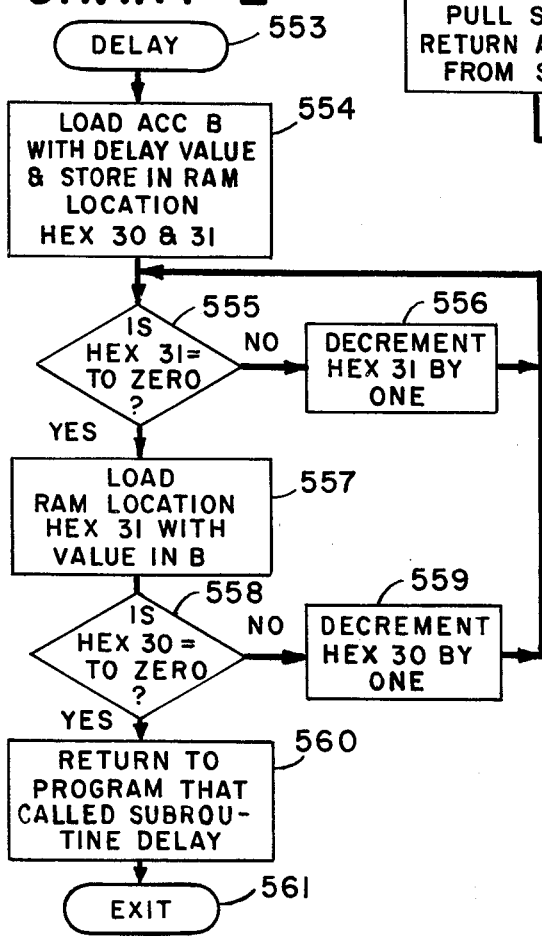
CHART H
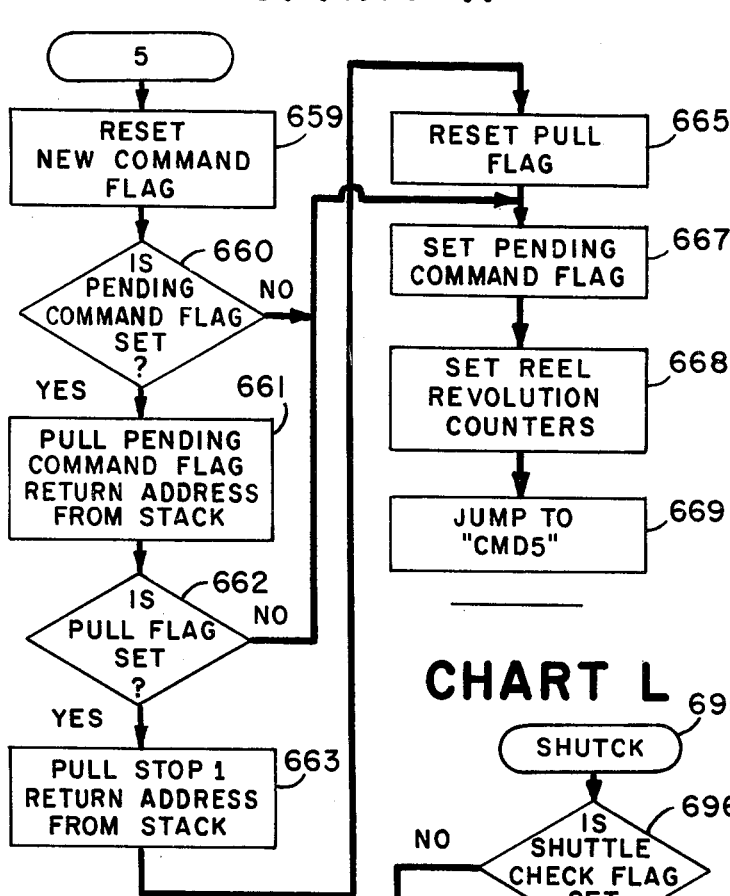
CHART L
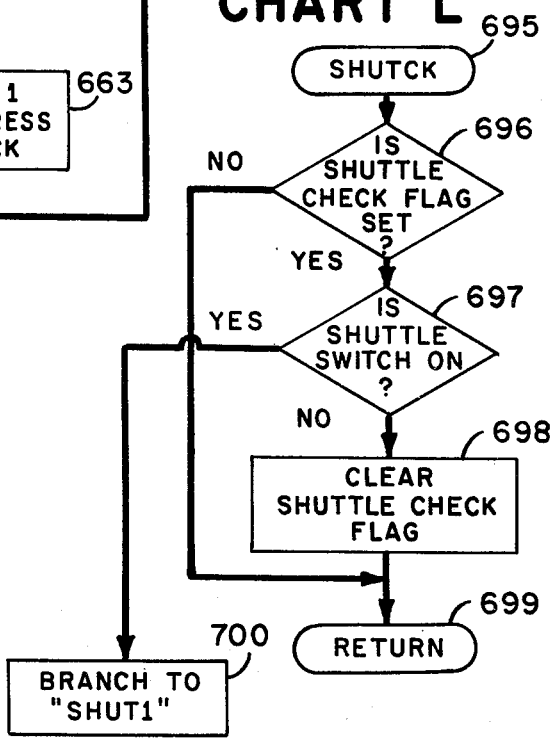

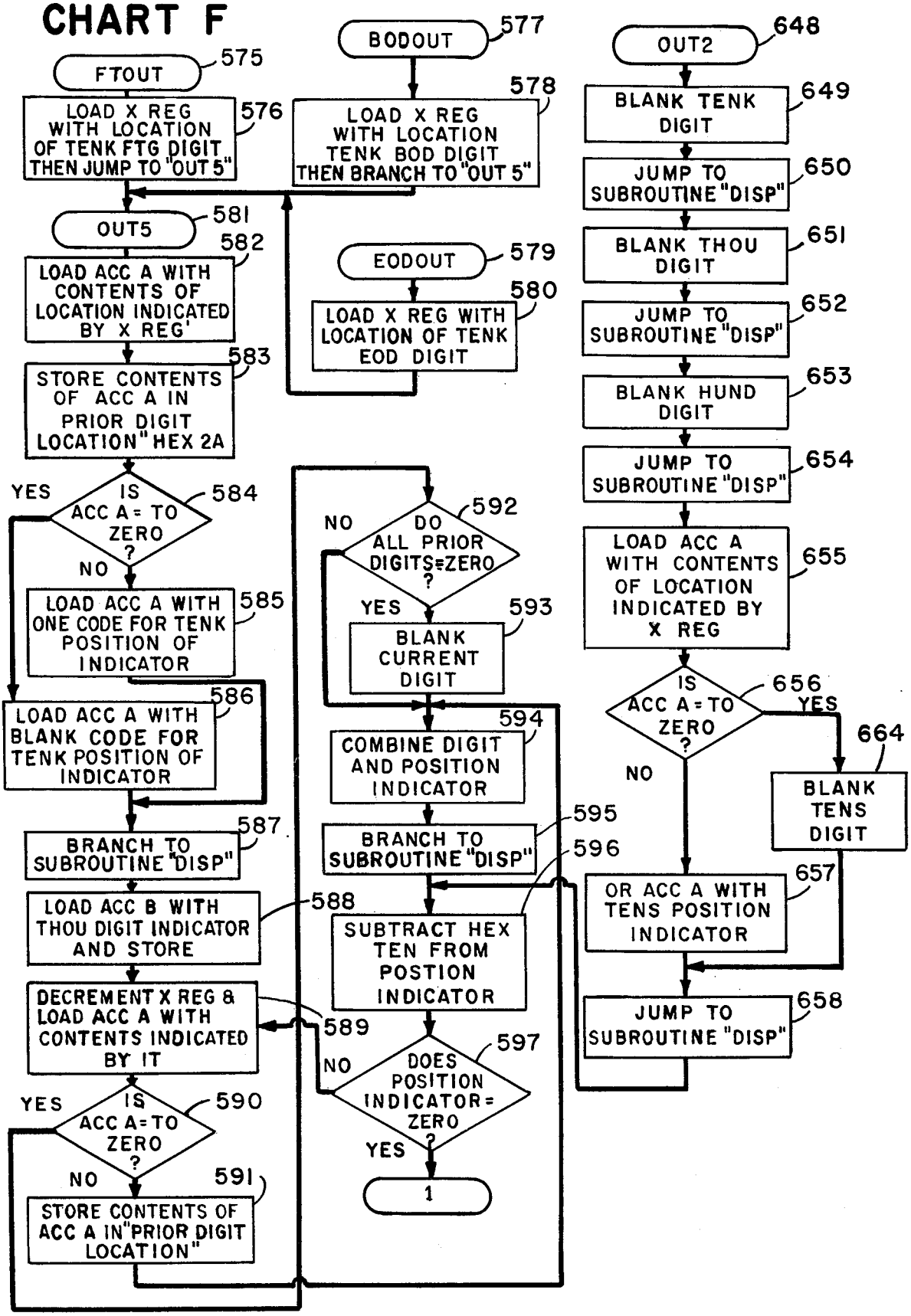

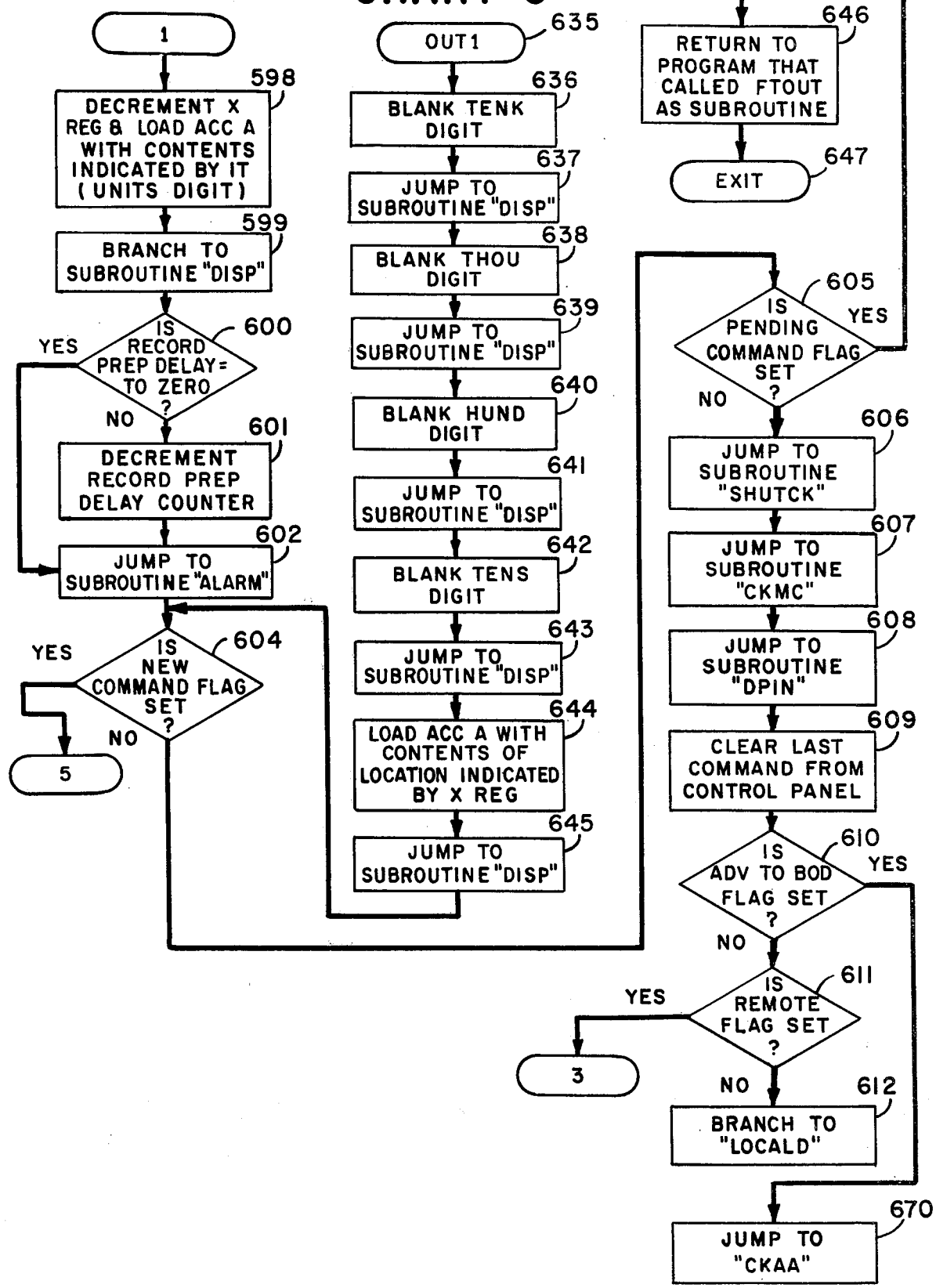

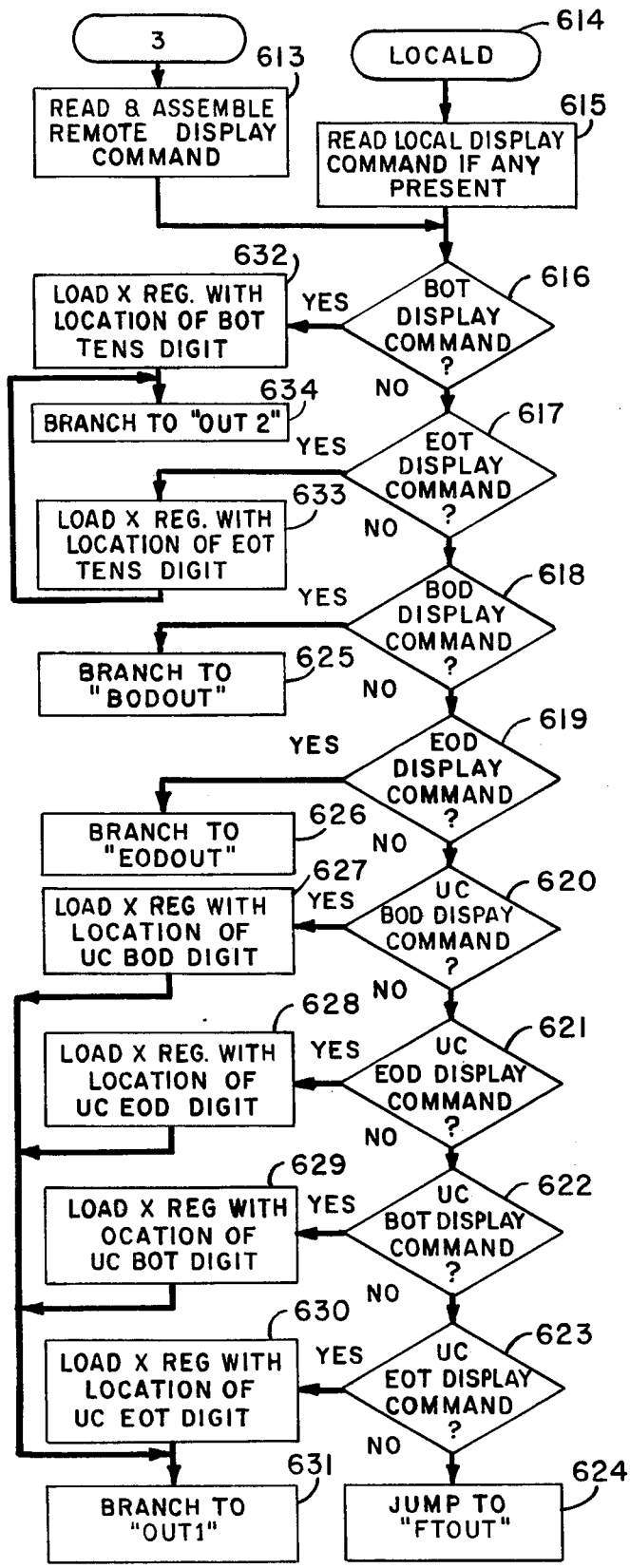
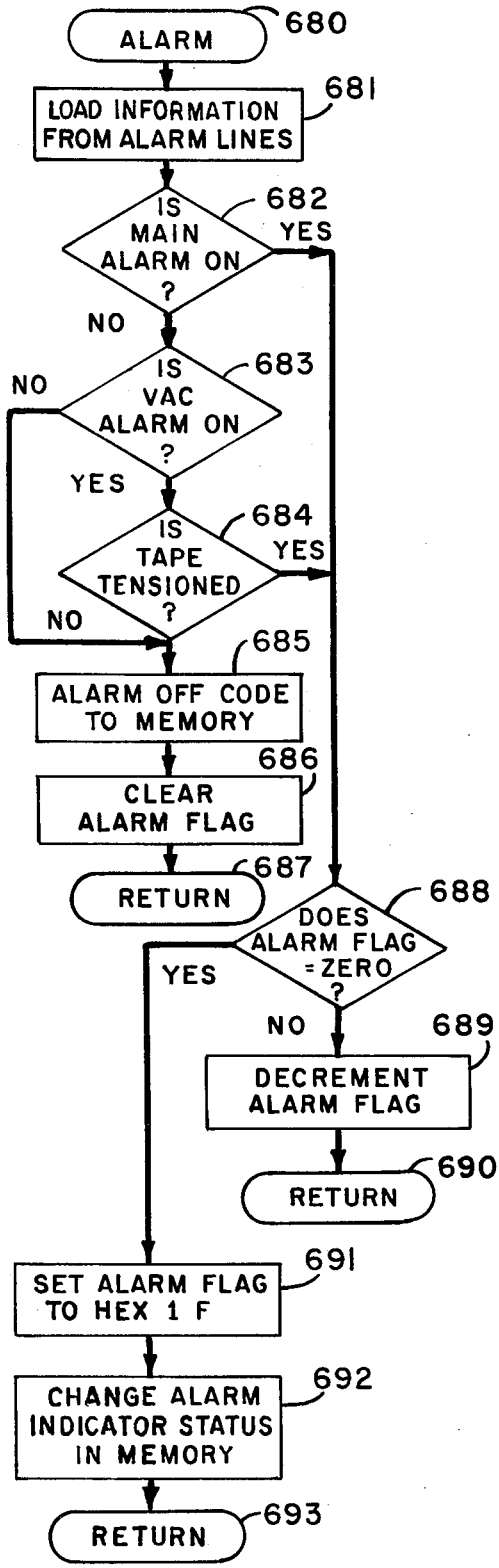

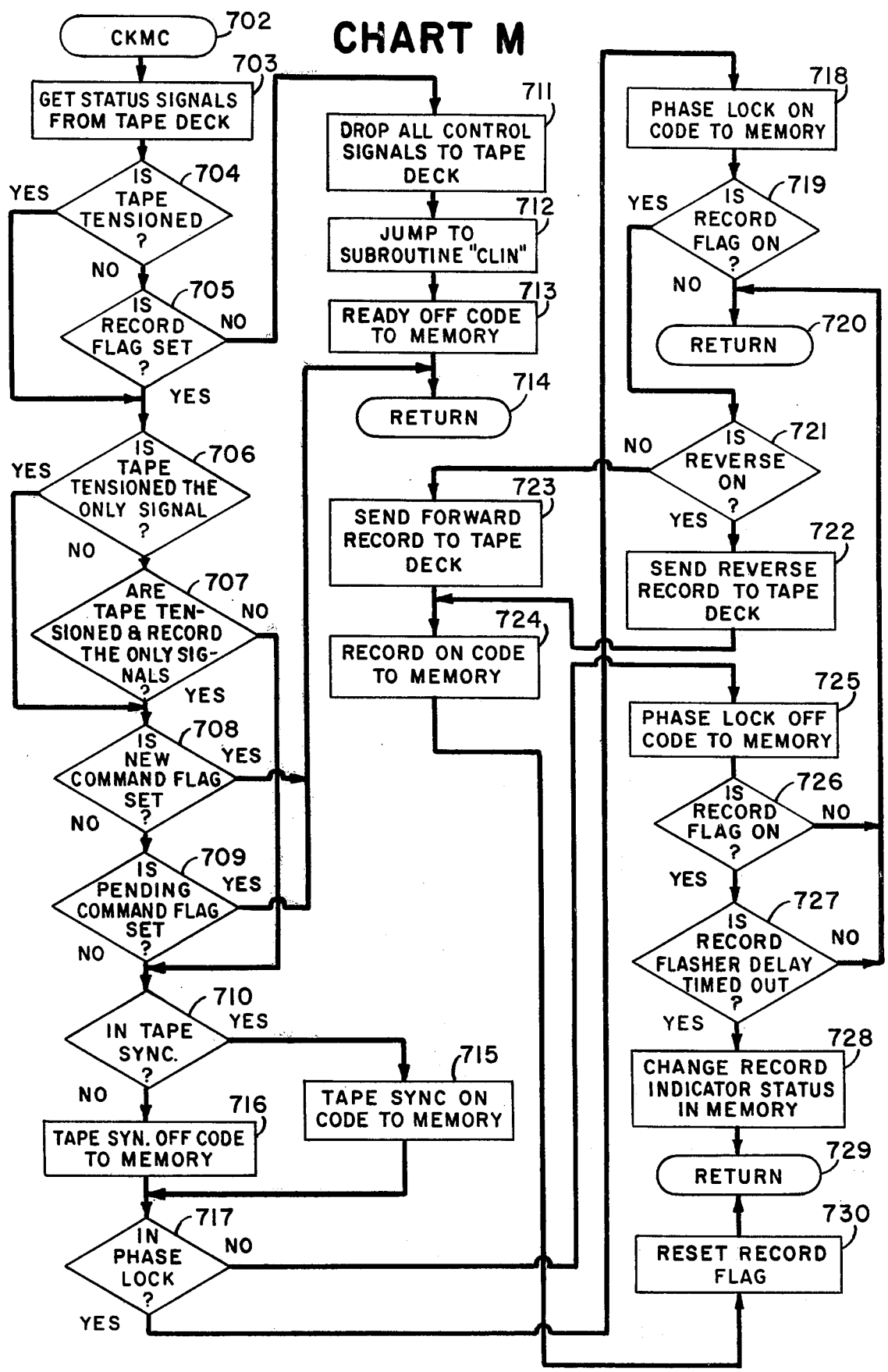

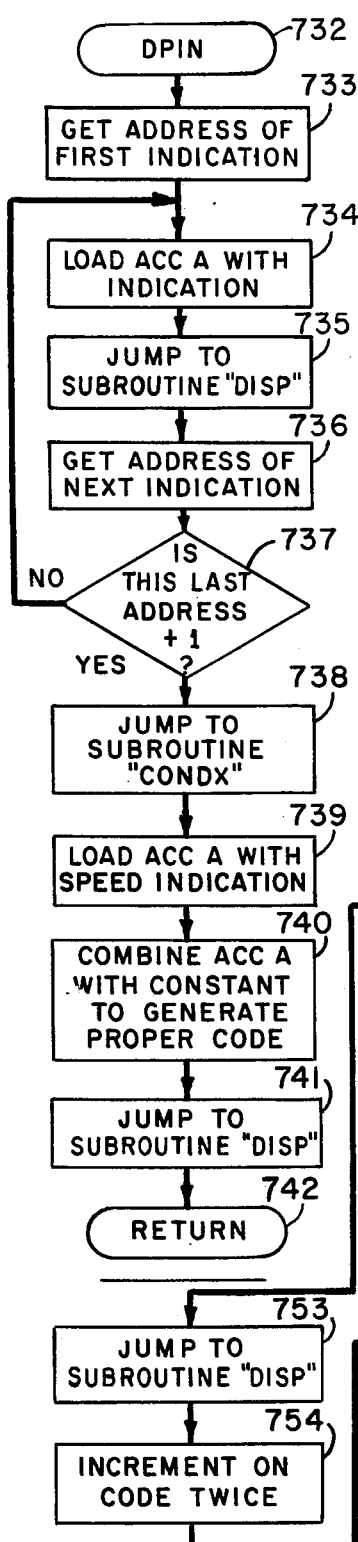
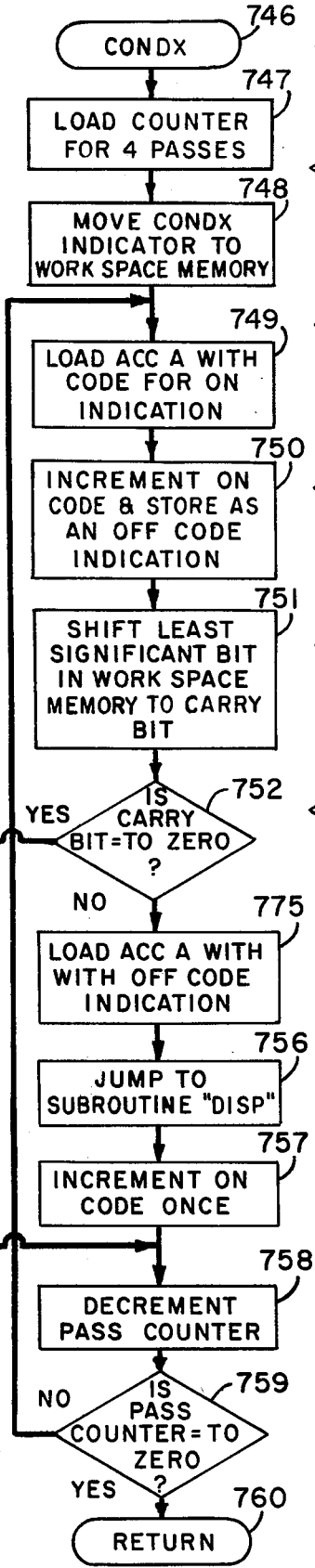
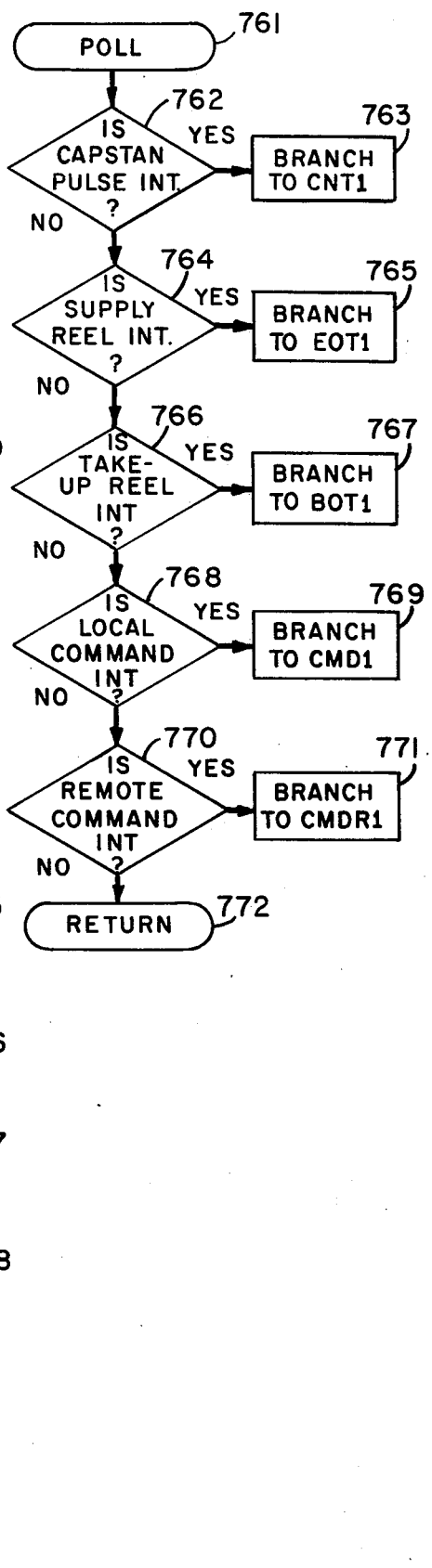

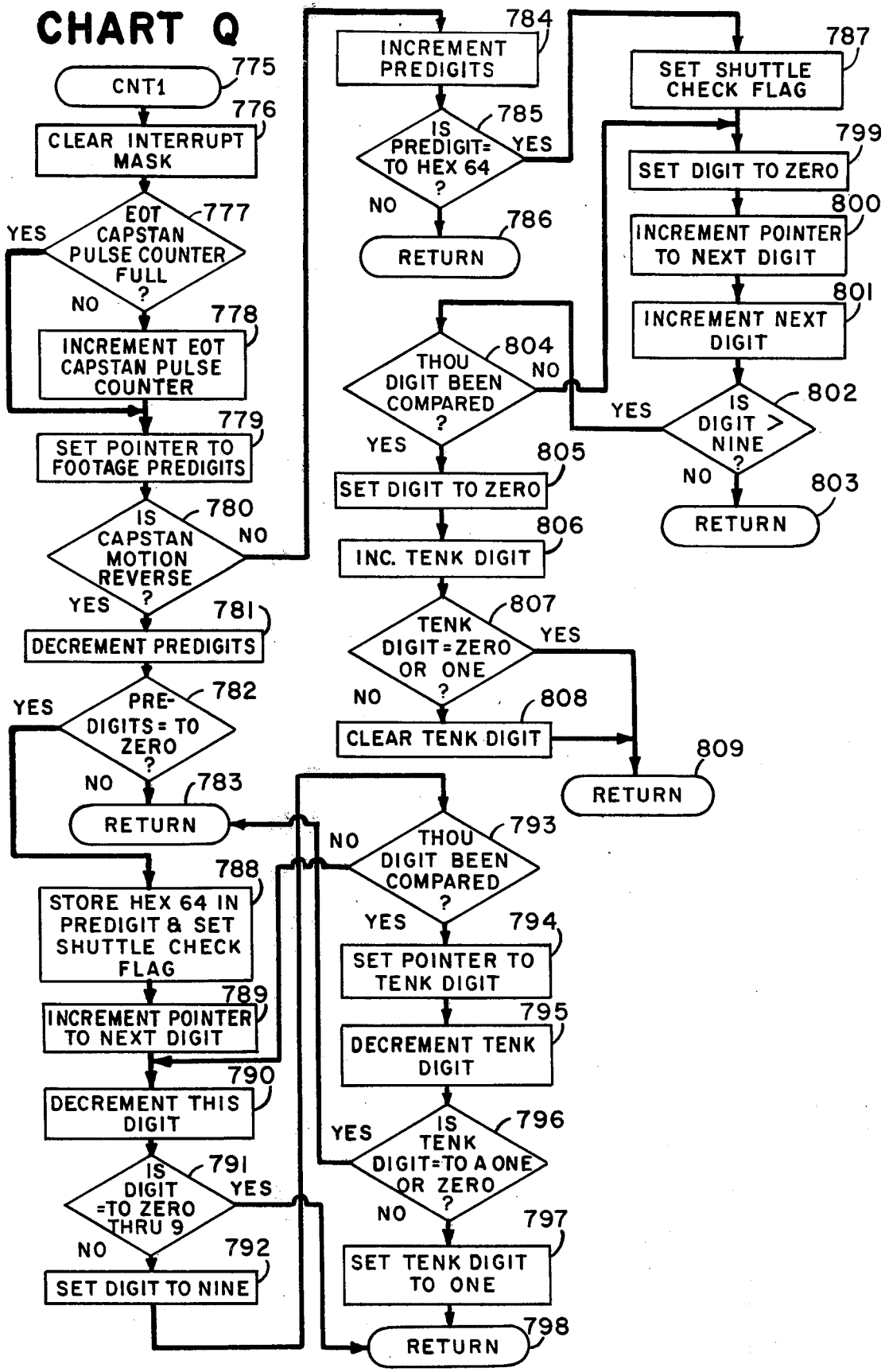

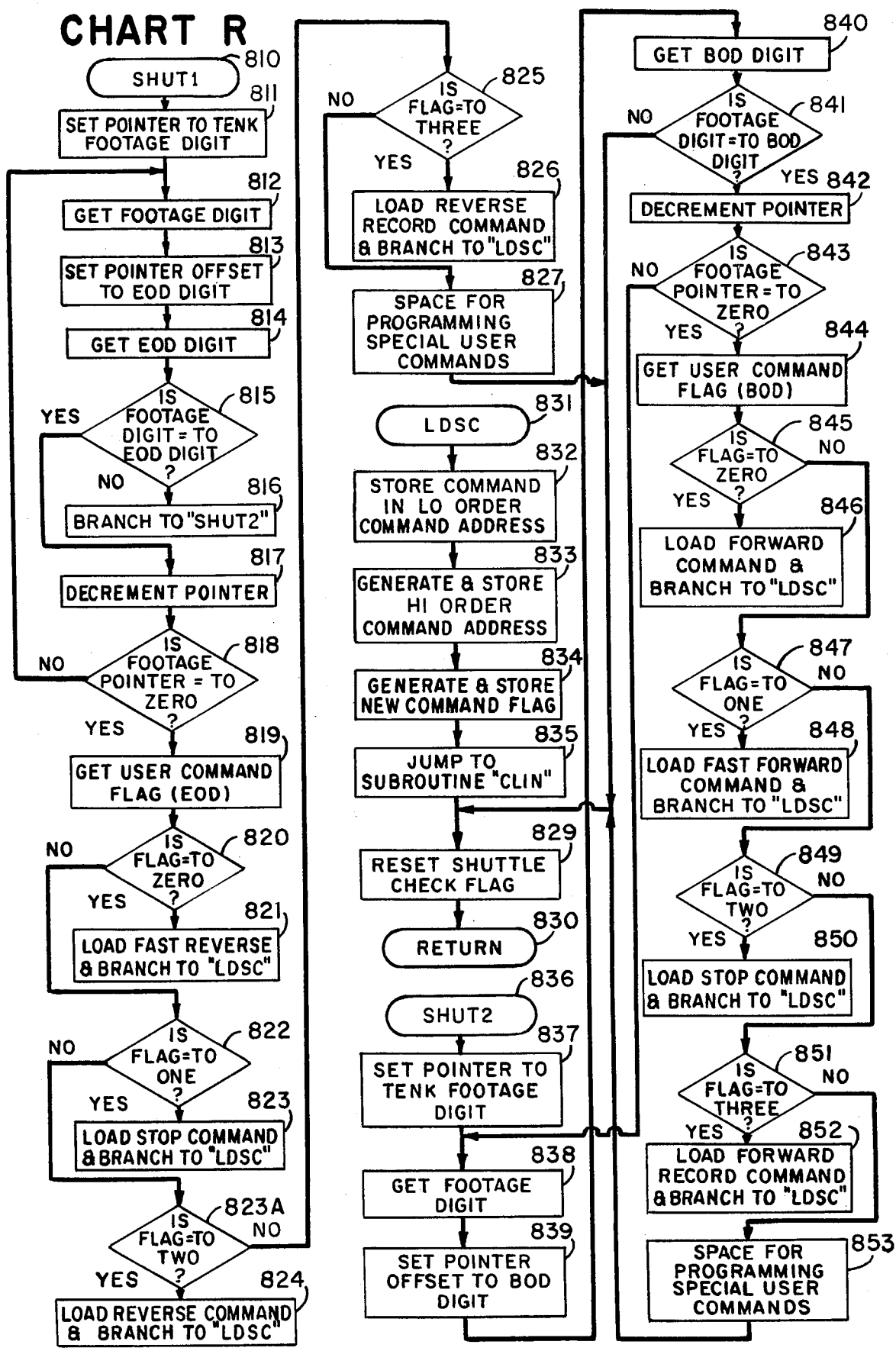

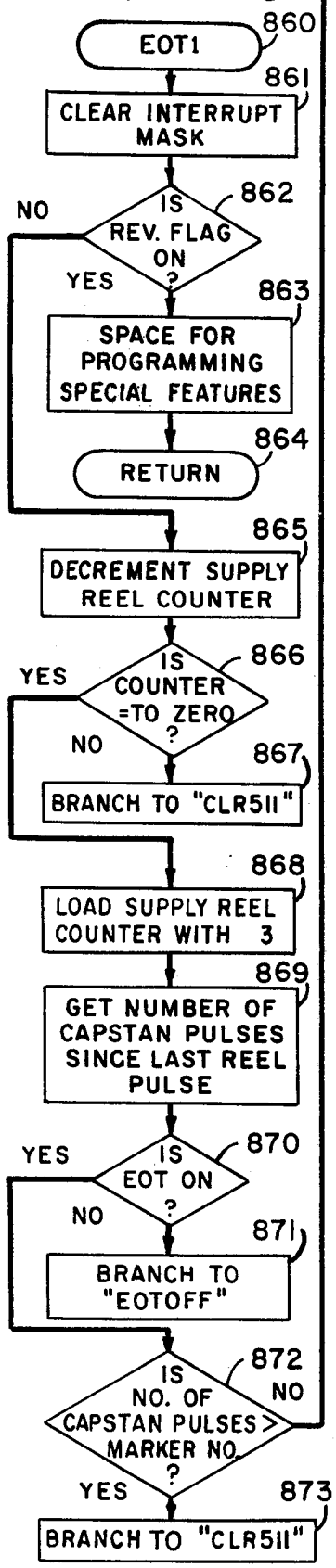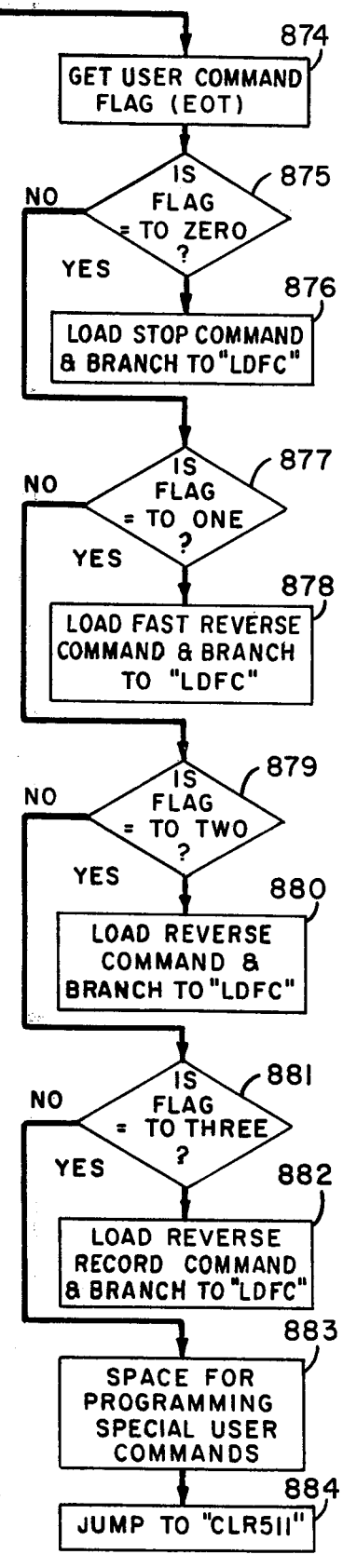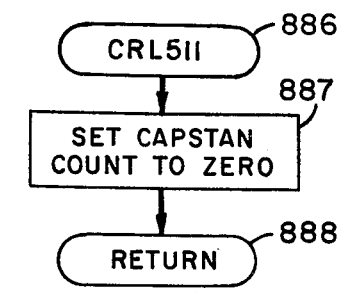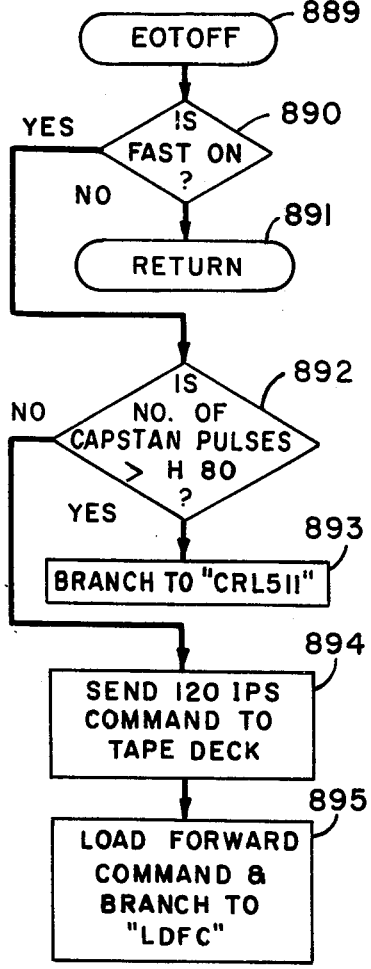

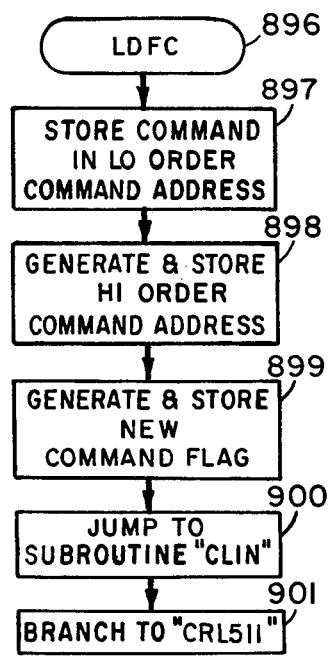
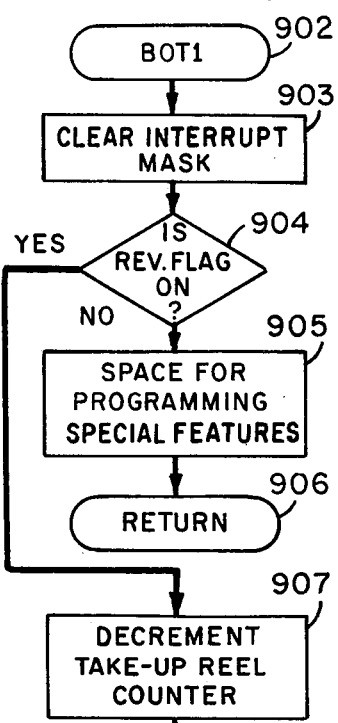
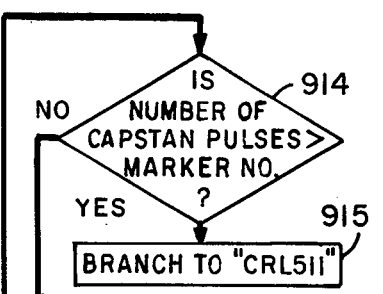
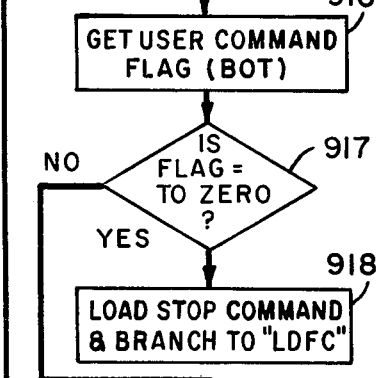
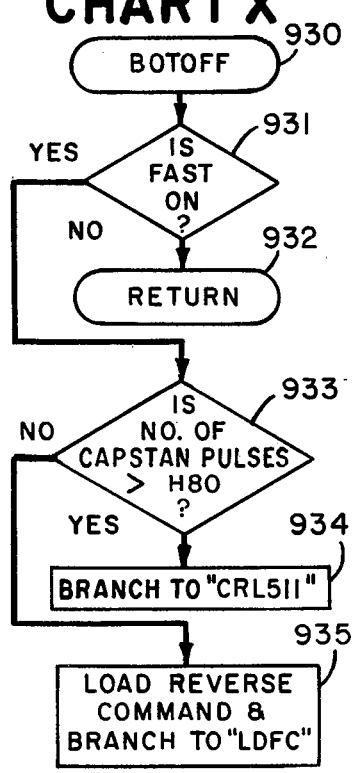
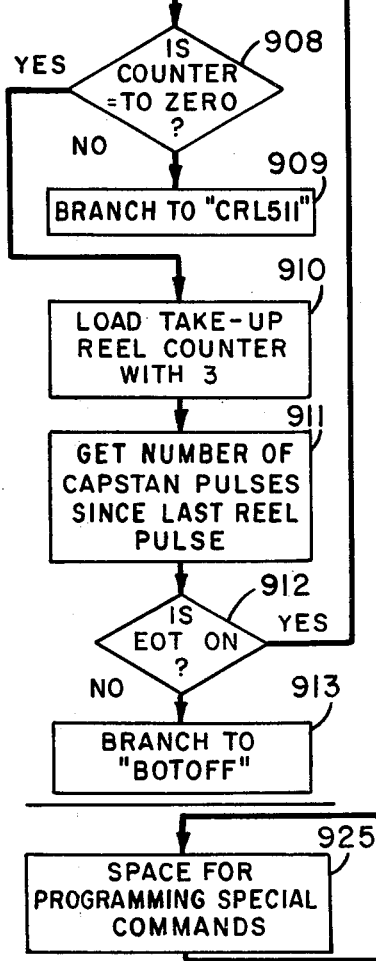

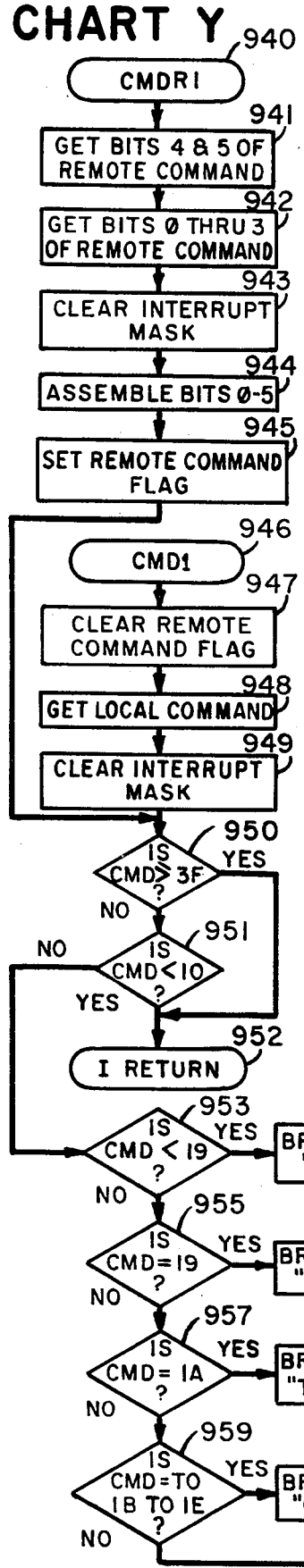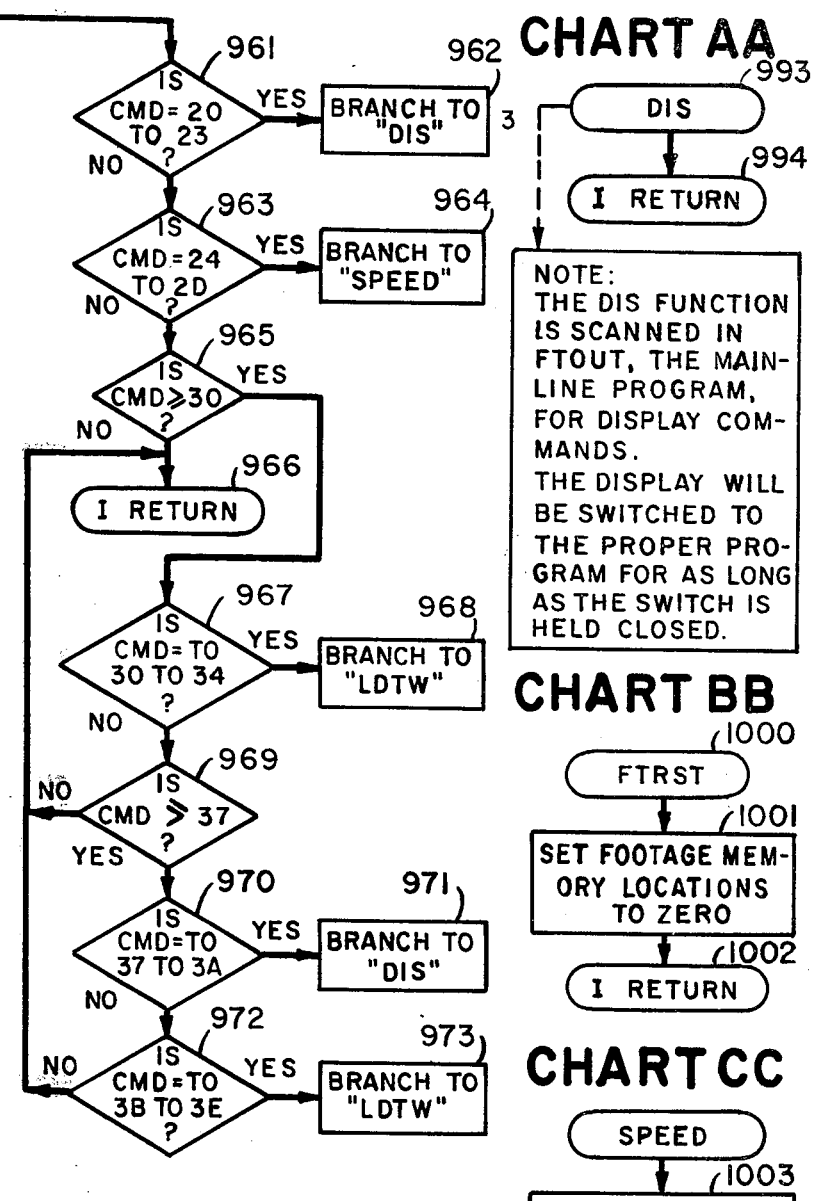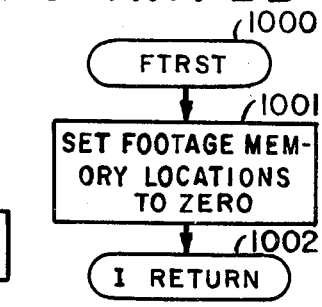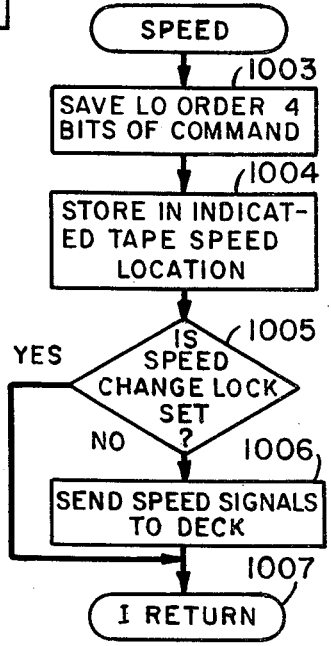

CHART Z
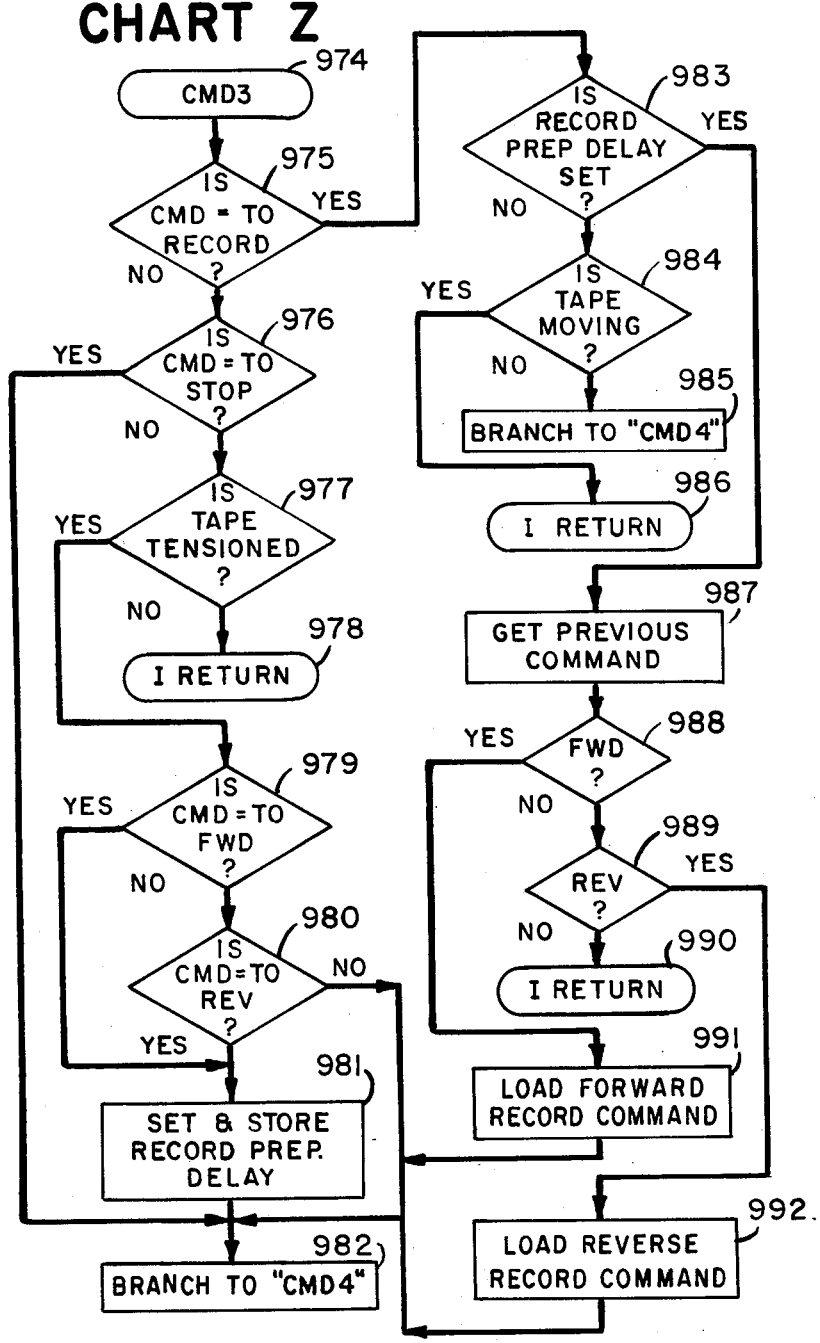
CHART EE
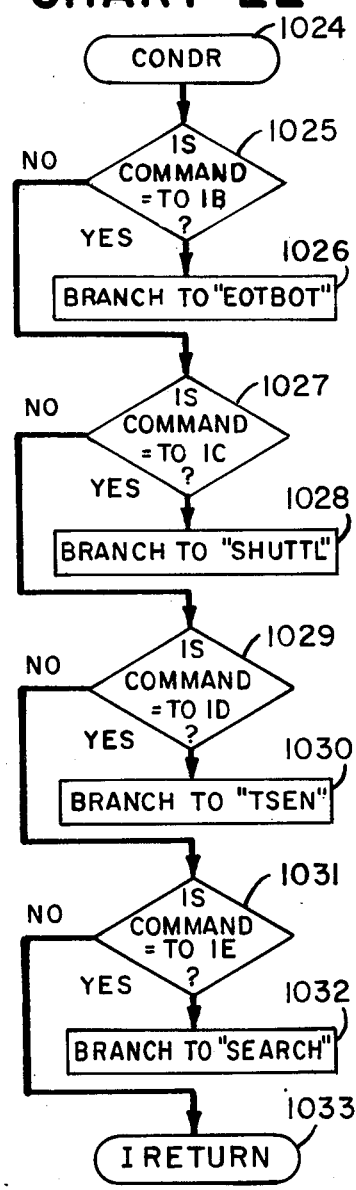

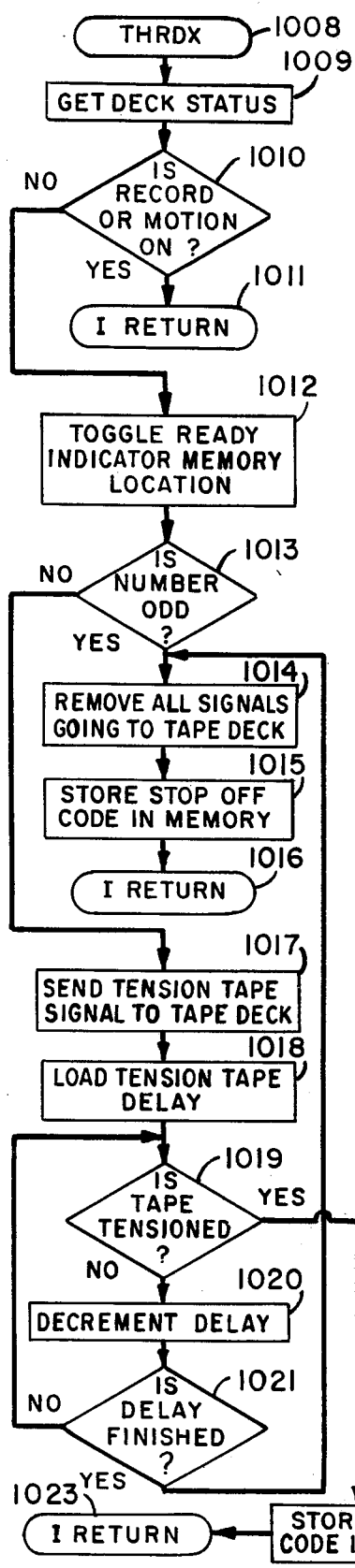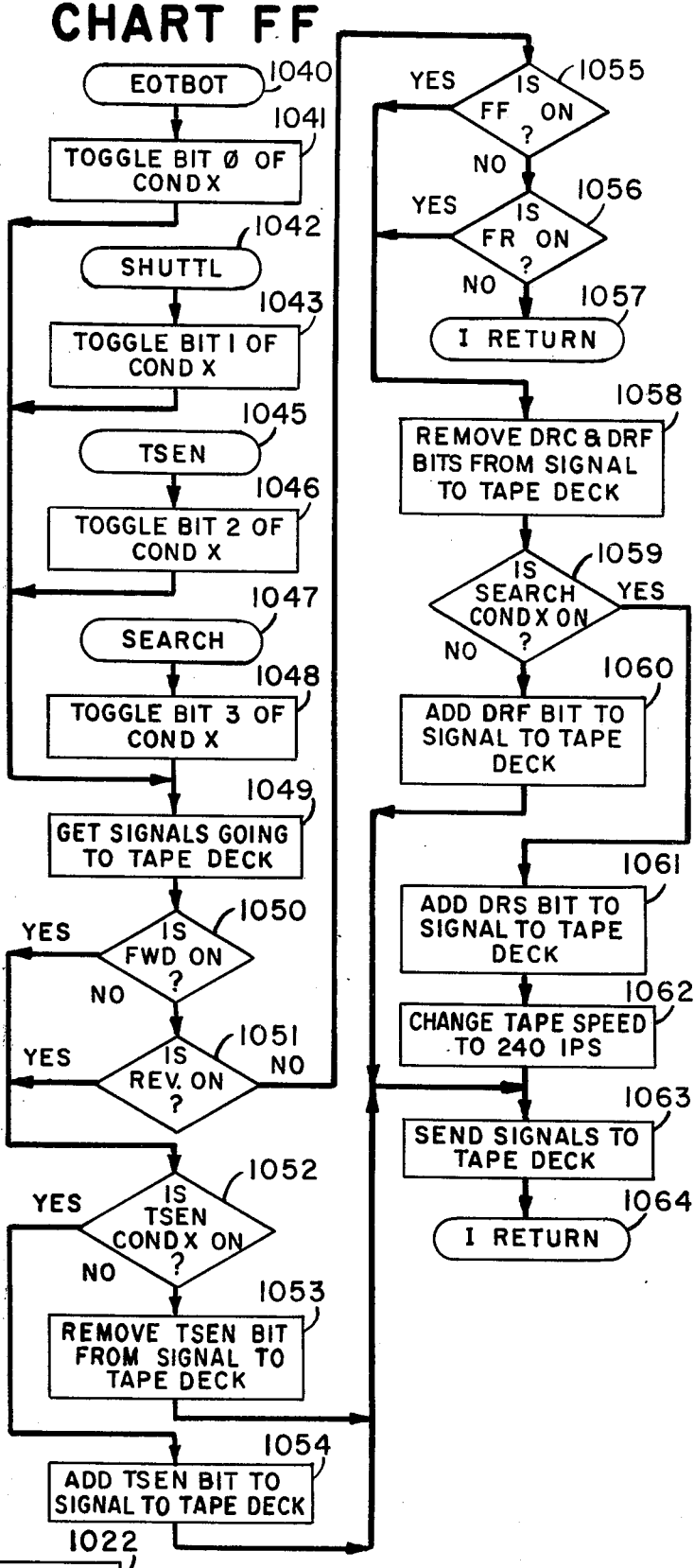

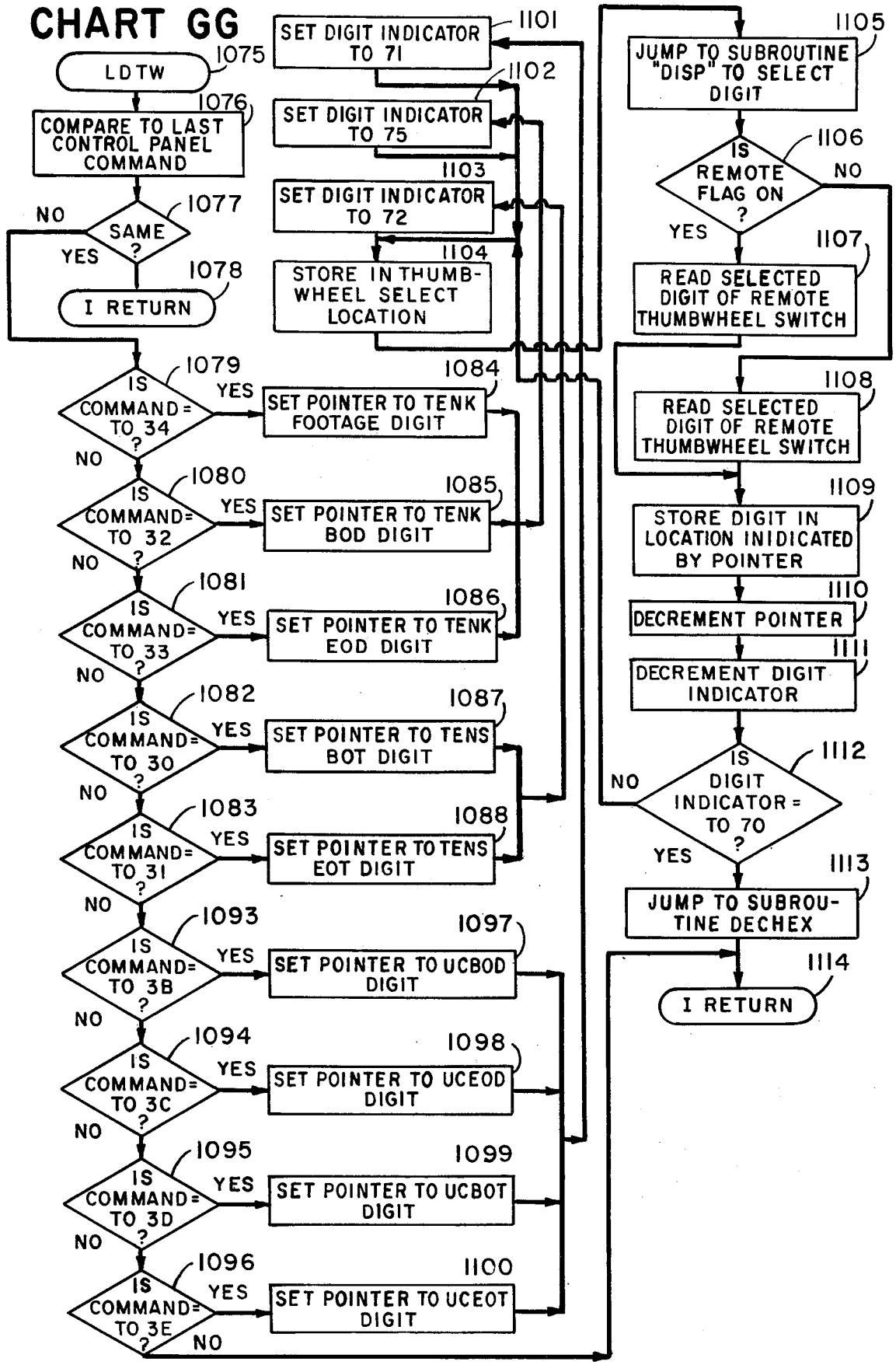

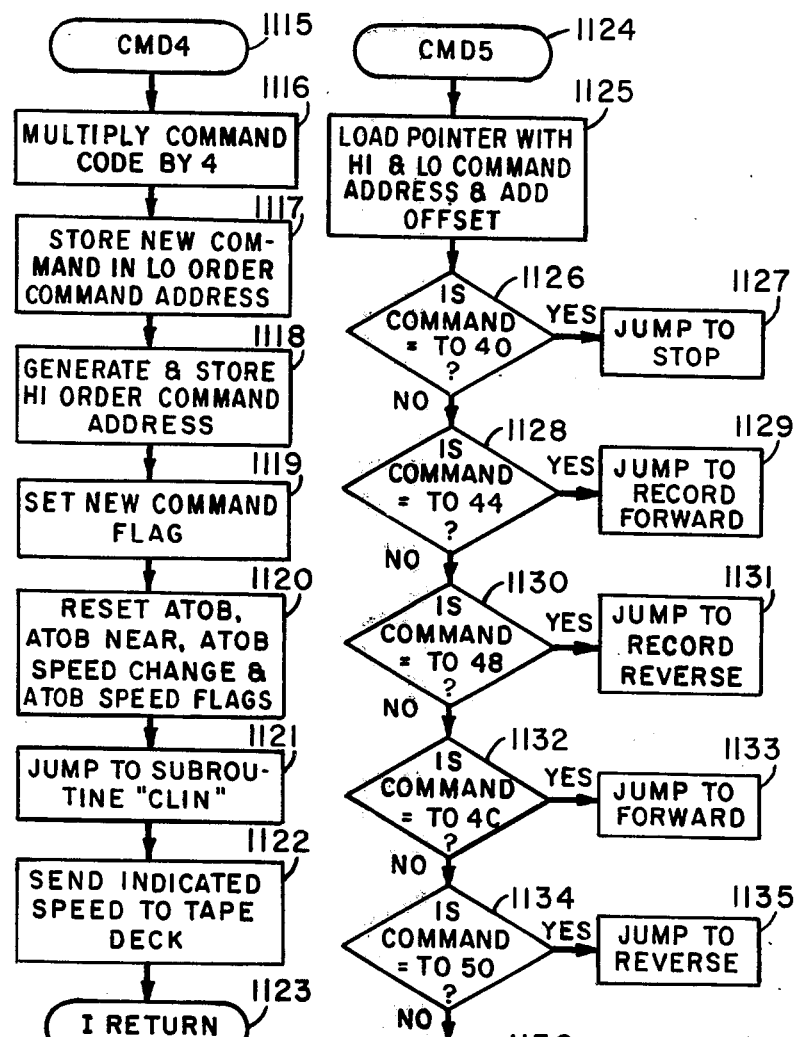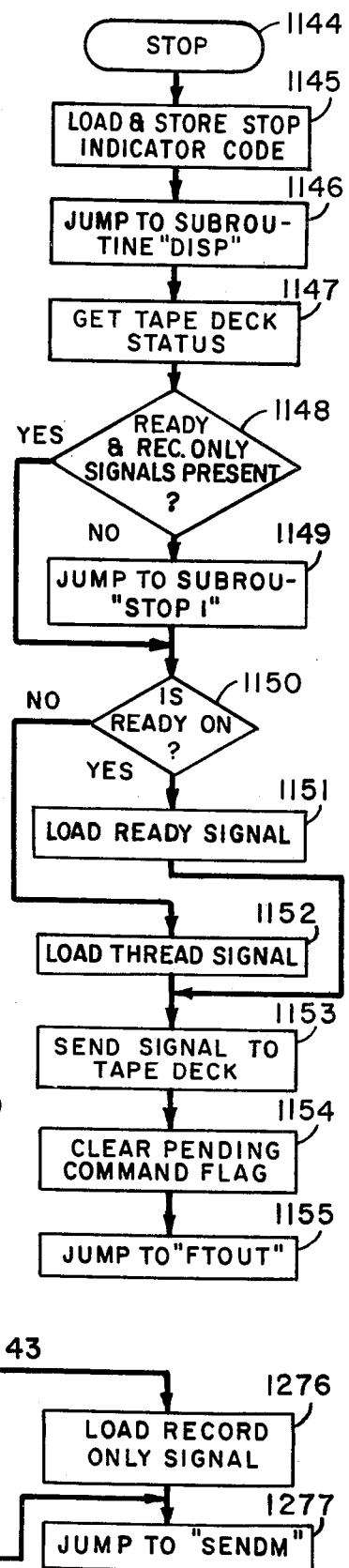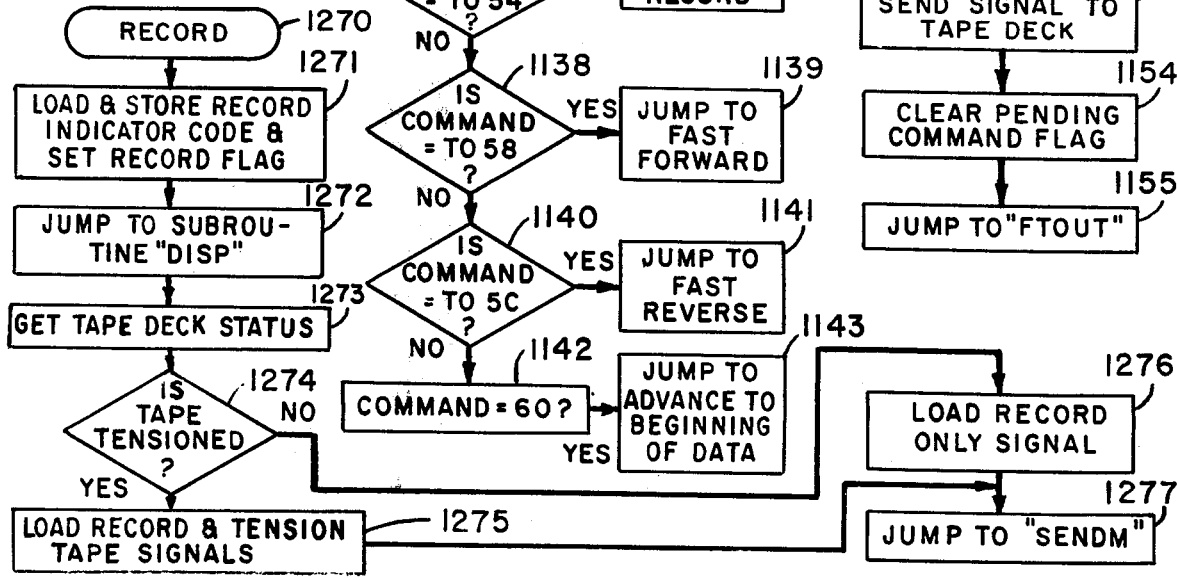

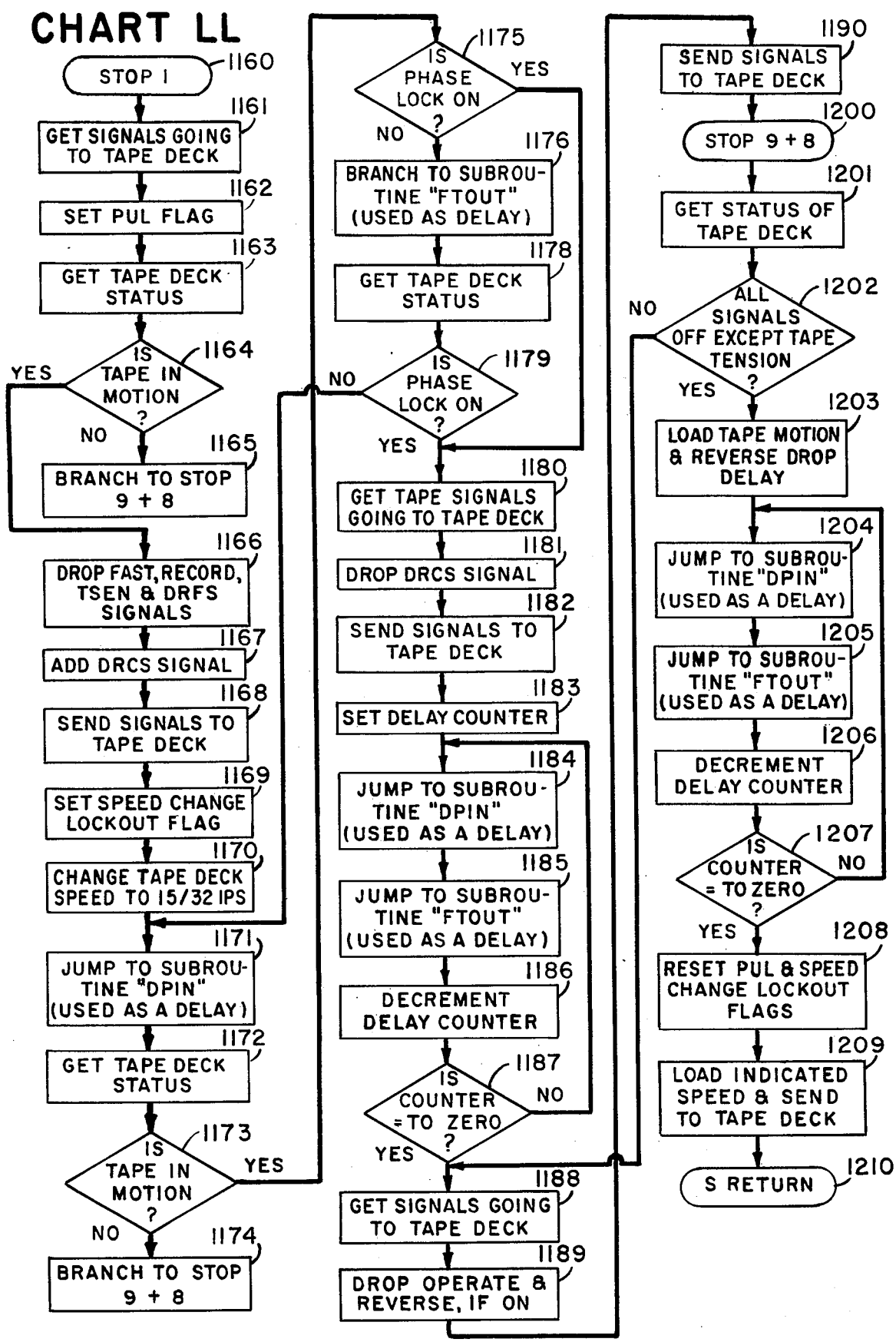

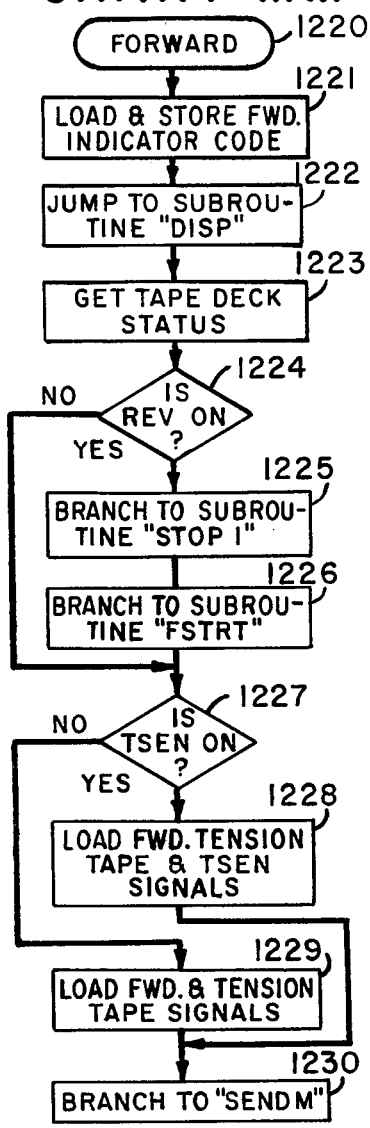
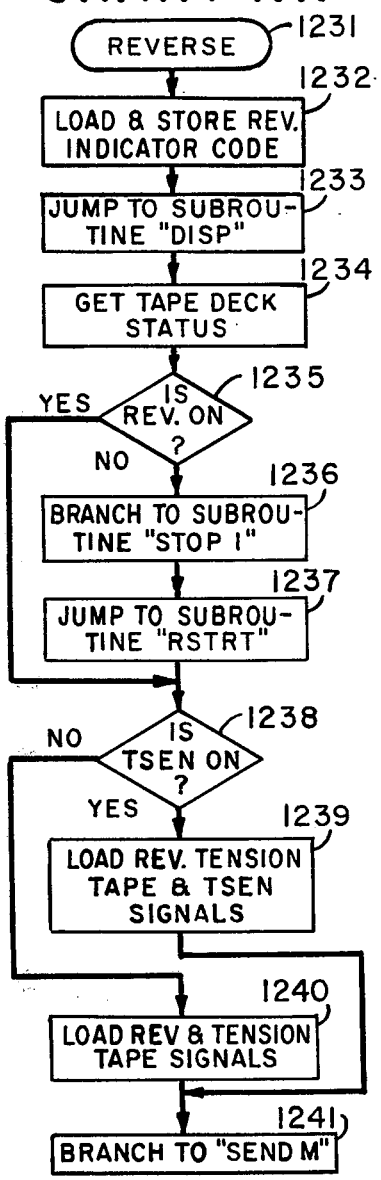
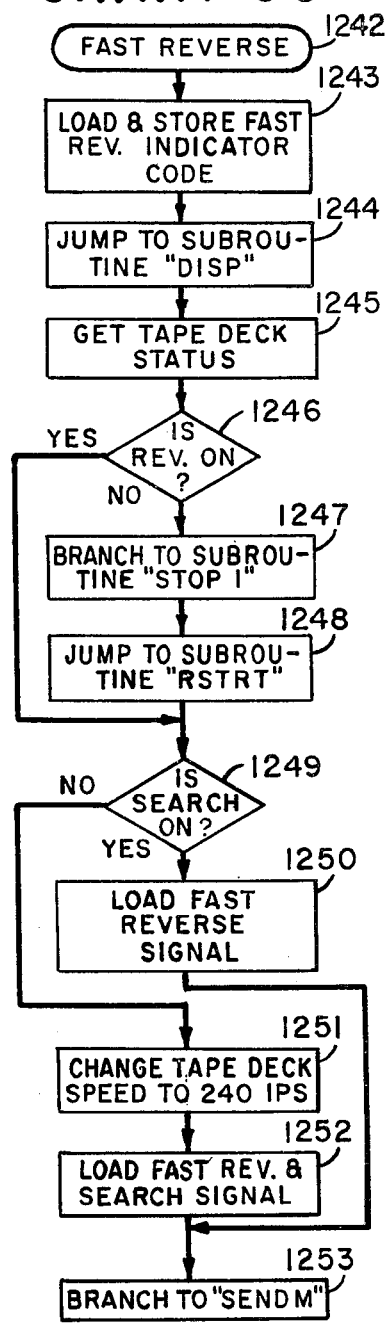
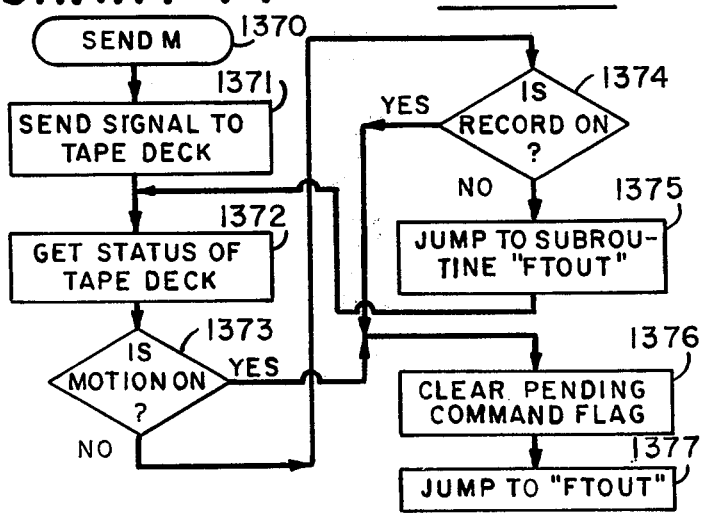
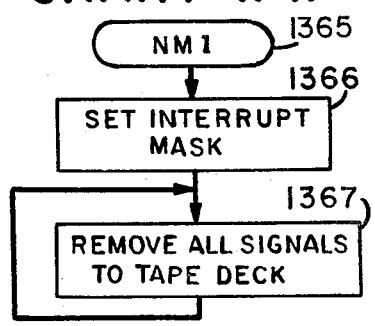

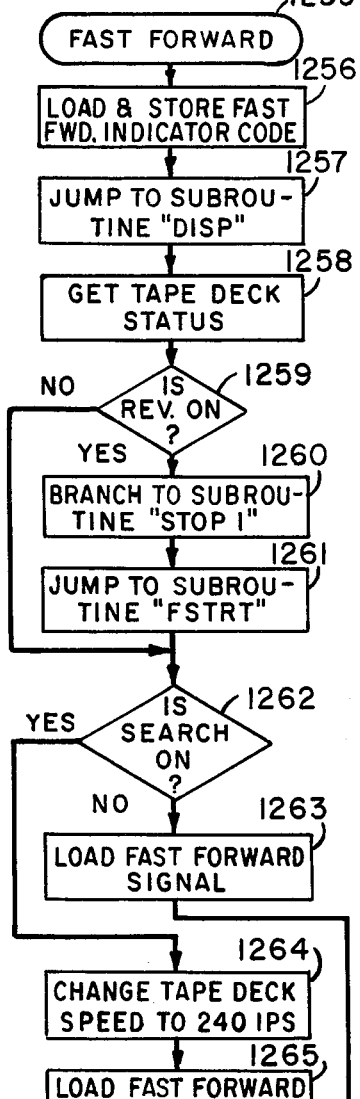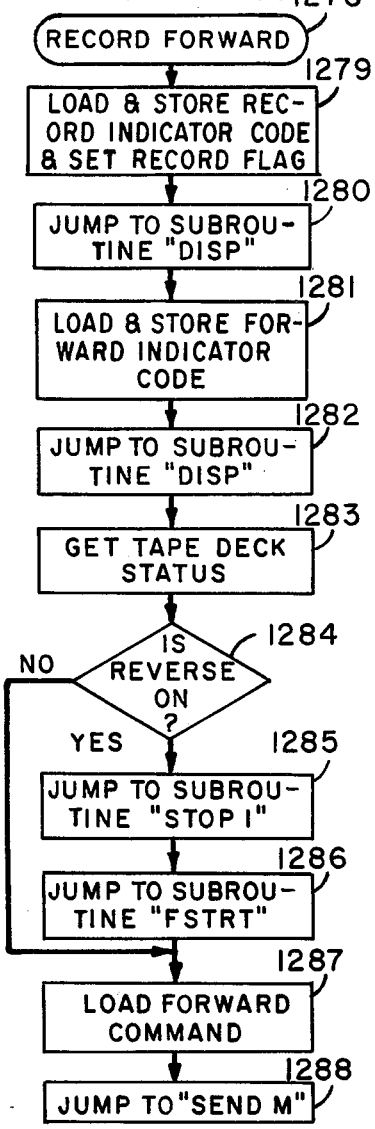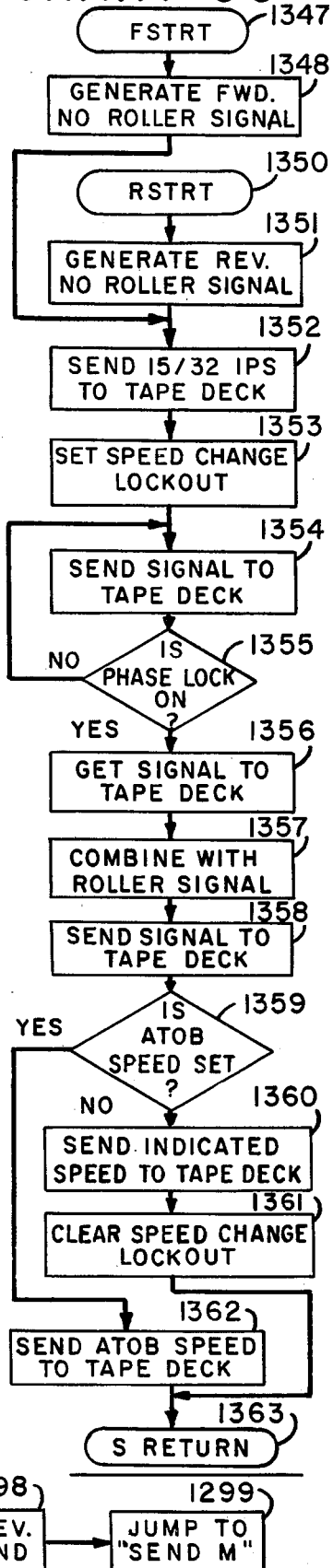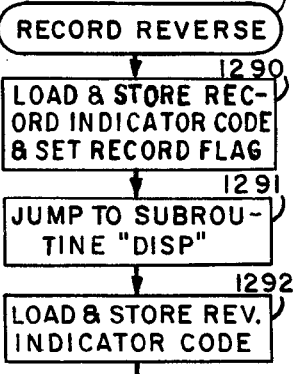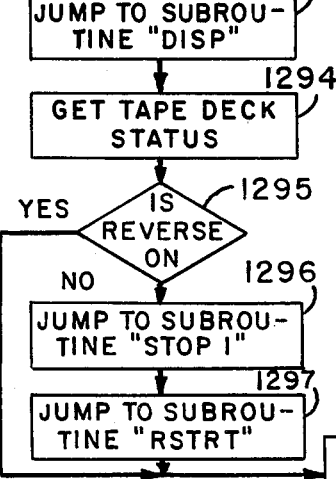

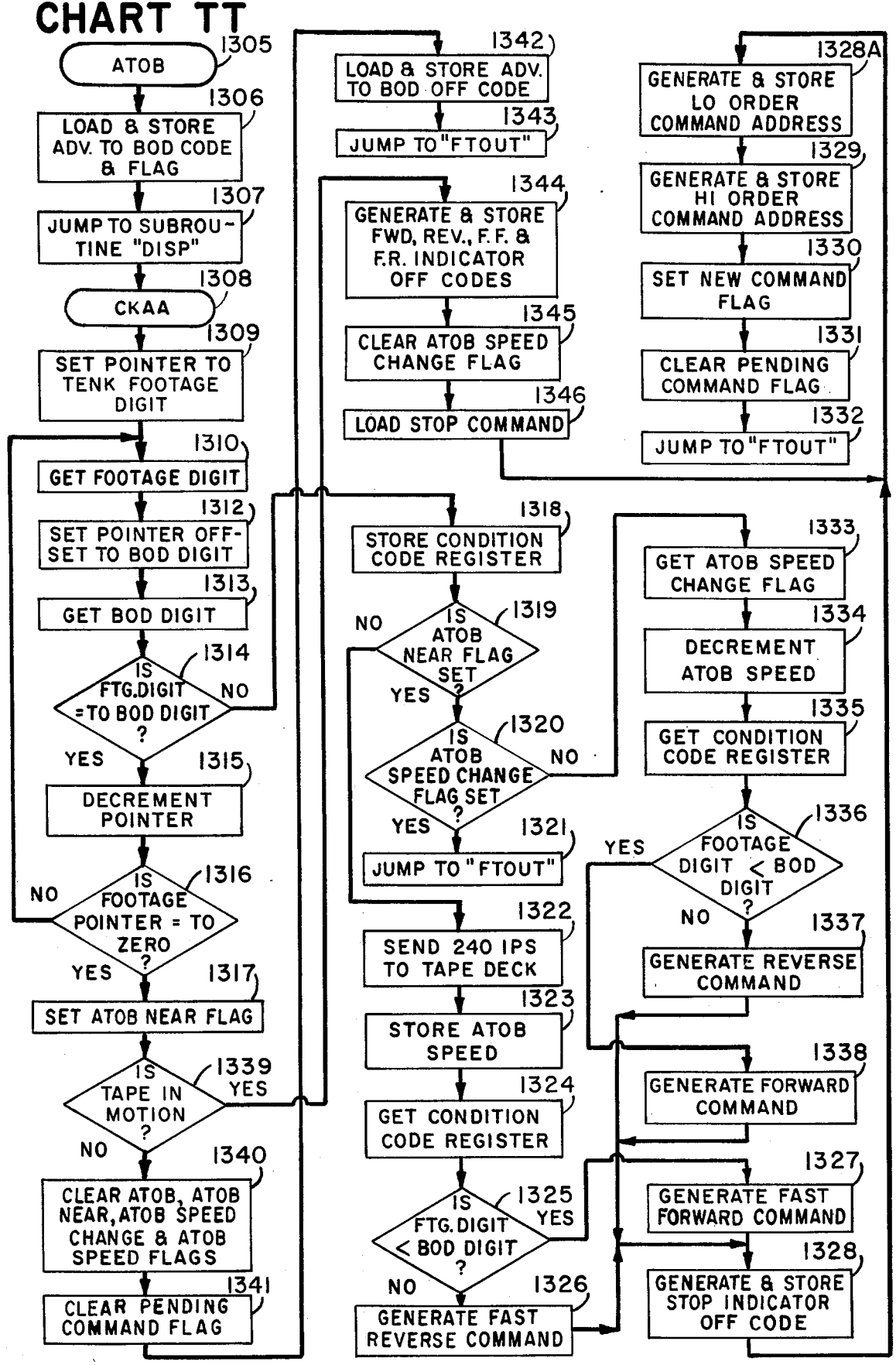

METHOD AND APPARATUS FOR CONTROLLING TAPE RECORDER

FIELD OF THE INVENTION

The present invention relates to tape recorders in general; and more particularly, it relates to apparatus for recording and reproducing electronic signals on magnetic tape of very high quality which is commonly referred to as a laboratory tape recorder. Systems of this type may be used in collecting data from various sources, for example, for subsequent analysis on a computer. Conventional recording techniques may be used with the present invention which is primarily concerned with controlling and executing various functions in the tape transport. A rigid demarcation is not made between the terms "tape recorder" and "tape transport" but in general, a tape transport includes the mechanism which handles and moves the tape, controls its speed and tensions it, whereas the recorder also includes the electronic recording and playback circuits.

BACKGROUND AND SUMMARY

In conventional tape recorders, a signal of interest is recorded on the tape as the tape is moved by the tape transport from a supply reel to a takeup reel. Some means is normally included to indicate to the operator the location of tape (commonly referred to as "footage") which is adjacent the read/record heads, or simply "transducer". Two particular locations are of interest to the operator concerning the data recorded. These are the Beginning of Data (BOD) and End of Data (EOD) footage locations. Typically, the BOD and EOD locations are recorded either on a voice track on the same tape by an operator during recording, or noted in a written log by the operator. He may note a specific event that occurred along with a notation of the footage indicator at the time the event occurred. Normally, all other events of interest are referenced to a particular noted event. In some systems, the operator may have the option of resetting the footage counter to zero at a particular event, thereby referencing all subsequent events relative to zero footage. There is normally some ambiguity in the actual BOD location thus determined because the operator may actually run a hundred or more feet of tape through the machine before beginning to record. This is done in the case of valuable data to insure that the tape on which the recording is made is not damaged.

During playback or analysis, the operator may not know where the footage counter had been set to zero or recording begun. Rather, he must first recognize and identify the event from which reference is made, and then he can correlate the event either with the written log or a recording on the voice track. In this manner, he knows where other events are located by reference to the footage indicator and log. However, it may be necessary for him to calculate where other data events are located on the same tape. For example, if he knows that a reference event occurs at twenty feet on the recorded tape, and he is looking for an event at four hundred feet, when he loads the tape for playback, and identifies the first event, his footage indicator may indicate forty feet, thereby requiring a calculation before he can locate the event of interest. These calculations can introduce error, and they are always an inconvenience.

One mode of operation using the BOD and EOD points is commonly referred to as "shuttle". Typically, the BOD and EOD locations are identified by conductive or reflective markers, or the locations are specified by advancing the tape to each location and setting an electromechanical counter at the two locations. When the traditional shuttle mode of operation is entered, the transport moves the tape forward at the desired speed reproducing the signal recorded on the tape to the EOD point, and then moves the tape in fast reverse to BOD. This process is repeated until the operator deactuates or stops the transport. As described below, the present invention adds flexibility by permitting the user to enter other commands which will be executed at footage locations such as BOD and EOD.

Two other parameters useful in conventional tape recorders are Beginning of Tape (BOT) and End of Tape (EOT). These parameters are normally not defined by specific footage locations, as with BOD and EOD. Rather, mechanical follower arms engaging the tape pack, conductive or reflective markers, transparent leaders, or light source/photodetector combinations are used to keep track of the amount of tape on the reel being emptied by transport motion.

The EOT parameter is used in emptying the source reel when the tranpsort is operating in a forward direction, and BOT is used when rewinding the tape from the takeup reel onto the source reel. One disadvantage of prior tape recorders is that the EOT and BOT parameters are not easily changed or re-set. That is to say, in the case of conductive or reflective spots or transport leaders, the locations had to be first identified and then changed. If one of these parameters were identified by removing the magnetic coating with solvent, changing is even more difficult. In other systems, mechanical adjustments are required for changing the identification of these parameters.

The control apparatus of the present invention includes a Central Processor Unit (CPU) and a Control Panel having data entry switches, mode selection switches, speed selection switches, a multiposition function select switch, and other controls, and a display which communicates with the CPU. The control panel enables the operator to enter commands as well as data into the system. Commands are recognized by the CPU and executed in controlling the tape transport at predetermined footages (such as BOD or EOD) as well as at predetermined parameter definitions (such as at BOT or EOT). In defining BOT and EOT, the CPU accumulates pulses from a capstan transducer representative of linear tape footage for distance that has been transported. At the same time, the CPU uses pulses from a transducer associated with the supply reel motor and the takeup reel motor which are representative of angular displacement of the supply reel and takeup reel respectively. A ratio of capstan pulses to either supply reel or takeup reel pulses is determined. This ratio is a pure number which is representative of the diameter of remaining tape pack. It is independent of operating speed, and it decreases monotonically as a reel is being emptied. A predetermined number is thus used to define BOT and EOT; and it is very easily entered or changed by the operator, using the data entry switches, in combination with the function switch on the control panel.

The present invention also permits the operator to enter commands (referred to as User Commands) at any of the locations BOD, EOD, BOT or EOT. These commands are stored in the CPU and executed when the associated location is reached or parameter defined, to control the transport. Thus, the number of commands are available for entry by the user (again, using the function select switch and data entry switches on the control panel) either at predetermined footage locations on the tape or in accordance with other parameter definitions. Thus, the operator is not limited to the traditional shuttle mode of operation—rather, he can program any number of modes of operation. For example, at EOD, he can program the control mechanism such that the transport will stop, go into a reverse record mode of operation or transfer recording to another machine by entering a single command at the control panel. In the illustrated embodiment, this command is a single digit number. At BOD, he can cause the machine to go into forward record mode of operation—again, by entering a single command at that location. To enter these commands, the tape need not be at the location at which it is desired to execute the command because the command is stored in the CPU, and the CPU keeps an updated and accurate record of footage as well as the ratio of capstan to reel angular displacement described above. Thus, when the particular footage location or parameter definition is identified by the CPU, the command is brought up and executed.

Another advantage of the present invention is that the footage counter may be set by the operator to any desired footage indication. In other words, rather than being limited to resetting the footage counter to zero, the operator may, upon identification of a specific event such as that which defines BOD, set the footage counter to the number indicated either on the voice track of the recording or in a written log. This enables the operator during a playback of a tape to obtain exact correlation with the footage indicator during a previous recording. The new indication, because it is stored in memory in the CPU, may be entered through the same data entry switches and function switch which are used for the entry of other data as well as commands.

The operator may set the speed of the transport by depressing any one of ten separate speed control pushbuttons at the control panel. However, actual speed is controlled by the CPU, so that programmed speed control is possible. This is useful, for example, when an operator may be emptying a reel in the slew mode. It may be undesirable to permit the end portion of a tape to pass through the transport at the slew rate. The CPU, recognizing that the transport is operating in the slew mode, will identify EOT and automatically cause the transport to slow down to a lower speed. Further, because of the particular tape transport mechanism with which it is desirable to employ this invention, it is advantageous to program the speed of the capstan during start up and motion reversal. Specifically, as is more fully disclosed in the copending application of Prozzo, et al, Ser. No. 788,443, filed Apr. 18, 1977, now U.S. Pat. No. 4,122,504 for TAPE TRANSPORT, which is co-owned, the transport includes two drums providing tape-carrying surfaces which are closely spaced relative to the transducer in a short-loop configuration. These drums are surface-driven by a single capstan which has a polyurethane peripheral drive surface. Because this material has "memory", it is undesirable to engage the capstan with the drums while the capstan is stopped. The CPU during start up at a desired speed, first stores the desired speed, and transmits a predetermined or programmed speed to the capstan. After the capstan has achieved this speed, the CPU transmits signals that cause the drums to engage the capstan at either a read position (in which the tape is in operative relation with the transducer) or a transport position (in which the tape does not engage the transducer), and then transmits signals to the transport which are representative of the desired operating speed. Other features and advantages of the present invention accrue in the use of the preferred transport mechanism described in the Prozzo, et al application, identified above.

Thus, the present invention provides a tape control system in which the various functions performed by the tape transport, and the sequencing thereof, are implemented under command from a programmable data processor. This permits great flexibility in changing the response locations on tape or other response parameters, as well as in changing the command functions at such locations. It also provides flexibility in the entry of data and the programmed speed control of the transport. Flexibility and adaptability are important characteristics in a laboratory tape recorder because of the wide variety of uses to which such an instrument is put.

Other features and advantages of the present invention will be apparent to persons skilled in the art from the following detailed description of a preferred embodiment accompanied by the attached drawing wherein identical reference numerals will refer to like parts in the various views.

THE DRAWING

CHARTS A–WW are flow charts of the program for the Central Processor unit.

LISTS 1–35 comprise a listing of the instruction code for the Central Processor Unit.

CHARTS

| | | | | | |
|---|---|---|---|---|---|
| A | START | | | AA | DIS |
| B | CLIN | | | BB | FTRST |
| C | DECHEX | | | CC | ----- |
| D | DISP | | | DD | THRDX |
| E | DELAY | | | EE | CONDR |
| F | FTOUT (MAINLINE) | | | FF | EOTBOT |
| G | FTOUT | | | GG | LDTW |
| H | FTOUT | | | HH | CMD4 |
| I | ----- | CMD3II | | --- | --- |
| J | FTOUT | | | JJ | CMD5 |
| K | ALARM | | | KK | STOP |
| L | SHUTCK | (check shuttle) | | LL | STOP1 |
| M | CKMC | (check machine) | | MM | FORWARD |
| N | DPIN | (display indicators) | | NN | REVERSE |
| O | CONDX | (display EOT, SEARCH SHTL, TSEN) | | OO | FAST REVERSE |
| P | POLL | (interrupt- -CAP,SRP,TRT, LOCAL,REMOTE COMMAND) | | PP | FAST FORWARD |
| | | | | QQ | RECORD |
| Q | CNTI | (capstan interrupt) | | RR | RECORD FORWARD |
| R | SHT1 | (shuttle interrupt) | | SS | RECORD REVERSE |
| S | EOT1 | (reel pulse comparison) | | TT | ATOB |
| T | CLR511 | | | UU | FSTRT |
| U | EOTOFF | | | VV | SEND M |
| V | LOFC | | | | |
| W | BOT1 | | | | |
| X | BOTOFF | | | | |
| Y | CMDR1 | | | | |
| Z | CMD3 | | | | |

INDEX

I. Overall System.
II. Tape Transport Mechanism.
III. Control Panel.
IV. CPU/Tape Transport Interface.
V. CPU/Control Panel Interface.
VI. Operation of CPU/Control Panel Interface.
VII. Overall System Operation.
  A. START UP.
  B. SPEED SELECTION.
  C. FORWARD/REVERSE.
  D. RECORD.
  E. FAST FORWARD/FAST REVERSE.
  F. ENABLE MODES.
    F1. ENABLE SEARCH.
    F2. ENABLE TAPE SYNC.
    F3. ENABLE BOT/EOT.
    F4. ENABLE SHUTTLE.
  G. MISCELLANEOUS.
    G1. ADVANCE TO BEGINNING OF DATA (TO BOD).
    G2. SRP, TUP.
    G3. FOOTAGE.
    G4. CALIBRATION.
VIII. FLOW CHARTS.

DETAILED DESCRIPTION

I. Overall System

Figure 1:
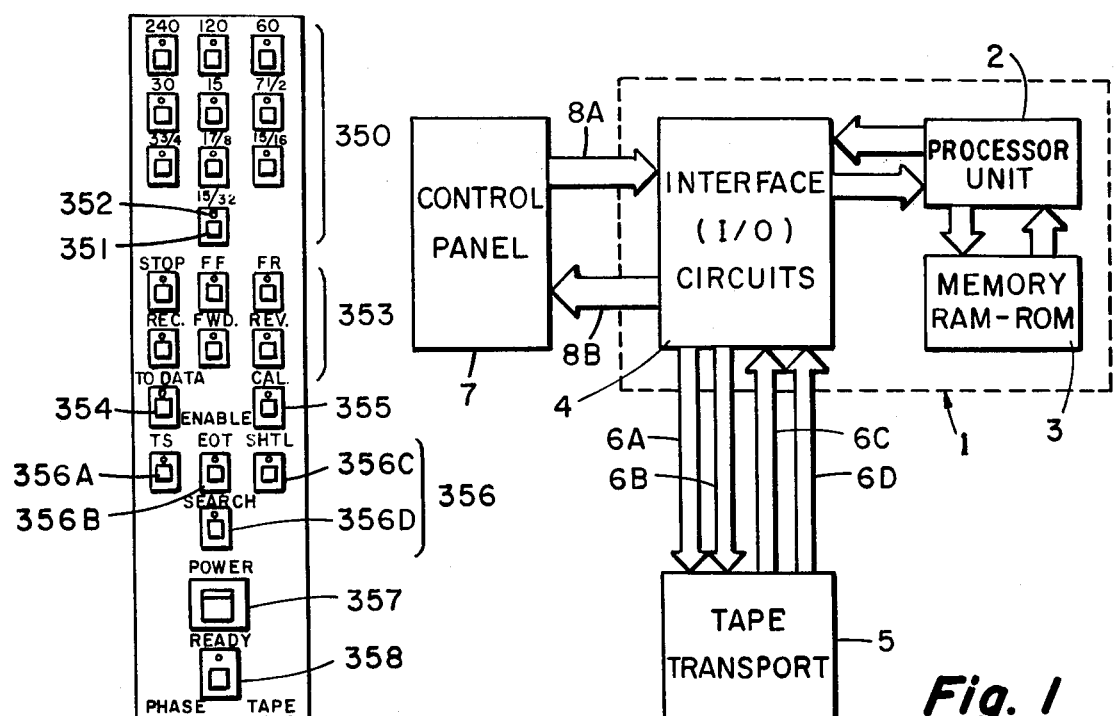
FIG. 1 is a functional block diagram of the overall system according to the present invention.

Referring first to FIG. 1, the circuitry enclosed within the dashed block generally designated 1 comprises a Central Processor Unit (CPU). The CPU includes a processor unit 2, a memory 3 and interface (I/O) circuits 4. The processor unit 2 may be a microprocessor printed circuit board having a microprocessor chip sold under the designation M6800 by Motorola, Inc., and it includes a crystal oscillator providing a clock source as well as buffer circuits. The memory 3 contains three chips of 1,000 bytes of programmable read only memory (ROM), at least one of which is erasable (Part No. 2708 of Intel Corporation), and 128 bytes of random access memory (RAM). CMOS circuitry is preferred for random access memory because of the very low current drain when not being accessed.

The CPU communicates with a tape transport 5 by means of buses 6A, 6B, 6C and 6D. Bus 6A is a control bus comprising eight function control lines. Bus 6B is a speed select bus comprising four lines of parallel data which determine the speed of the tape transport 5. Bus 6C is a monitor bus comprising eight function monitor lines; and bus 6D is an interrupt bus comprising four interrupt lines from the transport to the CPU.

The system is controlled from a control panel 7 which communicates with the CPU by means of two buses designated 8A and 8B. As will be explained in more detail in connection with FIG. 12, bus 8A is a control bus comprising seven lines (six data lines and one "data present" line) from the control panel to the I/O circuits; and bus 8B comprises eight lines (seven data lines and one strobe line) from the CPU to the control panel 7.

A remote control capability can be incorporated into the system by communicating the bus 8B to the remote location, and by introducing a separate bus, similar to bus 8A from the remote location to the interface circuits 4. Since the CPU has interrupt capability, a remote control interrupt is provided in the main line program, the operation and functioning of which is similar to that to be described for the Control Panel 7. A remote control unit could be enabled or disabled at the Control Panel 7, and a speaker and microphone could also be added for voice commentary, if desired.

II. Tape Transport Mechanism

Figure 2:
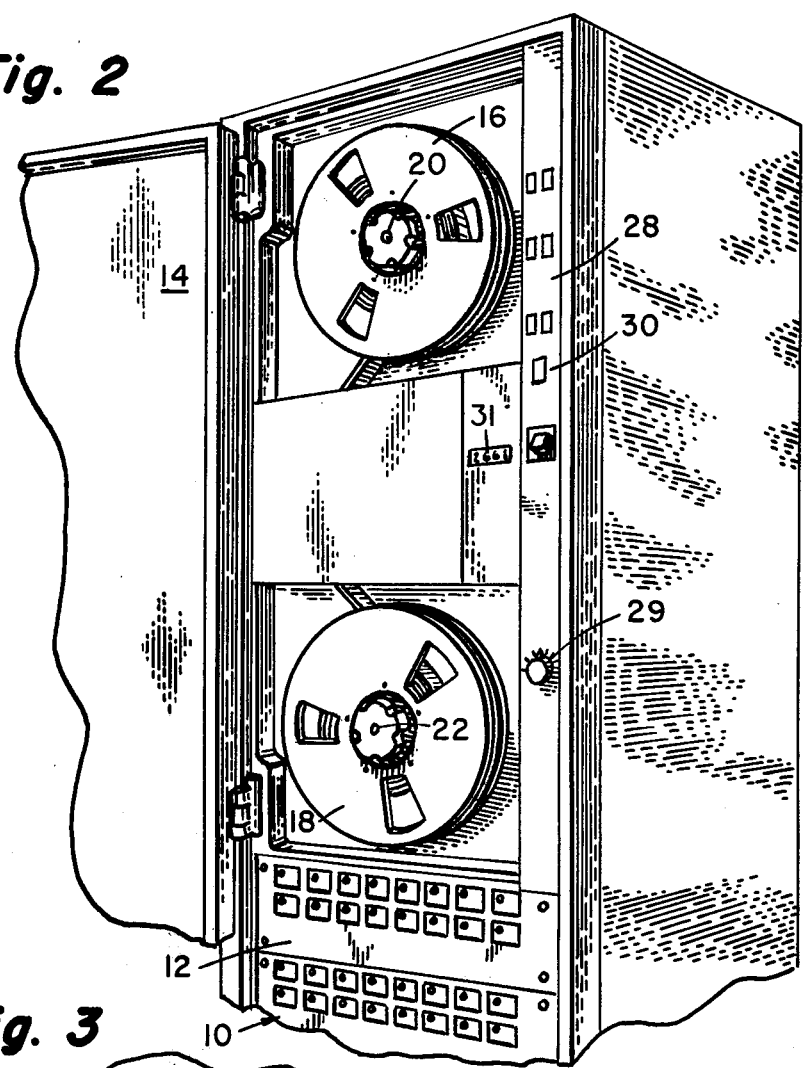
FIG. 2 is a perspective view of a tape transport unit, taken from the front and side.

Referring now to FIG. 2, the tape transport is housed in an upright cabinet 10 having lower front panel 12 and hinged glass front panel door 14 covering a top supply reel 16 and bottom takeup reel 18 mounted on their respective spindles 20 and 22. A transport mechanism 26 (see FIG. 3) is located between the reels. A control panel 28 located on a raised marginal edge of the front of the cabinet 10 includes a function control switch 29 and pushbutton switches 30. These control and function switches will be described in more detail subsequently. A display 31 is used to display information, such as footage or stored commands to the user.

Figure 3:
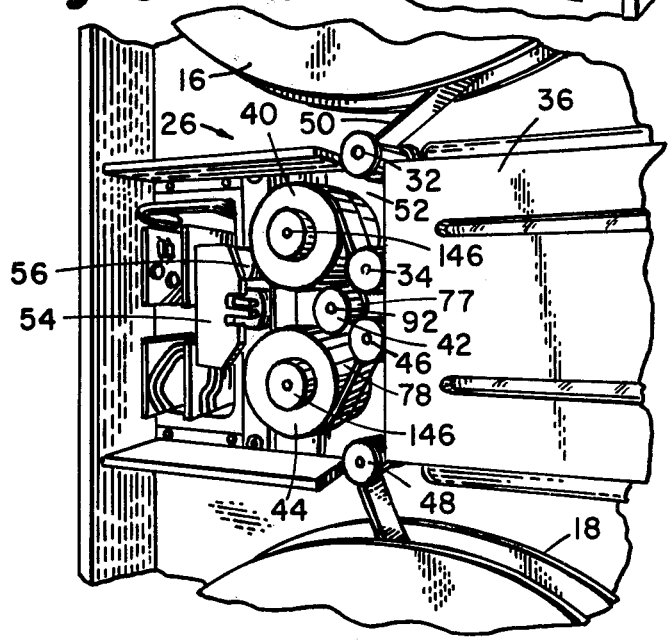
FIG. 3 is a close up fragmentary perspective view of the transport with the cover removed.

In FIG. 3 the transport system 26 includes a pair of guide rollers 32 and 34 spanning the side opening of an upper vacuum chamber (to be described) covered by a hinged side plate 36, a first drum 40, a drive capstan 42, a second drum 44 and a second pair of guide rollers 46 and 48 spanning the side opening of a lower vacuum chamber behind the hinged cover plate 36.

The path of the tape 50 is from the feed or supply reel 16 over the roller 32 into the upper vacuum chamber, from this chamber beneath the roller 34, then around the drums 40 and 44 in major wrapping engagement, over the roller 46, through the second vacuum chamber, over the roller 48 and thence to the takeup reel 18. Because of the relatively close spacing of the drums 40 and 44 with each other and the capstan 42 and the absence of idlers, the transport system is said to be a short-loop configuration. The vacuum chambers perform the functions of tape-guiding, adding tape tension, and providing an indicator in the event the tape becomes tight or loose exceeding certain limits. They also serve as a tape storage elemnt, thereby buffering the capstan block assembly 52 from the reels 16 and 18.

As will be described, the drums 40 and 44 are rotatably mounted on crank shafts carried by precision bearings within the capstan and head mounting block 52 for transport of the tape 50 into operable contact with the transducer assembly 54 (the read/record or simply "read" position), the individual transducers 56 of which perform the necessary record and playback functions, known in this art.

Figure 4:
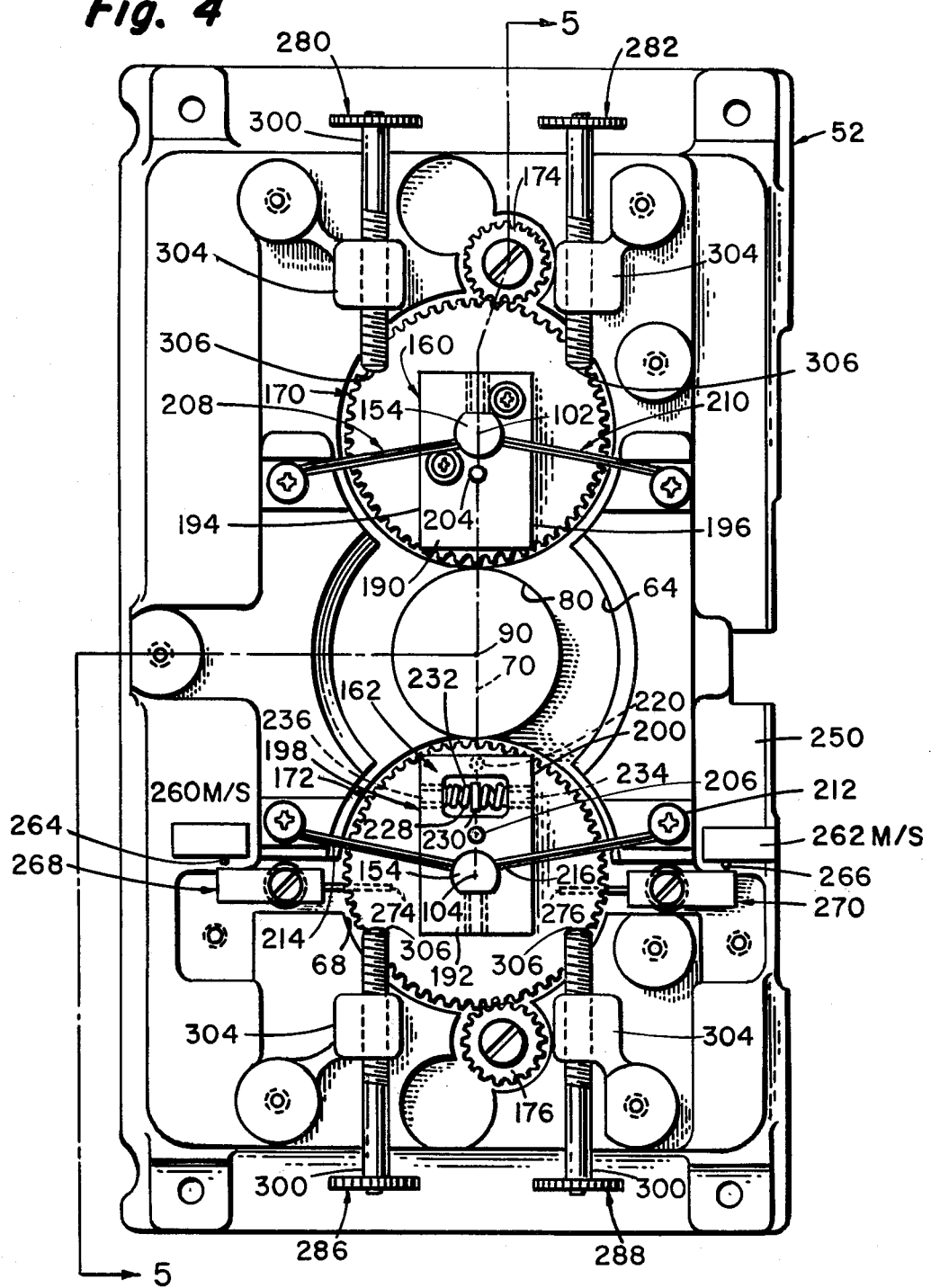
FIG. 4 is an elevational rear view of the transport mechanism.

Referring to FIG. 4, the block 52 has a central circular recess 64 which receives the capstan (not shown in FIG. 4) intersected diametrically by a top circular recess 66 and a bottom circular recess 68. The centers of all three recesses pass through a vertical center line 70.

Figure 5:
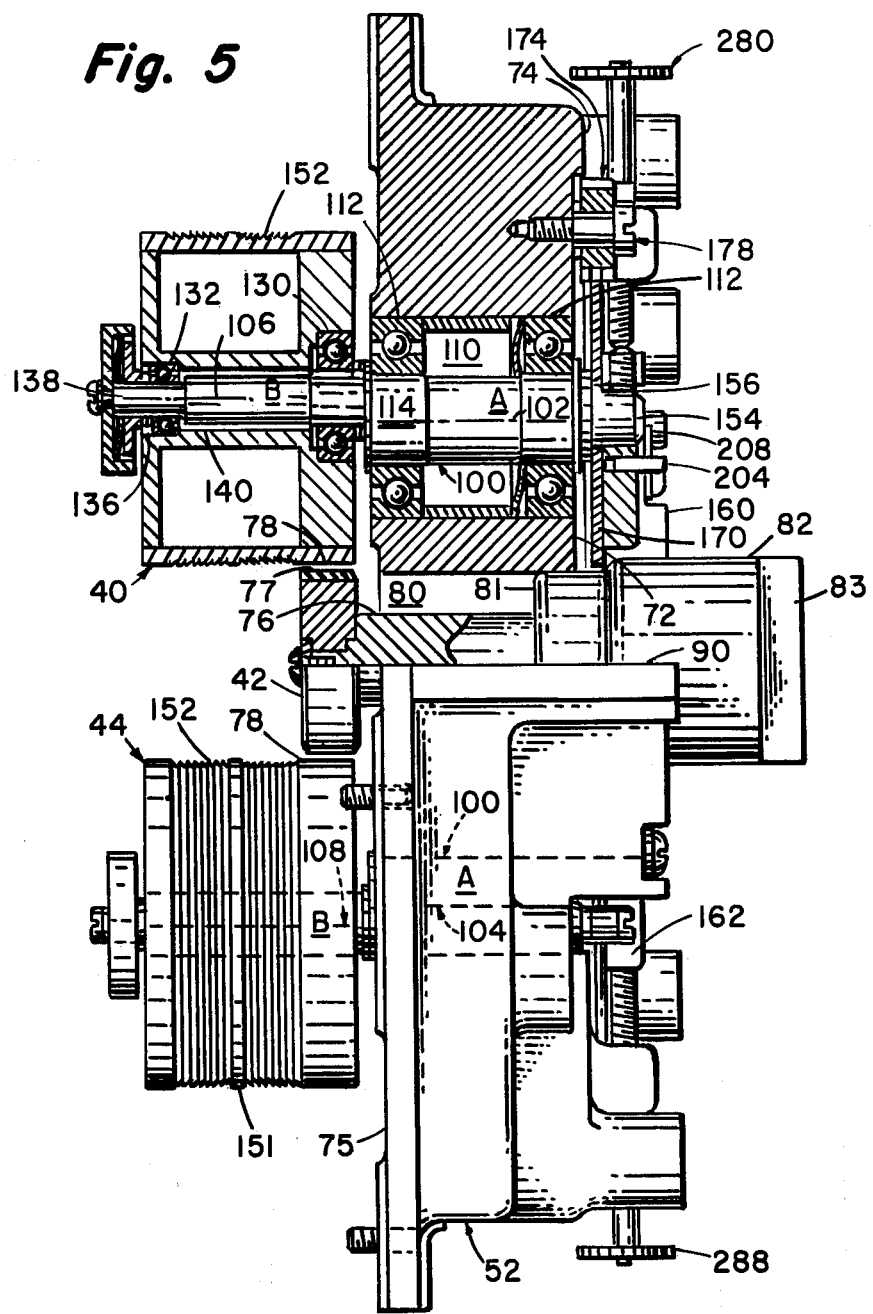
FIG. 5 is a vertical cross-sectional view taken along the slight line 5—5 of FIG. 4.

Referring to FIG. 5 the drive capstan 42 extends from its supporting drive shaft 76 beyond the front surface of the block 52 to a position between the drums 40 and 44 so that its peripheral puck or drive surface 77 is substantially diametrically between and spaced from the peripheral friction drive surfaces 78 of the drums (shown in the idle position in FIG. 5).

The puck 77 is preferably composed of a tough thermoset such as cast liquid polyurethane having high abrasion and impact resistance, and the capstan 42 may be titanium.

An opening 80 in the block 52 houses the shaft 76 which is rotatably carried by the bearing housing 81 and driven by a motor 82 having a tachometer 83 carried at the end. A fixed rotational center 90 of the drive shaft 76 for the capstan 42 is shown in both FIGS. 4 and 5.

Each of the drums 40 and 44 is mounted on an identical shaft 100, shown in cross section in FIG. 5 for the upper drum 40. These shafts each have a fixed axial portion A and a pivoted or movable portion B. The axes of portions A and B are offset. The center lines of rotation are shown at 102 and 104 in FIGS. 4 and 5 for the A portions, and at 106 and 108 for the B portions. The B portions pivot about the same axes as portions A, i.e., axes 102 and 104. The portions B are the rotational axes for drums 40 and 44.

Referring more specifically to FIG. 5, and using the shaft 100 for the drum 40 to illustrate the manner in which these shafts are mounted, it is seen that the housing 52 defines an opening 110 for the pair of precision bearings 112, the inner races of which engage the raised machined and true surfaces 114 of the fixed axial portion A.

The drum 40 is carried on the crank portion (spindle 138, FIG. 5) B of the shaft 100 by means of bearings 130 and 132. The bearing assembly is retained within the central bore 140 of the drum 40.

The outer surfaces of the drums also provide a tape-carrying surface having a plurality of close-spaced circumferential shallow grooves 152 which eliminate air-bearing of the tape to the drums during high speed operations. A middle circumferential section 151 without grooves divides the grooves into two groups so that a 1 inch tape will span all of the grooves in the two portions, but a ½ inch tape will span only the grooves of one portion with an outer edge of the tape running along the smooth section 151.

The other ends of the shafts 100 are reduced at 154 and contain a flat portion 156 for mounting control hubs or blocks 160 and 162. The blocks 160 and 162 hold driven gears 170 and 172 on the respective shafts 100 for limited rotation about the axes 102 and 104, respectively.

Each of the driven gears 170 and 172 has an associated drive gear 174 and 176 meshing therewith. Reversible DC torque drive motors (not shown) are coupled to the drive gears 174, 176.

The control hubs 160 and 162 are mounted off-center to their respective shaft ends 154 of the crank shafts 100 and have swing ends 190 and 192. The oscillations of the gears 170, 172 are little more than 180°, and the drive gears 174 and 176 do not approach the sides 194 and 196 of the top hub 160 or the flat sides 198 and 200 of the bottom hub 162 because of positive stops to be described. The hubs 160, 162 carry pins 204, 206 which extend outwardly in FIG. 4.

A pair of steel return-springs 208 and 210 is provided in relation to the top control hub 160, extending at slight angles to each other for contacting the pin 204. As the gear 170 is rotated about 90° in either direction from its idle position shown in FIG. 4, the pin deflects the springs 208 and 210 and stops when either surface 194 or 196 engages one of the contact stops 306.

The hub also has a pair of return springs 214 and 216. As the hub 162 and the gear 172 are rotated, the springs 214 and 216 act as a cushion, and hub surfaces 198 and 200 contact their associated stop surfaces 306. The springs 208, 210, 214 and 216 return drums 40 and 44 to idle position when torque is removed.

Still referring to FIG. 4, a pin or stake 220 is carried on the underside and near the upper periphery of the lower gear 172. The hub 162 has an opening 228 which receives a spring post 230 extending upwardly from the gear 172. A pair of compression springs 232 are seated on a roll pin secured to the post 230 and by set screws 234 in hub 162 adjacent opening 228. A spring post member 230 is resiliently held by the springs 232 so that the connection between the driven gear 172 and hub 162 and its associated axle 154 is a resilient coupling. As will be apparent from subsequent description, this resilient coupling permits the limit positions of the control drum to be adjusted without affecting the actuation of limit switches 260, 262.

Switches 260 and 262 are normally open limit switches mounted with their actuators 264 and 266 adapted to be engaged by pivotal switch blocks 268 and 270. Switch arms 274 and 276 of these switch blocks are engageable by the pin 220. The switches 260 and 262 control the electrical power to the reversible drive motor for the gear 170 which is referred to as the "slave" gear. The switch 260 is actuated (closed) by the pin 220 rotated in the direction of arrow R (standing for "read" or "record") with its switch arm 274 thereby pivoting the switch block 268 into contact with the actuator 264. The switch 262 is similarly actuated (closed) by the pin 220 as its swings in the direction of the arrow LT (standing for "lift tape" or transport).

FIGS. 4 and 5 show a first pair of adjusting screws 280 and 282 and a second pair of adjusting screws 286 and 288. The shank 300 of each adjusting screw is threaded into a boss 304. As the gears 170 and 172 oscillate through the cycles of record or play ("read") to the fast forward and reverse ("transport") positions, the stop ends 306 of the adjusting screws function as positive limit stops at each end of the swing arc. By adjusting the screws, the stop ends 306 can be finitely adjusted to limit the swing arc of the respective hubs and hence control the distances between the axis 90 of the capstan 42 and the peripheries of the drums 40, 44 along respective radial line joining the axis 90 with the axes 106, 108 of the drums. When these radial distances are equal, constant tangential velocity of the drums is insured (and constant tape speed) because the drums are surface-driven by the same element, namely, the capstan.

Since the hub 160 is affixed to the gear 170 and the drive 174 is in constant engagement when the stops 306 function to stop the hub 160 at the end of its swing, the motor drive stalls. For this purpose a slip clutch or stall motor is used (which latter limits stall torque in stalled condition).

The overall operation of these parts is as follows:

Assume the gear 172 of the control drum is driven in the "read" direction (counterclockwise (CCW), in FIG. 5) from idle position. The gear 172 rotates until the pin 206 contacts the spring 214 causing the spring to deflect. The gear 172 continues to rotate until pin 220 engages the switch arm 274 thereby rotating the block 268 toward the actuator 264 of the switch 260. The gear 172 continues to rotate causing hub 162 to contact the stop 366. This limits rotation of the crank 100 and hence the control drum 44 since the hub 162, crank 100 and drum 44 are all rigidly connected.

At this point, the control drum 44 is in driven engagement with the puck 77. The gear 172 continues to rotate CCW (with the hub 162 against the stop 286) allowed by resilient coupling means, i.e., the springs 232, causing the spring 232 on that side to begin compressing. The gear 172 continues rotating until the switch block 268 contacts the activator 264 causing switch 260 to switch and the slave drum 40 to be driven to its "read" position. Adjustment of set screw 234 determines how much further gear 172 must rotate, after the hub 162 contacts the stop 306, to cause the switch 260 to be activated by the force of the block 268 against the activator 264.

In operation, the switch 260 is activated after the hub 162 strikes against the stop 286. This insures that the control drum 44 is driving the tape 50 before the slave drum 40 disengages the capstan to maintain tension on the tape.

The adjustable means, namely spring biased post 230, controls the point at which the switch 260 is actuated after the drive gear 172 has stopped.

It is apparent that the foregoing factors, movements and adjustments apply in reverse order when the controls are moved to call for the drums to move to the idle position and then to lift tape (LT) or transport position. As the torque on the gear 172 is released, the spring arm 214 causes the drum 44 to move to the idle position, the drive capstan keeps rotating, but the switch 260 opens and the drum 40 is returned to its idle position as the drum 44 stops rotating. Movement of the control drum to the lift tape (transport) position (CCW in FIG. 4) causes the switch 262 to be acutated after the hub 162 strikes against the stop 288, again assuring that the control drum 44 is driving the tape 50 before the slave drum 40 begins rotating.

Figure 6:
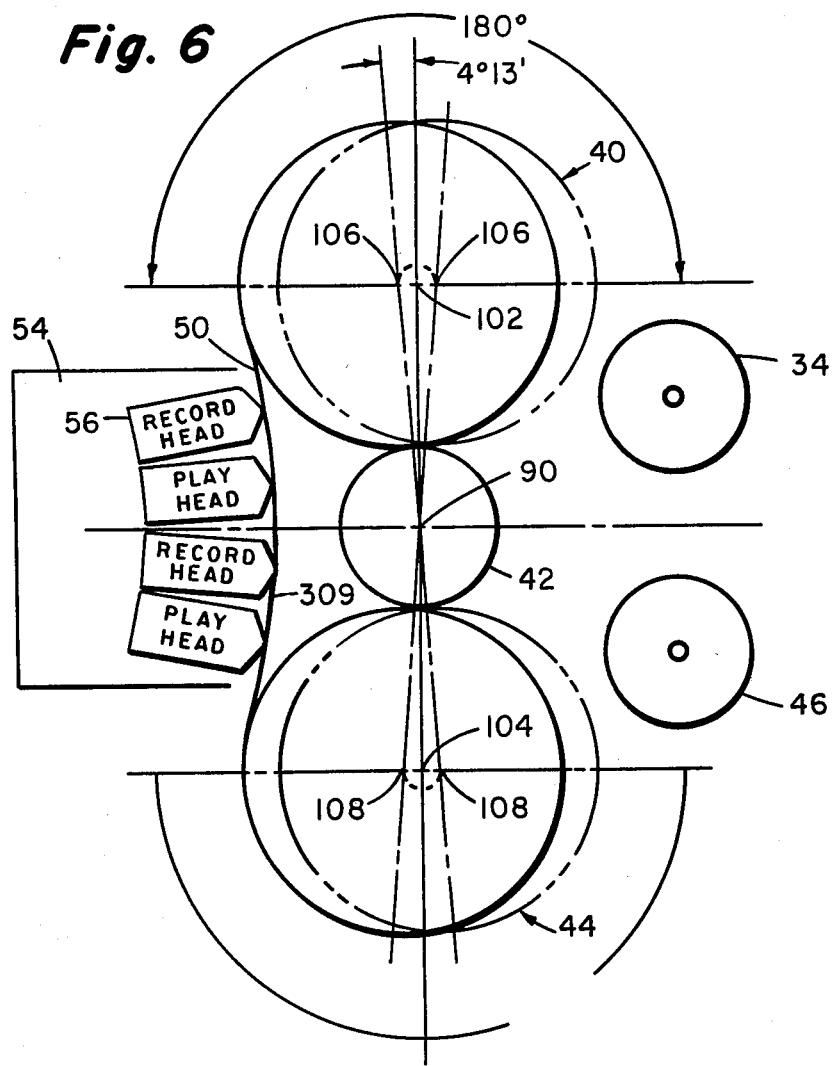
FIG. 6 is a diagrammatic front view of the tape transport illustrating the positions of the control and slave drums in the read, idle and transport positions, relative to the transducer head.
Figure 7:
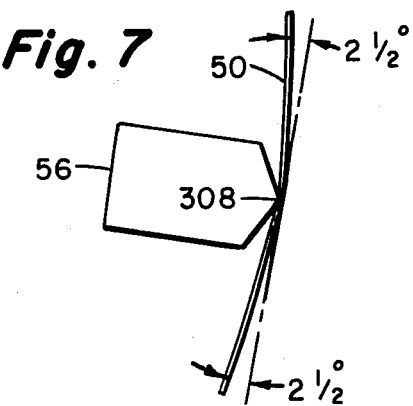
FIG. 7 is a diagrammatic front view illustrating the relationship of the tape to the crown of a transducer head.

The relative movement of the eccentric axis 108 of the lower drum 44 to each side of the center 104 or idle position, toward and away from the transducer head assembly 54 and the relative following movement of the eccentric axis 106 of the upper drum 40 to each side of its center 102, toward and away from the transducer head assembly 54, as well as the relationship of the record and play heads 56 to the tape 50, are shown diagrammatically in FIGS. 6 and 7. The tape 50 passes in a short loop from the roller 34 in major wrapping engagement over the drums 40 and 44, past the transducers, back to roller 46 in the record or play mode and in a slightly shorter loop during the transport mode, since the drums 40 and 44 are closer to the rollers 34 and 46.

It is to be observed that the pivot axes 106 and 108 move in a short arc of about 4°13' in relation to the center of rotation 90 of the capstan 42. Also, as shown in FIG. 7, when the drums are in the read position, the tape 50 enters and leaves the crown 308 of each head 56 with a 2½ wrap and the sections of tape 50, indicated at 309, travel in an essentially straight-line relationship on each side of the points of crown contact.

Figure 8:
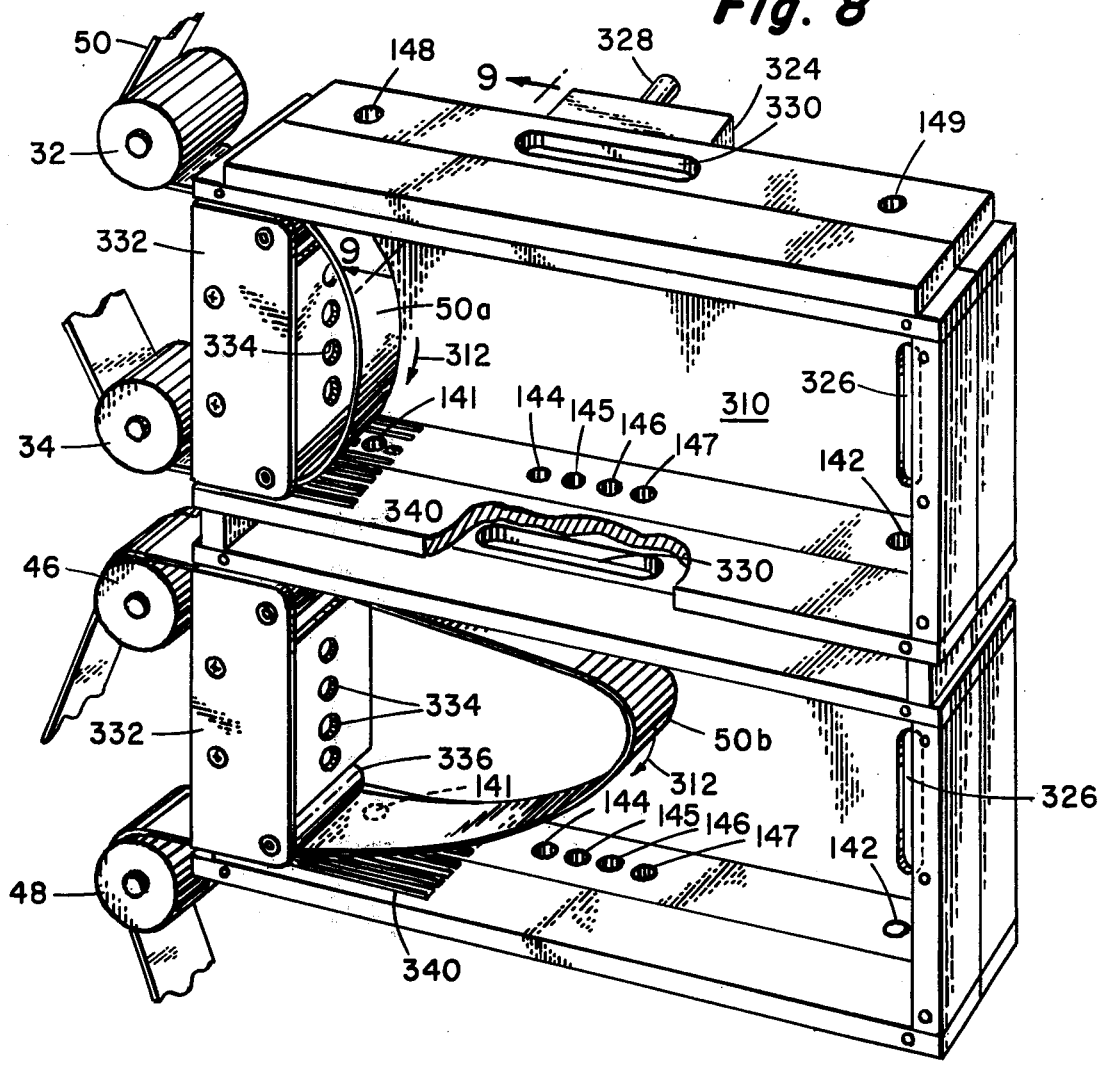
FIG. 8 is a fragmentary perspective view of a portion of the transport including upper and lower vacuum chambers, with the cover removed.
Figure 9:
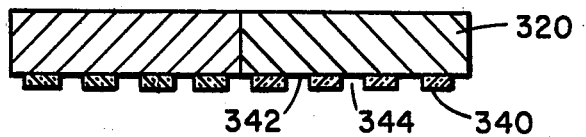
FIG. 9 is a cross-sectional view taken through the sight line 9—9 of FIG. 8 showing an entrance slit for the tape.

The reduction is flutter and skew, and the increase in fidelity is augmented by the close proximity of a pair of vacuum chambers 310, shown in FIG. 8. These chambers are identical in construction. The hinged cover plate 36 has been removed to show their interiors through which the tape 50 passes in the loops 50a and 50b in the direction of the arrows 312.

A pair of slots 326 communicate the interiors of the chambers with a plenum 324 mounted on the back side of the vacuum chamber. The plenum has a nozzle 328 which connects to a common and essentially constant source of partial vacuum, generated by a multistage fan type pump.

The chamber houses a series of light sources 141 and 142 such as light-emitting diodes at their ends and a closely spaced group of light sources labelled 144-145-146-147 (also light-emitting diodes) located intermediate the ends of the chambers 310. The tops for each chamber include photocells 148 and 149 opposite and responsive to the light sources 141 and 142.

The top panels also house a series of interconnected photocells behind appropriate glass panels, the series being indicated by the reference numerals 330. The photo-electric system just described is connected through suitable amplifiers to control the reel drive motors, as will be described.

The vacuum chambers each have an air flow distribution shoe 332 forming a partial closure and guide for the incoming and outgoing tube 50. These shoes have their top and bottom ends closely spaced from the top and bottom panels to provide a slit for entry and exit of the tape 50.

The shoes 332 define a series of uniformly sized and spaced air openings 334 which are open to the atmosphere on the side towards the rollers 32 and 34, and 46 and 48. At the top and bottom of each shoe a transverse roller 336 is provided to facilitate the passage of the tape therearound, especially under conditions of lessened tape tension. The interior surfaces 342 of the panels 318 and 320 are covered with a tape 340, fastened by a pressure-sensitive adhesive, to provide a frictionless surface. At the ends of the tops and bottoms of both chambers the tape 340 is cut to form the grooves 344 to augment the flow of air on the outside of the tape to form the loops 50a and 50b.

The tensioning system works as follows: a partial vacuum is drawn at the ducts 326, through the plenum 324, and the reel motors begin to feed and take up the tape; air passes through the holes and also through the slits on each side of the tape at the ends of the shoes 332; the loops 50a and 50b gradually form, due to the in-rush of air; and the tape shuts out the passage of light from the source 141 to the photocell 148 as indicated by the normal operating position of the loop 50b in the lower chamber.

When the system is at the selected speed the ends of each loop will be opposite the light sources 144–147 and the photo detectors 330 will monitor this normal condition. If the loop in either chamber becomes too short, as indicated by the loop 50a in the top chamber, the photo system 144–147 and 330 will give a visual signal and proper adjustment of the speed of the supply reel will take place. In the event the loop assumes the shortened condition of loop 50a, allowing the photocell 148 to be actuated, the recorder shuts off. In the event either loop reaches a point opposite the light sources 142, the photocells 149 are de-energize, and the recorder is again shut off.

III. Control Panel

Figure 10:
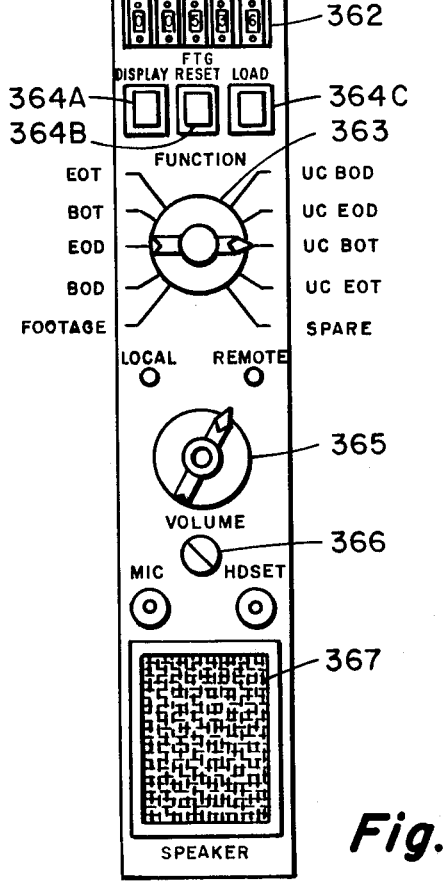
FIG. 10 is a front elevational view of the control panel for the transport of FIG. 2.

Referring now to FIG. 10, the various switches, controls and actuators of the control panel 7 of FIG. 1 (shown at 28 on the cabinet of FIG. 2) are illustrated. At the top of the control panel there are ten individual speed selection switches 350. Each switch includes a pushbutton 351 and an LED indicator 352 to indicate the current selected speed. As indicated in the drawing, separate switches are available for selecting speeds of 15/32 ips, 15/16 ips, 1⅞ ips, 3¾ ips, 7½ ips, 15 ips, 30 ips, 60 ips, 120 ips, and 240 ips. The system is also capable of a tape speed of 320 ips slew rate in the Fast Forward and Fast Reverse modes, as will be described.

Beneath the speed selection switches are six Mode Selection Switches, shown at 353. These switches are labeled respectively "STOP", "FF" for fast forward, "FR" for fast reverse, "REC" for record, "FWD" for forward, and "REV" for reverse. Depressing the FWD or REV pushbuttons causes the system to playback recorded data. If the record button is pushed immediately after either the forward or reverse pushbuttons are released, the system will record. Fast forward and fast reverse are used for actuating the drums to the transport mode, and causing the tape to be wound either on the takeup reel or the supply reel at the slew rate of 320 ips.

A switch designated 354, when actuated, causes the tape to move to the footage count stored at the BOD (Beginning of Data) location. This switch is designated "TO DATA". A "CAL" switch 335 is used in conjunction with the data monitoring sub-system to record a calibration signal on the tape. The pushbutton 355 must be depressed continuously for such recording.

Beneath these switches are four "ENABLE" switches generally designated 356 and labeled TS (356A), EOT (356B), SHTL (356C), and SEARCH (356D). The ENABLE TS switch 356A enables a reference timing signal previously recorded on the tape to control the speed of the capstan servo system (to be described) during the reproduce or playback mode. Fluctuations or perturbations of capstan motor speed may be reduced if a reference signal is recorded at the same time as data, and then used during playback. Any fluctuations in capstan speed during record will thus be reproduced accurately during playback, so the recorded signal appears to have been recorded at constant tape speed.

The four ENABLE switches operate as alternate action switches, and if the ENABLE TS switch is off, the reference timing signal on the tape is not used. By "alternate action switches" it is meant that each successive pushing of the switch toggles the function between the on and off states under control of the CPU.

The ENABLE EOT switch 356B is used to cause the system to execute User Commands at End of Tape (EOT) or Beginning of Tape (BOT) if such commands have been previously programmed or entered into the system, as will be described. The ENABLE SHTL (shuttle) switch 356C enables the programmable shuttle feature, to be described, the ENABLE SEARCH switch 356D allows the tape to remain against the transducer heads during a slew mode and changes the tape speed to 240 ips regardless of the speed set by the operator.

Beneath the ENABLE switches 356 is a power switch 357 which applies primary power to the system.

A ready switch 358 is used to command proper positioning and tensioning of the tape when activated prior to initiation of any transport operation, as discussed below in Section 7A. When not activated, it is used to disable the reel drive servos and the vacuum system to facilitate threading tape. It is also an alternate action switch.

Three indicators 359, 360 and 361 are used respectively to indicate that the capstan speed has reached the speed set by the switches 350, that the capstan speed is being controlled by a reference signal recorded on the tape (actuated by the ENABLE TS switch 356A), or that an alarm condition exists.

Manually actuated data entry switch means 362 comprises five individually settable binary coded decimal switches indicating their positions. It is used to load either data or command signals by the operator into a storage location determined by a function switch 363. The data entry switch 362 displays numerical data, but, as will be understood from subsequent description the numerical data may represent a number (data), such as footage, or it may represent a command code, depending upon the position of the function switch 363. For example, if the function switch 363 is in the BOD position, the contents of the data entry switches 362 after storage by the operator in the CPU will be used to define the footage location for Beginning of Data. On the other hand, if the function switch 363 is at the UCBOD (indicating User's Command at Beginning of Data), the numerical information in the data entry switch 362 (lowest order digit only in this case) will be representative of a command which will be stored in the CPU by the operator and be executed by the system when the tape reaches the BOD position.

A display pushbutton 364A causes the contents of a storage location, as selected by the function switch 363, to be displayed in the numerical display 31 adjacent the control panel 28 of FIG. 2.

A load pushbutton 364C causes the contents of data entry switch 362 to be sent to CPU storage locations determined by the function switch 363. A footage reset pushbutton 364 causes the contents of the FOOTAGE memory locations to be set to zero regardless of the position of the function switch 363.

Since the system has the capability of being remotely controlled, a rotary switch 365 is used to select whether the local control panel, a remote control unit, or both are being used to control the system. The control panel also includes a volume control 366 and a speaker 367 over which a voice track on the tape may be produced.

IV. CPU/Tape Transport Interface

Figure 11:
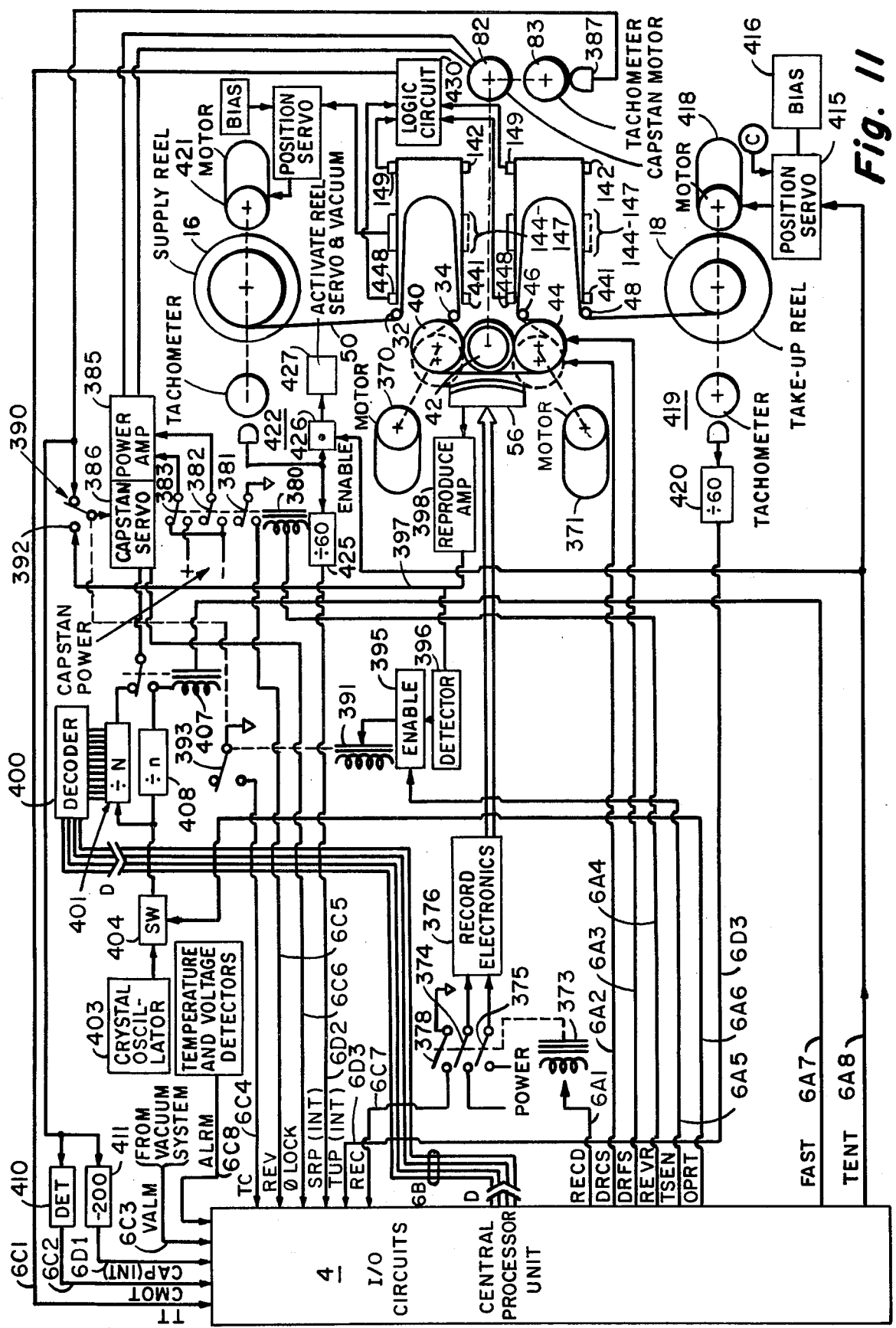
FIG. 11 is a diagrammatic view, partly in functional block form and partly in circuit schematic form, of the principal control elements of the tape transport system and the interface with the Central Processor Unit.

Referring now to FIG. 11, various elements of the tape transport and vacuum systems are shown in diagrammatic form with reference numerals corresponding to the structural elements already disclosed. The tape 50 is shown as trained around the roller 32 into the upper vacuum chamber 310, around the roller 34, and in major wrapping engagement with drums 40, 44. The drums are shown in the two capstan-engaging positions. The tape span between the drums in the transport position is shown in solid line, and for the read position, it is shown in dashed line, being in operative relationship with the transducer 56. The upper drum 40 is positioned by means of a first reversible dc torque motor 370 (which is connected to the previously described crank shaft 100 for that drum) after the position of the control drum 44 is determined by a similar motor 371.

The positioning of the drums in the read or transport positions is determined by the signals DRCS or DRFS respectively which are fed from the I/O circuits 4 (commonly referred to as peripheral interface adapters) of the CPU 1 along the previously described bus 6A. In FIG. 11 these lines are designated respectively 6A2 and 6A3. The signal DRCS actuates the motor 371 to place the control drum 44 in the read position which, in turn, by means of the microswitches 260, 262 described above, causes the motor 370 to place the slave drum 40 in the read position. Similarly, the signal DRFS fed along bus line 6A3 causes the drums to be placed in the transport position. If both signals are absent, the drums are placed in the previously described idle position.

A signal RECD is transmitted from the CPU along a line 6A1 to energize a relay 373 which, through a first pair of normally open contacts 374, 375 couples input power to the record electronics 376, which may comprise conventional circuitry, and has its output coupled to the transducer 56. A third set of contacts 378 closes to supply a ground signal along a bus line 6C7 (corresponding to one line of the previously described bus 6C of FIG. 1) back to the CPU. This monitor signal is designated REC, and, of course, indicates the power is being supplied to the record head drivers.

A slide drawer (behind panel 12) contains thirty-two slots for dual analog direct/FM record amplifiers or digital encoders. Each dual record amplifier is switch-selectable between direct or FM and programmable with switches for IRIG bandwidths including low, intermediate, and wideband group I. Wideband group II may be provided with component changes. Front panel controls and indicators display the status and operation of each active channel. Channel operating controls and indicators include: DIRECT and FM LED indicators, INPUT MONITOR RECORD LEVEL SET, and an alignment LED. The reproduce amplifiers are also located in slide mounted drawers, each containing slots for sixteen channels of analog direct and FM reproduce amplifiers or digital decoders. Each reproduce amplifier contains direct amplitude and phase equalization networks for all ten tape speeds. A FM detector module houses eleven FM filters and contains an IRIG FM density selector necessary for low, intermediate, and wideband group I IRIG bandwidths. The two modules provide for ten speeds of operation for direct and FM signals without manual component changes.

Separate modules contain the head drivers for the record amplifiers and the preamplifier for the reproduce amplifiers. Each head driver is equipped with an on/off bus to provide programming for normal recording, selective voice track, or selective channel recording. Bias is available to each head driver for either direct or voice recordings. A FM carrier/bias record mode is optionally available.

A signal REVR is sent from the CPU along a line 6A4 to energize the coil of a relay 380. The relay 380, through a first set of contacts 381 supplies a ground signal along line 6C5, which signal is designated REV, and is indicative of the transport's operating in the reverse mode. Second and third sets of contacts 382, 383 are actuated when the relay 380 is energized to reverse the polarity of a source of electrical power to a power amplifier 385 which is controlled by a capstan servo 386, and is used to drive the capstan motor 82, which is a high-torque, low inertia DC motor having a speed responsive to the repetition rate of input pulses.

The feedback input pulses of the capstan servo 386 are received from a pickup 387 associated with the tachometer 83 of the capstan motor, and they are coupled to the capstan servo 386 through a set of normally closed relay contacts 390 which are controlled by a relay coil 391. When the relay 391 is energized, the contacts 390 open, and a contact 392 is connected to the feedback input of the capstan servo. The relay 391 also actuates a set of normally open contacts 393 to generate a ground signal along the line 6C4 to the CPU, which signal is designated TC and indicates that the speed of the capstan is being controlled by a reference signal on the tape, as distinguished from the feedback pulses from tachometer 83.

In order to cause the transport to operate in this mode, a signal TSEN (for "Tape Sync Enable") is transmitted from the CPU along a line 6A5 to an input of an enable circuit 395. A second input on the enable circuit 395 is received from a detector 396 which senses whether a reference signal is present on a line 397. The line 397 is fed by a reproduce amplifier 398 from the transducer 56 and is used to reproduce the reference signal from the tape, if it is present. The line 397 is also connected to the normally open contacts 392, and fed to the capstan servo 386 if the relay 391 is energized. Thus, the relay 391 is energized in response to the command signal TSEN, but only if the reproduce amplifier 398 generates a reference signal, as detected by the detector 396.

When the operator desires to set the speed of the tape, he presses one of the speed selection switches 350 (FIG. 10), and the information is communicated to the CPU in a manner to be described. The CPU then sends a coded set of signals along the parallel 4-bit bus 6B to a decoder 400.

The signals fed along the speed select bus 6B are in hexadecimal code, only ten positions of which are used corresponding to the ten predetermined speeds at which an operator is capable of running the transport. The decoded output of decoder 400 is coupled to a Divide by N circuit 401, the input of which is received from a crystal oscillator 403 by means of a switch 404. The switch 404 is actuated by a signal OPRT fed from the CPU along line 6A6.

The oscillator 403 generates a primary clock signal the repetition rate of which is divided by the circuit 401 (if relay 407 is not energized), as determined by the decoded output of the decoder 400. The relay 407 is energized by a signal FAST fed from the CPU along a line 6A7.

If the relay 407 is energized, the output of the crystal oscillator is divided by a smaller number in a circuit designated "Divide by n" and designated 408 which energizes the capstan motor to drive the tape at the slew rate of 320 ips. The output of the wiper arm of the relay 407 is coupled to the reference input of the capstan servo 386 and is used to determine the drive speed of the capstan motor 82. If the signal input from the tachometer pickup 387 (representative of actual capstan speed) is equal to the reference signal input (either from divider 401 or divider 408) a signal ΦLOCK appears on line 6C6. This signal, when present, indicates that the capstan motor is operating in a phase locked condition.

In summary, the capstan servo 386 and power amplifier 385 form a velocity servo to control the speed of motor 82 to cause the frequency from the tachometer 83 (or from the reproduce electronics 398) to equal the frequency of the signal generated by "Divide by N" circuit 401 at the operator-selected speed or "Divide by n" circuit 408 at the slew speed. Of course, if switch 404 is not actuated, no pulses are present at the output of circuits 401 or 408 and capstan motor 82 decelerates to stop, at which time no pulses will be received from tachometer 83.

The signal from the tachometer pickup 387 sensing speed of the capstan motor 82 is also coupled directly to a detector circuit 410 and a Divide by 200 circuit 411. The detector circuit 410 senses pulses from the pickup 387 and generates a logic signal designated CMOT along line 6C2 (one line of the monitor bus 6C of FIG. 1) to the CPU. This signal indicates that the capstan is in motion.

The divider circuit 411 generates a pulse for each 1/100 feet of tape travel. These pulses are sent to the CPU as interrupt signals designated CAP along a line designated 6D1, forming part of the previously described Interrupt Bus 6D of FIG. 1.

Turning now to the reel drive systems, a signal TENT is transmitted from the CPU along a line 6A8 to a position servomechanism 415 which receives a bias input 416 and also receives an analog signal from the solar cell photodetector 330 in the lower vacuum chamber. The signal TENT provides an enable signal for the position servomechanism 415 to drive a motor 418, the output shaft of which drives the takeup reel 18.

A tachometer 419 generates pulses representative of the angular velocity of the takeup reel 18 and these pulses, coupled through a Divide by 60 circuit 420 provide interrupt pulses designated TUP to the CPU along the Interrupt Bus line 6D3. A similar closed loop servomechanism drive is provided for the supply reel 16, by means of a separate drive motor 421. A tachometer 422 sensing angular velocity of the supply reel 16 generates a train of output pulses which are coupled through a Divider by 60 circuit 425 to provide an interrupt signal SRP to the CPU along Interrupt Bus line 6D2. The signal TENT, together with the output signal of the supply reel tachometer 422 are coupled to an enable circuit 426, the output of which is used to activate the reel servomechanisms and the vacuum system, as functionally indicated in block 427.

The interrupt signals TUP and SRP contain a pulse for each revolution of the associated reel (take-up or supply). These signals are used, in a manner to be described, for determining the End of Tape positions bu comparing them, in the CPU with the pulses CAP on line 6D1 which are representative of capstan angular velocity. As will be described, by comparing these pulses, a ratio can be obtained which is independent of operating speed but which is a true indicator of the diameter of the tape pack remaining on the respective reel. This method permits the operator to change the EOT Position through a simple setting of the data entry switches 362, in combination with the function switch 363 and load pushbutton 364C, and without having to make any mechanical setting or adjustment.

The output signals of the individual photodetectors 148, 149 for both the upper and lower vacuum chambers are coupled to a logic circuit 430 which generates an output signal TT fed to the CPU along status bus line 6C1 when both tape loops within the respective vacuum chambers are within the prescribed limits defined above—namely, the light path between source 141 and detector 148 is interrupted, and the light path between source 142 and detector 149 is not interrupted. This signal indicates that the tape is properly tensioned.

Another status signal is coupled from the vacuum-generating motors (not shown) along a line 6C3 to the CPU indicating, when present, that the vacuum system is not operating. This signal is designated VALM.

A final status signal (ALRM) generated by various temperature sensors and voltage limit detectors is coupled to the CPU along line 6C8, indicating, when present, that monitored heat sink temperatures are too high or that monitored power supplies are operating outside of previously set limits.

V. Control Panel/CPU Interface

Figure 12:
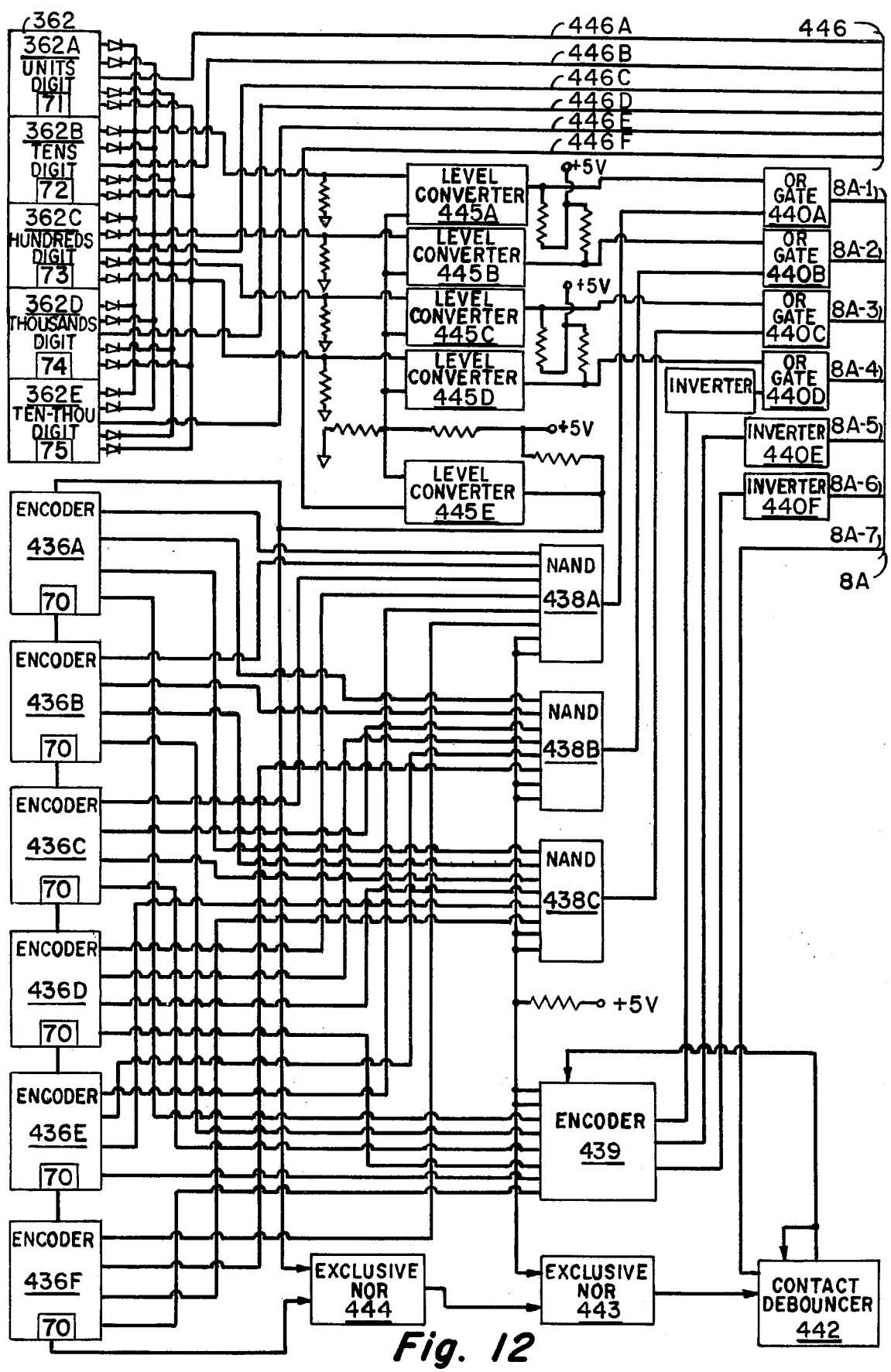
FIG. 12 is a logic schematic diagram of the interface from the Control Panel to the Central Processor unit.
Figure 12A:
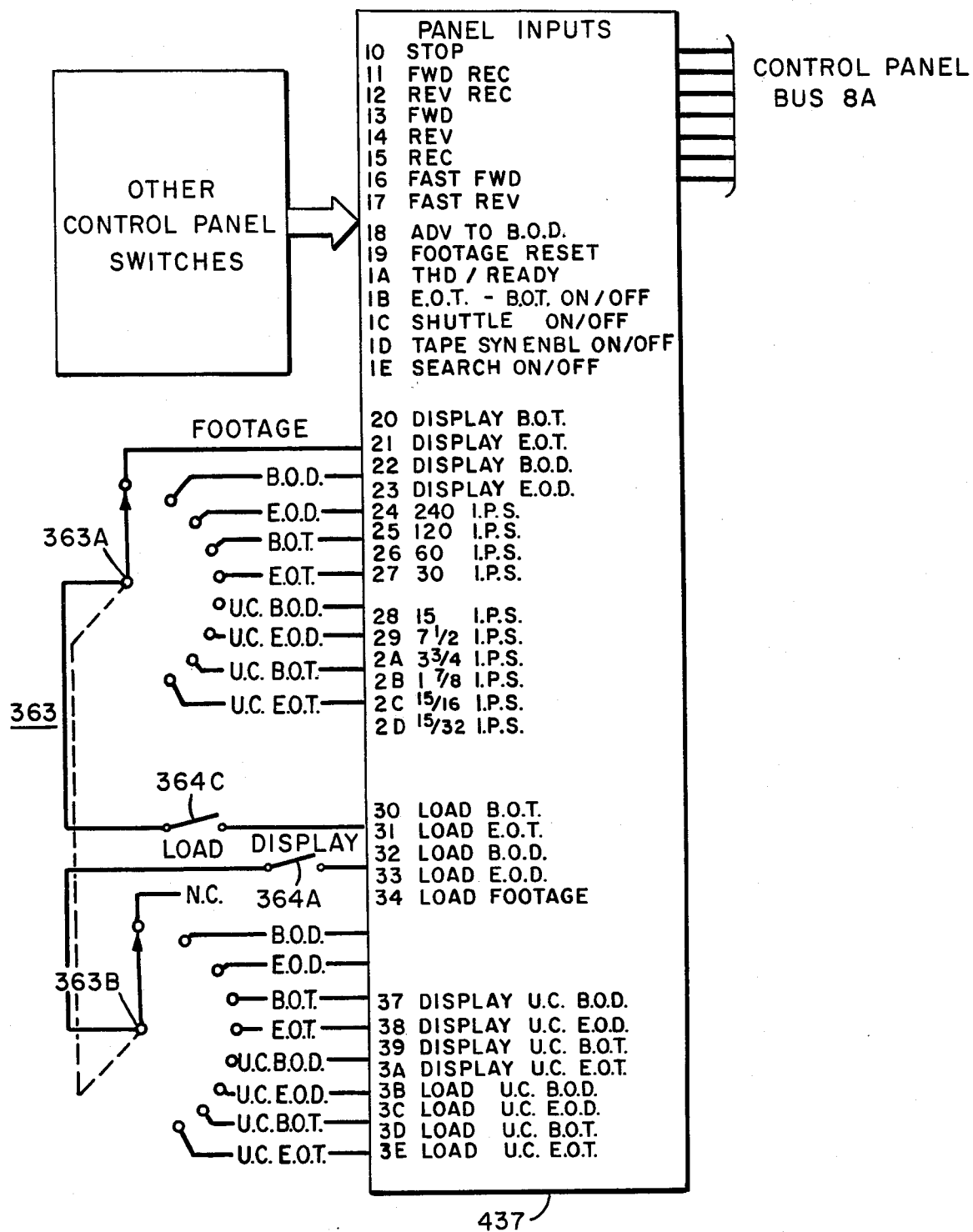
FIG. 12A is a diagrammatic view showing the signals at the Control Panel and the corresponding code transmitted via an Interface Bus.

Referring now to FIG. 12A, the function switch 363 is seen to be a multiposition, rotary selector switch having first and second decks 363A and 363B. The decks are mechanically ganged together, and each deck has at least nine positions, as indicated. The wiper arm of the deck 363A is connected in series with the LOAD switch 364C, and the wiper arm of the deck 363B is connected in series with the DISPLAY switch 364A. The outputs of the function switch (in combination with the LOAD and DISPLAY switches) together with the outputs of the other control panel switches are encoded into the hexadecimal code indicated in block 437. This code is presented to the data lines designated 8A1-8A6 (FIG. 12) of data bus 8A (FIG. 1) as subsequently described.

Each encoder (which may be part number 74LS148 of Texas Instruments) 436-436F has eight inputs connected to a normally open single-pole, single-throw switch arranged to ground its associated input when actuated, except for the inputs connected to the function switch 363 which is arranged to ground a selected input when either the LOAD or DISPLAY switch is actuated. If a specific encoder 436 is enabled (as subsequently described below) a switch actuation on its input will generate a three bit digital code on its output lines and a strobe signal on the fourth output. In addition, a disable signal is generated on the fifth open (last) output line whose function will be described later.

The first four output lines mentioned above assume a logical "1" state and the fifth a logical "0" state if none of the switches associated with the encoder are actuated.

Upon actuation of a switch associated with an encoder, the first three output lines will individually switch to a 0 or remain at a 1 state that is indicative of which of the eight inputs were grounded. The first output line of all encoders is fed to an individual input of NAND gate 483A, the second similarly to NAND gate 438B, and the third similarly to NAND gate 438C. These NAND gates invert each of these three encoder outputs and feed them to three lower inputs of OR gates 440A-440C. The three upper inputs of these OR gates (as will be described later) are set at a logical "0" level; therefore, the three lower inputs are communicated to data lines 8A1-8A3 forming the three last significant bits of code presented to bus 8A.

The fourth output line of encoders 436 is changed from a 1 to a 0 logic, if any switch connected to that encoder's input is activated. All of the fourth outputs are connected to individual inputs of encoder 439. The immediately previously stated logic "0" level on the input of encoder 439 when enabled generates a three-bit code on the three outputs of encoder 439 indicative of which one of the six encoders 436A-436F is generating the three least significant bits of the codes present on lines 8A1-8A3. The first of these outputs is communicated by an inverter to the lower input of OR gate 440D whose upper input is at a "0" logic level, thereby generating a fourth bit of a code on line 8A4. The second and third outputs of inverter 439 are inverted by inverters 440E and 440F respectively, thereby supplying the fifth and sixth bits of code to lines 8A5 and 8A6 respectively.

It should be noted that because of the nature of encoders 436A-436F, multiple simultaneous contact closures on the input of one encoder will yield a code on its output representative of only one of the contact closures, that being the one of higher priority. In addition, as subsequently described, a priority exists among encoders 436.

Contact debouncer 442 provides at one of its outputs an enable signal to encoder 439 after responding at its input to an indication that one of its encoders 436 has been activated. Thus, decoder 439 transfers its encoded output to lines 8A4 to 8A6 only after the contact debouncer 442 has performed its function and eliminated possible errors from spurious contact bounce signals.

Shortly thereafter another output of 442 provides an interrupt signal CPU on line 8A7. The CPU is programmed to read the data present on lines 8A1 through 8A6 on the occurrence of this interrupt signal. Contact debouncer 442 receives its input from EXCLUSIVE NOR gate 443 having one of its inputs at logic 1 (due to its input being tied to +5 volts) and its other input being fed from EXCLUSIVE NOR gate 444.

EXCLUSIVE NOR gate 444 is fed by the output of level converter 445E and encoder 436F. Encoders 436 are connected to each other so that if one has not been actuated it will send the enable signal to the next. More specifically, the output of level converter 445 is connected to encoder 436A. If the latter has not been activated by the operator, it will enable encoder 436B which will perform the same function all the way through the chain of encoders 436F. The output of the latter combined with the output of circuit 445E (which is normally at the same logic level as discussed in further detail below) causes EXCLUSIVE NOR gate 444 to be in a state indicative of no operator initiated encoder activity. Should, however, any of the encoders 436 be activated, the chain of signals is broken and the output of 436F to 444 will change thereby changing the state of EXCLUSIVE NOR gate 444. This change of state is detected by the contact debouncer 442 which then performs the above-described function.

Turning now to the upper left hand corner of FIG. 12, the data entry switches 362 comprise five individual digit switches designated respectively 362A-362E, in order of increasing significance. Each switch may be a pushbutton-controlled switch with a numeric indicator (see FIG. 10) which, when enabled, present on its four output lines, a binary-coded decimal representation of the number to which the associated switch has been preset manually. These switches are strobed sequentially from the highest order switch 362E (representing the ten thousands digit) to the lowest order switch 362A (the units digit). The four outputs of each switch, with corresponding outputs tied together, are connected to the plus inputs of amplifiers used as level converters and designated respectively 445A-445D. The negative inputs of converters 445A-445D are connected to a reference voltage. A fifth level converter 445E has its positive input connected to a reference voltage, and its negative input connected to a line designated 446F, and comprising one line of a six-line bus 446, received from the lower left hand portion of FIG. 13 to be described in more detail presently.

Figure 13:
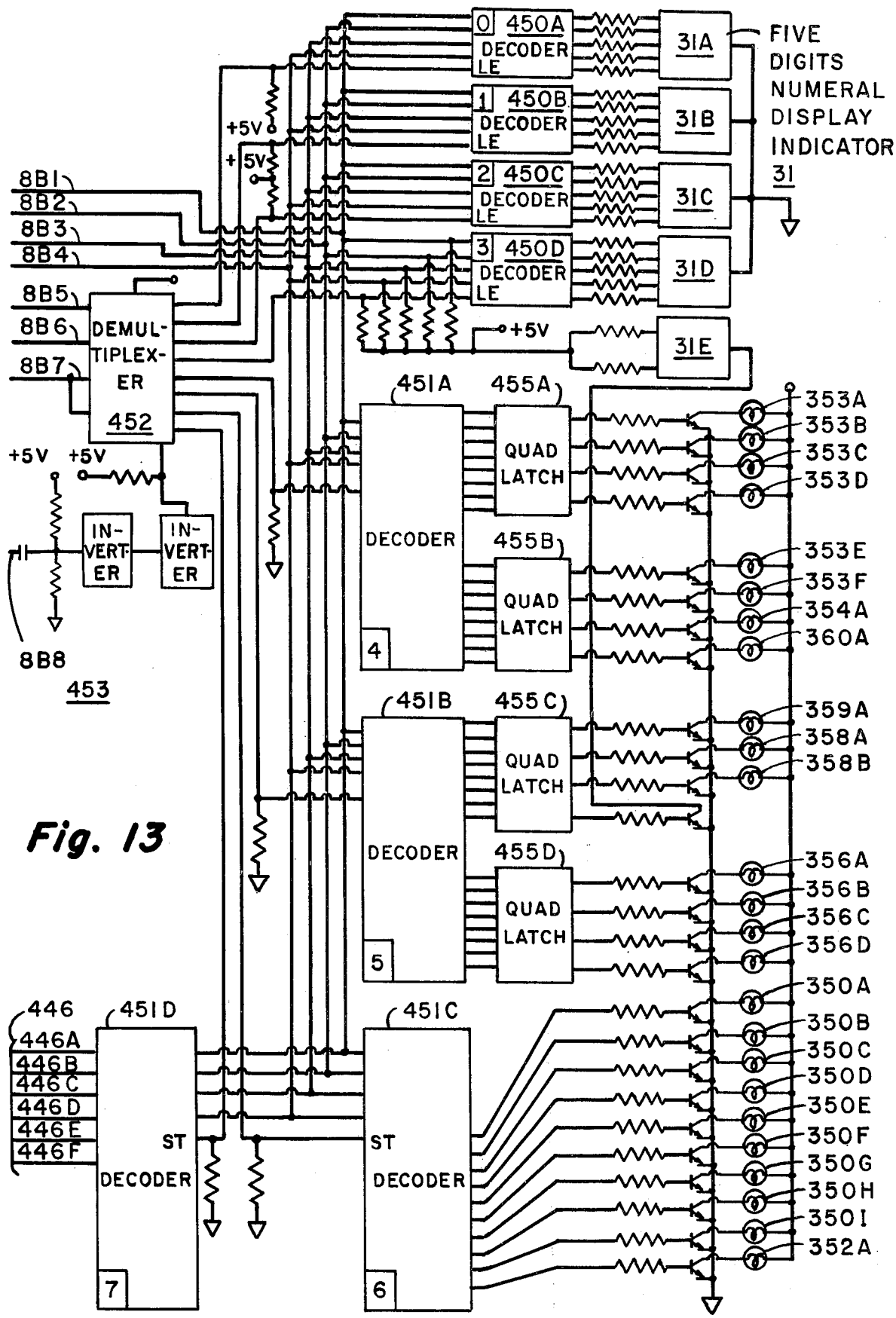
FIG. 13 is a logic schematic diagram of the interface circuitry between the Central Processor Unit and the control panel.

Referring now to FIG. 13, and particularly the upper left hand corner, the command data bus 8B in FIG. 1 from the CPU to the control panel comprises seven data lines designated respectively 8B1-8B7 and one strobe line designated 8B8. The data received from the CPU is in hexadecimal code. The four lines 8B1-8B4 are connected along a common bus to four data inputs of four decoder circuits 450A-450D, as well as to four data inputs of four decoder circuits designated 451A-451D respectively. The decoders are addressed by the data bits on lines 8B5-8B7 which are coupled to a control demultiplexer 452. The decoders 450A-450D may be part No. 14511 of Motorola, Inc.; the decoders 451A-451D may be part No. 14514 of the same manufacturer; and the demultiplexer 452 may be part No. 14051 of the same manufacturer.

The signal on the strobe line 8B8 is coupled through pulse shaping circuitry generally designated 453 to the control input of the demultiplexer 452.

The decoded outputs of the decoders 450A-450D are connected respectively to the four lower order digits of the previously described five digit numerical display, designated 31 in FIG. 2. The individual display indicators are designated respectively 31A-31E. The ten thousands digit is blanked and unblanked (to display a one only) under program control. The first four decoders 450A-450D are addressed by the first four output lines of the demultiplexer 452 respectively. A "0" signal on the input LE for each of these decoders allows it to accept data on its four input lines; and a "1" causes it to retain the data previously accepted and to ignore further changes on the four input lines. The decoders 451A–451D are, in turn, addressed respectively by the remaining four output lines of the demultiplexer 452.

The outputs of the decoder 451A are coupled through two quad latch circuits 455A and 455B, to lamp drivers, and then to individual indicator lights (preferably LEDs) on the control panel, as designated. Similarly, the outputs of decoder 451B are coupled to actuate individual indicator lights through a second pair of quad latch circuits 455C and 455D. The quad latches may be part No. 14043 of the previously described manufacturer. Ten of the outputs of the decoder 451C are connected respectively to the indicator lamps associated with the ten different speeds at which an operator is capable of running the tape transport. For referencing each of the indicator lights to an associated switch on the control panel, each light is designated with a number representative of the associated pushbutton, followed by a letter designation.

Decoder 451D has six outputs that are used, and these are connected respectively to the bus lines 446A–446F which are described in connection with FIG. 12.

In brief, each of the decoders 450A–450D and 451A–451D is addressed by a decimal number shown in the respective decoder within a block, and representative of the decimal digit corresponding to the three bits on input lines 8B5–8B7, namely, the most significant digit of the hexadecimal code from the CPU.

VI. Operation of CPU/Control Panel Interface

Referring to FIG. 12, the data entry switches 362A–362E are used for the entry of data (numerical or command) into the system. The switches are used, together with the function switch 363 to identify what the data is and how it is to be used. The code used by the CPU to address the function switch encoders 436 and the data entry switches is indicated in the associated functional blocks by a number in a smaller block. the hexadecimal digit 7 on address lines 8B5–8B7 of FIG. 13 causes the demultiplexer 452 to enable decoder 451D. The remaining input signals, in this case, are used to address specific locations of the circuitry of FIG. 12. Specifically, the encoders 436 are addressed by hexadecimal code 70 (which transmits a signal along line 446F to level converter 445E, which, in turn, generates an enable signal sent to the encoders 436A–436F and to EXCLUSIVE NOR gate 444). The ten thousands digit switch 362E is addressed by hexadecimal 75, the thousands digit switch 362D is addressed by hexadecimal code 74, and so on as indicated. These address codes are shown within heavy blocks in the associated functional block to which the address relates.

As briefly described above, the signal on line 446F is normally at a logic "1" level. This is inverted by level converter 445E to a "0". Since the signal on line 446F is normally at the same level, encoders 436 are always prepared to detect, encode and output any function selected by the operator on the control panel. However, when data entry switches 362 are being scanned, operator-initiated signal generation at encoders 436 would produce a meaningless or erroneous signal since the encoder output would be combined with the switch 362 output. Consequently, encoders 436 are suppressed during scanning of switches 362 by changing the logic level on 446F from "1" to "0". Once scanning of switches 362 is completed the signal on line 446F is returned to its normal high level.

It will be observed that the operator enters various data, such as the location of Beginning of Data or End of Data or Beginning of Tape or End of Tape using the function switch 363, but he also enters the User Commands for the locations BOD, EOD, BOT and EOT, sometimes designated UCBOD, UCEOD, UCBOT and UCEOT respectively.

Upon the application of power to the recorder, a portion of Random Access Memory is cleared in the CPU. The CPU then clears certain registers and initializes and resets other circuits, as explained more fully in connection with the flow charts.

The CPU then sends hexadecimal code 70 to the control panel via bus 8B. The 7 on the address lines 8B5–8B7 for the address lines 8B5–8B7 selects decoder 451D. The decoded output is transmitted via bus 446 (and in particular, line 446F) to the level converter 445E, the output of which enables EXCLUSIVE NOR gate 444 and the encoders 436A–436F. Normally, after turning the apparatus on, the next operation is to press the "ready" pushbutton. This activates an input of encoder 436B generating a hexadecimal code 1A which is presented to bus 8A on lines 8A1–8A6 and after the contact debounce circuit 442 has presented a "data present" signal on line 8A7, the CPU actuates the vacuum system and the tape tensioning mechanism, described above.

Assuming that the operator wishes to enter data using the data entry switches 362, the function switch 363 will be set to the desired position, for example, Beginning of Data. By placing the function switch 363 in the BOD position and pressing the load switch 364C, hexadecimal code 32 is generated in block 437 and presented to the bus 8A as previously described.

The microprocessor decodes the information and, under program control, interprets the function code and then generates a hexadecimal code 75. This code is transmitted via bus 8B and decoder 451D to enable the digit switch 362E representing the ten thousands digit. This information, previously set by the operator, is then transmitted through the level converters 445A–445D to the OR gates 440A–440D, and to the CPU.

The code in the "load" signal from pushbutton 364C identifies for the CPU which of the five digit data signals has to be obtained from the data entry switches 362. A five digit number is used in loading footage, BOD or EOD. A two digit number is used in loading EOT and BOT. A single digit is used in loading any of the User Commands UCEOT, UCEOD, UCBOD, and UCBOT.

Specific storage locations in memory of the CPU are set aside for data from the control panel. This will be apparent from subsequent flow charts and specific code listings. However, by way of example, the speed control information from the control panel is stored in RAM location 20. ENABLE EOT, ENABLE TS, ENABLE SHUT, and ENABLE SEARCH function codes are stored in RAM location 21.

In this manner, the addressed data entry switches are scanned in order of decreasing significance. After the lowest order switch 362A is read by the CPU, a hexadecimal code 70 is again transmitted to re-enable the function switch encoders 436.

It will be observed that six data lines 8A1–8A6 and "data present" line 8A7 are used to transmit the outputs of the encoders 436, but only four lines 8A1–8A4 are used to transmit the information from the data entry switches.

In summary, the circuitry of FIG. 12 is used for interrogating the Data Entry Switches by the CPU and for encoding this data, transmitting it to the CPU, and for encoding and transmitting information from the function switches to the CPU. In the latter case, the strobe pulse is used on the "data present" line to interrupt the mainline program and indicate to the CPU that data is available.

Returning now to FIG. 13, as indicated above, the information on bus lines 8B5-8B7 is decoded in the demultiplexer 452 to address the decoders 450A-450D and 451A-451D. The decoders 450A-450D are BCD to seven-segment latches for displaying the numerical data. The outputs of the decoders 451A and 451B are also fed to latches 455A-455D. These latches are used to maintain an indicator in the illuminated state even though an adjacent indicator may be illuminated by the same decoder. An indicator is de-energized by sending the next higher hexadecimal number from the CPU. Several indicators associated with a single decoder may have to be illuminated simultaneously, thereby requiring latches 455. This is not true, however, for the indicators representing tape speed, so the decoder 451C does not have to feed latch circuits.

The numeric display indicator 31 is normally fed with information indicating footage by the CPU. If, however, the DISPLAY switch 364A is actuated on the control panel, it, in combination with a selected function switch position (such as EOT), will display stored information representative of End of Tape. In this way, the operator can retrieve information indicative of the BOD, EOD, etc. locations, as well as the Users Codes at these various locations. In these situations, the "data present" interrupt on line 8A7 will cause the CPU to react to the corresponding code by addressing the storage location (EOT, for example) rather than the "footage" storage location and then transmit the coded numeric information to the display units 31A-31E.

VII. Overall System Operation

Reference will now be made particularly to FIG. 11 and to other figures as will facilitate an explanation of system operation.

A. START UP

After the tape has been trained from the supply reel around the roller 32, through the entrance and exit slots of the upper vacuum chamber 310 and the roller 34, it is placed around the tape-carrying surfaces of the drums 40, 44, and thence around the roller 46 through the entrance and exit slots of the lower vacuum chamber, around the roller 48, and under the takeup reel 18. The tape is normally tight in the vacuum chambers (that is, the photodetector 148 is illuminated). In this condition, signal TT is not present.

The operator then pushes the READY pushbutton 358 (FIG. 10). An interrupt signal is present on the bus line 8A7 (FIG. 12), and the CPU is interrupted and reads the code present on lines 8A1-8A6. The CPU then generates the signal TENT on line 6A8 of FIG. 11. At this time, the supply reel is not driven by the motor 421 because the gate 426 is not enabled (due to the fact that no pulses are being sensed by the supply reel tachometer 422).

The takeup reel motor 418 is driven open loop until the tape is drawn out of the vacuum chambers 310 and from the supply reel 16. As soon as the supply reel begins to move, its tachometer 422 generates a pulse, thereby enabling gate 426 which, in turn, couples the TENT signal to actuate the reel servos and vacuum system, block 427.

When the vacuum system is operated and the supply reel servo system is energized, it is possible for the supply reel 16 to meter tape into the vacuum chambers until the proper loop length is attained. All of this occurs with the drum positioning motors 370, 371 de-energized and the drums 40, 44 in the idle position. When the tape loops are such that the position detectors 330 indicate the loops are in the desired position, the logic circuit 430 generates the signal TT which is transmitted back to the CPU via line 6C1.

If the signal TT is not received by the CPU within a predetermined time (six seconds), as defined by a program delay, TENT signal is removed. The initial procedure may be repeated.

When the CPU detects the presence of TT, it illuminates the indicator associated with the "READY" pushbutton 358, and it also illuminates the indicator associated with the "STOP" pushbutton, one of the group designated 353. The STOP indicator is turned off whenever tape motion is called for.

In summary, when the operator presses the READY pushbutton, the CPU detects a coded signal on bus 8A (FIG. 12) and sends the signal TENT (along bus 6A, FIG. 11) to tension the tape. The CPU then initiates a six-second delay between the generation of TENT and the time in which the signal TT (which indicates proper tensioning of the tape) is expected to be received. If the system has not achieved proper tension within the programmed delay time, TENT signal is removed, and the READY indicator is not illuminated.

B. SPEED SELECTION

Assuming now that the operator selects a tape speed by pushing one of the pushbuttons 350, the CPU receives the information by means of the circuitry of FIG. 12 and stores in memory location 20 the desired speed and sends it to the transport provided the speed change lock is not set. After a direction is also specified (foward or reverse), the CPU then transmits a code along bus 6B (FIG. 11) representative of a programmed speed of 15/32 ips. These signals are fed to the decoder 400 and thence to the Divide by N circuit 401. At the same time, the CPU transmits the signal OPRT along line 6A6 to the switch 404, thereby communicating the oscillaotr 403 with the Divide by N circuit 401. The output of the Divide by N circuit 401 is coupled to the capstan servo 386 which causes the capstan 42 to be driven at the programmed speed prior to the time that the drums are in driving engagement with the capstan.

The reason for driving the capstan at a programmed, low speed prior to engaging the drums is that the preferred puck surface 77 (FIG. 5) of the capstan is a high friction, polyurethane resin. If the drums are brought into driving engagement with the capstan while the capstan is not in motion, a "flat" may be formed on the polyurethane puck surface. Since this type of material has "memory", even though the "flat" may last for only one hundred inches or so of tape motion before it is eliminated, it may nevertheless cause flutter.

In summary, the present system causes the capstan to be driven at a programmed slow speed before the drums are engaged, and the programmed speed is independent of the speed selected by the operator. This is under program control by the CPU.

When the capstan has reached the programmed speed, the signal $\phi$LOCK is transmitted from the capstan servo (the signal is internally generated) along bus line 6C6 to the CPU. The CPU, in turn, then transmits either signal DRCS or DRFS along lines 6A2 or 6A3 respectively to cause the drum positioning motor 371 for the control drum 44 to place the control drum in driving engagement with the capstan 42, by means of the crank shaft 100, described in connection with FIGS. 4–6. The transport mechanism, as described above, causes the slave drum 40 to follow the control drum after the control drum is in operative engagement (specifically, after the hub 192 has engaged either adjustable stop 286 or adjustable stop 288, and microswitch 260 or 262 has been actuated.

Commencing with the generation of signal DRCS or DRFS, a program delay is initiated by the CPU sufficient to enable both drums 40, 44 to be brought into driving engagement with the capstan 42 as just described. Following the program delay, the CPU transmits the desired speed select data along speed select bus 6B to the decoder 400. The capstan servo 386 will thereupon cause the capstan motor 82 to accelerate until the repetition rate of the signal at tachometer 387 again equals the repetition rate of the divided crystal oscillator signal, at which time the capstan servo will again generate the signal $\phi$LOCK and transmit it along line 6C6 to the CPU.

C. FORWARD/REVERSE

When the REVERSE pushbutton is actuated, (as will be more completely explained in connection with Flow Chart NN), the system first checks to see whether the tape transport is already operating in the reverse mode; and if it is not it goes to a subroutine STOP (Flow Chart KK), which subroutine is also entered if the STOP pushbutton had been actuated or if the FORWARD pushbutton had been actuated and the transport were operating in the REVERSE mode. This subroutine disables any of the following signals that may be present: FAST, RECD, TSEN, and DRCS (FIG. 11).

If the capstan had been operating in the FORWARD mode, the CPU transmits the programmed speed (15/32 ips) to the tape transport along the bus 6B to slow down the drums and the tape, and the signal DRCS to position the tape against the heads. The CPU then initiates a delay so that the current phase lock "ON" condition does not effect operation. When the signal $\phi$LOCK for the programmed speed is received by the CPU, the signal DRCS is disabled. This removes torque from the crank shaft motors 370, 371 and permits the drums to move to the idle position in which they are disengaged from the capstan 42. As indicated in connection with FIGS. 4 and 5, the crank shafts and drums are normally biased to the idle position by the springs 208, 210, 214 and 216.

After a suitable programmed delay, to insure the drums are no longer in contact with the capstan surface, the signals REVR (if on) and OPRT are disabled, thereby permitting the drums and capstan to come to a complete stop. The CPU checks to see whether the capstan is in motion (signal CMOT), and if it is, a further delay is induced by the CPU. If the capstan is not in motion and the system is at a complete stop, in the case of entering the REVERSE mode, the CPU transmits the signal REVR to energize the reverse relay 380 which, by means of the contacts 382, 383, reverses the polarity of power to the power amplifier 385 driving the capstan motor, thereby causing the capstan motor to operate in the reverse direction. At the same time, the CPU transmits the OPRT signal on bus 6A and data along the speed select bus 6B commanding operation at the programmed speed (15/32 ips).

The relay 380 also causes contacts 381 to transmit the signal REV to the CPU indicating that the transport is operating in the REVERSE mode. The signal REVR may also be used, if necessary, to adjust the supply voltages to the two reel drive motors 421, 418 to equalize the required output torque depending upon whether the system is operating in the FORWARD or REVERSE mode. That is to say, more output torque may be required on the reel drive motor that is taking up the tape then is required on the motor that is metering it out. The supply voltage may be made greater on the motor taking up the tape by means of the signal REVR, and the supply voltage on the motor that is metering out the tape may be correspondingly reduced.

In order to bring the tape transport to the desired speed in the REVERSE mode, the CPU transmits the programmed speed along the speed select bus 6B, and when the signal $\phi$LOCK is received on line 6C6, the CPU transmits the desired speed set by the operator, again using bus 6B. The capstan motor is then accelerated in the reverse direction until it achieves the set speed, and the signal $\phi$LOCK is again transmitted to the CPU.

D. RECORD

In the RECORD mode, the operator would have pushed either the FORWARD or REVERSE pushbutton, then the RECORD pushbutton (all within the group 353 on FIG. 10). After the capstan reaches synchronous operation ($\phi$LOCK) at the programmed speed (15/32 ips), the CPU transmits the signals DRCS to engage the drums with the capstan in the read position. The CPU then transmits the data representative of desired operating speed along the bus 6B as described above, and after accelerating the capstan and drums, and achieving synchronized operation again, the CPU generates a signal RECD and transmits it to the tape transport along line 6A1. This signal energizes the record relay 373 which energizes the record electronics 376, and at the same time, transmits the signal REC along line 6D7 back to the CPU indicating that the system is in the record mode.

It will be observed that the RECORD operation may be effected independently of the direction of tape movement (forward or reverse).

During acceleration to the desired speed in forward or reverse record, the CPU generates a signal to turn on and turn off the RECORD indicator causing it to blink until phase $\phi$LOCK has been received by the CPU at which time the CPU causes the record indicator to remain illuminated.

E. FAST FORWARD/FAST REVERSE

It will be observed that there are four mode selector switches 353 corresponding to FAST FORWARD, FAST REVERSE, FORWARD and REVERSE. However, there are only three control signals sent from the CPU to the transport to achieve these controls—namely, OPRT, REVR (the absence of which causes forward capstan motion), and FAST.

To achieve operation in the FAST FORWARD mode, the CPU determines in which direction the capstan is currently operated. If the capstan motion has to be reversed, the capstan is first brought down to the programmed speed as indicated above, the drums are disengaged and placed in the idle position, and then the capstan is stopped. The subroutine STOP1 (Chart LL) is used in this mode as well as other modes to reverse the direction of the capstan.

After the capstan is stopped, the polarity of voltage to the capstan motor is reversed, and the capstan is brought up to the programmed speed in the desired direction. When phase lock is achieved, the FAST signal is transmitted from the CPU on line 6A7 to energize the fast relay 407 to cause the output repetition rate of the oscillator 403 to be divided by n, which fixes the capstan speed at 320 ips.

The FAST REVERSE mode is entered in a similar manner. That is, the CPU determines the present direction of the capstan motion, and if it has to be reversed, brings the capstan to a stop as indicated above, then brings it up to the programmed speed in the desired direction, and, after a programmed delay, transmits the FAST signal.

If the capstan does not have to be reversed, the CPU, after determining this, simply transmits the signal FAST.

F. ENABLE MODES

F1. ENABLE SEARCH

When the ENABLE SEARCH pushbutton 356A is depressed, the CPU generates signals (in BCD format) and transmits them along the bus 6B which will cause the capstan to drive the tape in motion at 240 ips with the tape in a playback position (signal DRCS). This mode is entered only if the FAST FORWARD or FAST REVERSE pushbuttons are also actuated. The CPU recognizes the ENABLE SEARCH mode, and disables the FAST signal. If the operator had actuated the FORWARD or REVERSE pushbuttons only, the system would not enter the SEARCH mode because the speed set by the operator would govern.

F2. ENABLE TAPE SYNC

The ENABLE TAPE SYNC signal (TSEN) is communicated from the CPU on line 6A5 when it is desired to control the speed of the tape from a reference signal recorded on the tape. As indicated above, this has the advantage that any perturbation in actual speed of the transport during recording will be reflected on the record of the reference signal which, in turn, may then be used to drive the tape during playback so that the same perturbation will be reflected in the drive of the transport, and thereby reduce the affects of any speed perturbation that may have occurred during recording.

The signal TSEN is fed to the enable circuit 395 which, if a signal is present from the detector 396 indicating that a reference signal is in fact recorded on the tape and being picked up by reproduce amplifier 398, energizes relay 391. Relay 391, in turn, actuates switch 390 and couples the output of the reproduce amplifier 398 directly to the capstan servo 386, causing the capstan servo to be controlled by the reference track on the tape, rather than the capstan tachometer 83. At the same time, contacts 393 return signal TC to the CPU.

F3. ENABLE END OF TAPE

If the ENABLE EOT mode is entered (sometimes referred to as ENABLE BOT/EOT since either parameter is continuously updated by the CPU depending on the direction of tape motion), the system will execute any User Command associated with EOT or BOT. If the mode is enabled and no User Command had been entered, the CPU will execute the Zero Command—i.e. STOP—as seen in Table I.

TABLE I

| USER COMMAND NUMBER | FUNCTION VS COMMAND NUMBER | | | |
|---|---|---|---|---|
| | SHUTTLE ENABLE ON | | EOT ENABLE ON | |
| | UCBOD | UCEOD | UCBOT | UCEOT |
| 0 | FORWARD | FAST REVERSE | STOP | STOP |
| 1 | FAST FORWARD | STOP | FAST FORWARD | FAST REVERSE |
| 2 | STOP | REVERSE | FORWARD | REVERSE |
| 3 | FORWARD RECORD | REVERSE RECORD | FORWARD RECORD | REVERSE RECORD |
| 4 | SPARE | SPARE | SPARE | SPARE |
| 5 | SPARE | SPARE | SPARE | SPARE |
| 6 | SPARE | SPARE | SPARE | SPARE |
| 7 | SPARE | SPARE | SPARE | SPARE |
| 8 | SPARE | SPARE | SPARE | SPARE |
| 9 | SPARE | SPARE | SPARE | SPARE |

If the ENABLE EOT pushbutton 356B is not actuated and the transport is operating in either the forward or reverse direction, the tape transport will empty a reel. This may be desired either in the FORWARD mode (some tape reels are merely kept in archives without rewinding) or in the REVERSE mode. However, as explained above, if ENABLE EOT is not actuated and the tape is in FAST FORWARD or FAST REVERSE, the CPU will disable the FAST signal at either BOT or EOT when that point is reached and send speed select signals to slow the tape to 120 ips so that the tape is passing through the transport at a lower speed when the supply of tape is almost exhausted.

The EOT signal is generated in the CPU by comparing the ratio of angular velocity of the reel being emptied (supply reel 16 in the FORWARD mode and takeup reel 18 in the REVERSE mode) to the angular velocity of the capstan motor. This is accomplished by comparing the output pulses from their associated tachometers. It will be observed that there are more capstan pulses from tachometer 83 than there are pulses from the reels. This is because the capstan has a smaller diameter. However, the repetition rate in all three cases is reduced by a divider circuit, as explained above.

The pulses from the capstan tachometer, divided by 200 in circuit 11 (namely the pulses CAP), are stored in a register in the CPU; and this register is reset each time a pulse is received from the reel being emptied (SRP or TUP respectively). Thus, the total number of pulses accumulated in the register at the time of reset is representative of the ratio of the angular velocity of the capstan to the angular velocity of the reel being emptied. This ratio is a number which is representative of the diameter of the tape pack on the reel being emptied. It will be appreciated that the signal is not a true representation of the linear feet of tape remaining because different tapes have different thicknesses. However, it is a representation of the diameter of tape pack remaining; and the present system has the advantage that the EOT position can very easily be reset under operator control, using the data entry switches 362 and the function switch 363. Prior methods of accomplishing this have required either the placing of a reflective material on the tape, removing the oxide on the tape with a solvent, or adjusting a light source-photodetector combination.

Although the program resets the register just referred to for each received SRP or TUP pulse, the CPU reads the ratio only every third resetting of the register. For reference, the register being referred to is designated register 51 on sheet S3 of line 113 of the program.

As indicated, if the EOT signal is on, and there is a User Command entered in the CPU, that command is executed. In this sense, EOT is a generic indicator to define either the End of Tape or Beginning of Tape locations, depending upon whether the supply reel or the takeup reel is being emptied. Execution of a User Command at either location will be discussed presently.

As also explained above, a User Command is a single digit number associated with BOT or EOT which may be entered using the function switch 363 (at UCBOT or UCEOT positions), the data entry switch 362 (least significant digit only) and the LOAD pushbutton 364C.

Referring now to Table I, the relationship between the User Command number that is entered by the operator and the specific function performed by the system in response thereto is shown for both modes of "ENABLE SHUTTLE" and "ENABLE EOT". For example, in the case of UCEOT, if the User Command number "0" is entered at EOT in the CPU, then the system will stop if the ENABLE EOT switch 356B is actuated and tape has reached the EOT value. As seen in the right hand column of Table I, additional functions such as "FAST REVERSE", "REVERSE", and "REVERSE RECORD" can be performed depending upon the User Command entered at EOT. The positions indicated as "spare" are capable of being used for other functions. For example, if recording electronics were used that permitted recording in the reverse direction, the user could record on one track in the forward direction, use a separate command at EOD, switch to another track and record in the reverse direction. As another example, the user could actuate a second recording system at EOD, and then stop recording on the first system at EOT, thereby providing overlap for the final portion of the recording. Further, the user could transfer recording to a second system and then run the tape off the reel on the first recorder, or operate it in fast reverse to rewind the tape.

Unless the system is placed in the ENABLE SHUTTLE or ENABLE EOT modes, the User Commands are not implemented when the tape reaches BOT or BOD in the forward direction, or when it reaches EOT or EOD in the reverse direction.

F4. ENABLE SHUTTLE

Referring to columns 2 and 3 of Table I, the flexibility of the ENABLE SHUTTLE mode will be appreciated since four User Commands are programmed at each of these locations, with the possibility of others.

The "0" User Command at BOD and EOD defines the conventional "SHUTTLE" mode of operation. That is, when BOD is reached, the system normally moves in the forward playback mode, and when EOD is reached, the system moves in a FAST REVERSE mode. If the other User Commands are employed, when BOD is reached, the system may either be run in a FAST FORWARD (User Command 1), STOP (User Command 2), or FORWARD RECORD (User Command 3).

If no other command is selected by the user and the ENABLE SHUTTLE switch is actuated, the "0" commands are used so that the system operates in the normal SHUTTLE mode.

Thus, when the "ENABLE SHUTTLE" switch 356 is depressed, the CPU continuously updates the footage count as signals are received via the interrupt signal CAP (one pulse per each 1/100 foot of tape travel). When the actual footage reaches the locations defined by the user as BOD or EOD, the CPU retrieves the User Command which the operator has indicated is to be executed, for that particular position (EOD or BOD), sets a flag indicating that a new command has been received, and proceeds to execute that command. That command is executed just as though it were received from the control panel. Specifically, the CPU generates an instruction code which is identical to the code that would have been generated if the command had been implemented at the control panel. This instruction code is used to execute the commands.

G. MISCELLANEOUS MODES

G1. ADVANCE TO BEGINNING OF DATA (TO BOD)

When the "TO DATA" switch 354 is depressed, the CPU determines whether it has to implement a FORWARD or REVERSE command (always at the fast speed) depending upon whether the footage indicated for the present location is greater than or less than the footage for BOD. The Flow Chart TT explains the operation in more detail, as will be discussed, but briefly, each time the location defined as BOD is crossed, the motion of the tape is reversed and the speed is reduced incrementally, the increments being defined by the permissible speed of the speed selector switches 350 (see the control panel of FIG. 10). Thus, if BOD is crossed in the REVERSE mode at 120 ips, the transport is caused to operate in the FORWARD mode at 60 ips, and this hunting for BOD continues until eventually the tape has stopped at the indicated position.

G2. SRP, TUP

The signals SRP and TUP, as explained above, are interrupt signals transmitted to the CUP on lines 6D2 and 6D3 respectively (FIG. 11) from the tachometers for the reel motors 421, 418. Each interrupt indicates one complete revolution of the respective reel. These signals, in combination with the contents of register 51 in the CPU (which is defined in the progam listing) determine the ratio of angular displacement between the capstan motor and the reel motor. These signals are used to define End of Tape and Beginning of Tape positions.

The End of Tape and Beginning of Tape positions can be changed by the entry of a two-digit number by means of the control panel. Specifically, the data entry switches 362 (two lowest order switches), the function switch 363, and the load switch 364C are used to enter BOT and EOT locations. These locations, as explained above, are ratios which are not dependent on motor speed and which define tape pack diameter for the reel being emptied, rather than linear footage remaining.

G3. FOOTAGE

The numerical display indicator 31 normally displays footage locations, and is continuously updated by the CPU which receives an interrupt signal (CAP in FIG. 11) for each 1/100 foot of tape displacement from the capstan motor tachometer 387. The footage data can be reset to zero by pressing the pushbutton 364B, regardless of the setting on the Data Entry switches or the position of the function switch. Further, the operator may, at any location, enter a footage representation using the function selector switch 363 (set to the position labelled FOOTAGE), entering the desired footage in the data entry switches 362, depressing the LOAD pushbutton 364C. The CPU will store the new footage indicator in the footage storage location, and thereafter, the CPU will update this number. Hence, all subsequent footage indications will be referenced to the new setting. Thus, other events of interest can be made to occur at the footage indications given in a written log or indicated on an accompanying voice track, thereby eliminating footage displacement calculations. This is considered an important advantage of the present invention.

G4. CALIBRATION

By pushing the CAL pushbutton 355, a calibration signal is recorded on the tape, provided the tape recorder is in the RECORD mode. The length of calibration burst is controlled by the length of time the switch is operated. As with other switches, a visual indicator is also provided.

VIII. Flow Charts

Referring first to Chart A, block 501, the peripheral interface adapters of the I/O circuitry are initialized. The memory is cleared in block 502. In block 503, a code is stored which turns off the indicator for ENABLE END OF TAPE, ENABLE SHUTTLE, ENABLE SEARCH and ENABLE TAPE SYNC indicators. In block 504, the indicator memory locations are cleared in a sub-routing CLIN, to be discussed presently. Blocks 505 and 506 load "READY OFF" and "ALARM OFF" in their respective memory locations. In block 507, a check is made for a valid speed code. If the speed code is valid, it is sent directly to the transport in block 509. If the speed code is invalid, the CPU loads a predetermined speed of 7.5 ips and it is sent to the machine in block 509. In block 510, the program jumps to sub-routine DECHEX for converting the Beginning of Tape and End of Tape locations (entered by the user via the Data Entry Switches, Function Switch and Load Switch described above) from decimal to hexidecimal notation, this sub-routine will also be described presently.

In block 511 the supply reel decrementer and the take-up reel decrementer are loaded in memory. In block 512, the interrupt mask is cleared so that the CPU is now permitted to be interrupted (by TUP or SRP, for example.)

In block 513, there is a jump to the main program FTOUT, the initialization routine is then exited in block 514.

In Chart B, a subroutine CLIN clears the visual indicators. Specifically, the indicators for Stop, Forward, Reverse, Fast Forward, Fast Reverse, Record, Advance To Beginning Of Data, Tape Sync and Phase Lock are cleared. In addition, this subroutine clears the RECORD flag. Blocks 516-621 disclose a loop for sequentially clearing the indicators. In block 523, the program is returned to the program location that called the subroutine via exit block 24.

Chart C describes a subroutine DECHEX which converts "unpacked" BCD numbers to "packed" BCD notation, and then to hexidecimal notation. It then adds hexidecimal 80 and stores the result in location HEX 34. The subroutine does the same for numbers in locations HEX 12 and 13 and stores the result in HEX 35. These numbers are used in End of Tape and Beginning of Tape sections of the program. Referring now to Chart D, it is a flow chart which is used to activate the indicator lamps. It does this by sending the code in accumulator A of the CPU to the Control Panel or the respective receiving location.

Chart E is subroutine DELAY which provides the required delay in the subroutine DISP of the Chart D, as called for in blocks 548 and 550.

Turning now to Chart F, the mainline program FTOUT is shown. This program normally outputs signals representative of information stored in the footage counter memory locations and it calls ALARM, I/O, SHUTCK, CKMC and DPIN subroutines, to be discussed below. The mainline program also checks the "record prep" delay, the "new command" flag, "pending command" flag, "Advance to BOD" flag and "remote display" flag. It may, on command, also display other data such as BOD or EOD footage, BOT or EOT set points (values), and User Commands at these various points. Sometimes, this program is used as a subroutine to provide a delay. This re-entrant program and its subroutines are interrupted as required by other functions.

Returning to Chart F, block 575 through 578 retrieve the contents of the memory locations for footage (that is, the quantity or amount of footage between the location at which the footage counter had been reset as arbitrarily determined by the operator and the location currently defined by accumulation of the CAP pulses). Specifically, this portion of the program retrieves the contents of the storage locations in which FOOTAGE is stored, using the subroutine DISP, and, via blocks 588–599, displays the footage digits in order of decreasing significance and blanking the first digit if it is a 0.

Beginning in block 600, the program checks to see whether the record prep delay is equal to zero. If it is not, it is decremented in 601 and the program jumps to the subroutine ALARM in 602. If the record prep delay is equal to zero, the program jumps directly to the subroutine ALARM to see whether an alarm is present. Next, the program checks to see whether a "new command" flag is set in 604. Assuming that it is not, the program preceeds to block 605 (Chart H) to determine whether the "command present" is set. If it is not, the program jumps to subroutine SCHTCK and checks to see whether the ENABLE SHUTTLE mode is operative. Following that, the program jumps to the subroutine CKMC in block 607 to check the tape deck conditions. Next, in block 608, the program jumps to subroutine DPIN for actuating the control indicators on the display panel according to the information in memory. In block 609, the program clears the last command from the control panel if there were one. In block 610 a check is made to see whether the "Advance to BOD" flag is set, if not, in block 611 the program checks to see whether a REMOTE flag is set. If one is not, the program branches to LOCALD, in Chart I. If the REMOTE flag set is set, the program jumps to block 613 in Chart I and reads and assembles the remote display command (thereby providing for remote control).

If, in block 612 the program had proceeded to block 514, it continues to read the local display command if any is present in block 615. Next, in blocks 616–624, the program checks to see whether any of the indicated displays, such as BOT, EOT, etc., have to be displayed. If so, an appropriate subroutine is called for that purpose. If not, in block 624, the program loops back to block 575 and repeats itself.

As an example, if in block 618 the program had determined that BOD should be displayed, the program branches in block 625 to block 577 in Chart F. Subsequently, via blocks 578–599, the system displays the data stored in the Beginning of Data footage locations in a manner similar to that described above, in which it displayed cummulative footage.

Block 626 in Chart J branches to block 579 in Chart F. Blocks 620–623 are single digit displays, (as in User Commands) and so they all branch via block 631 to subroutine OUT1, designated by block 635 in Chart F. This subroutine blanks all of the higher order digits except for the lowest order digit, retrieves the information stored in the memory for the lowest order digit and displays it.

In the case of a two-digit display (BOT, EOT), the program branches at block 634 to block 648 in Chart F, and in a similar manner, displays the memory contents associated with the two lowest digits.

After all of the displays mentioned above, the program resumes at block 604 to determine whether a "new command" flag has been set, as indicated above. If one has been set, the program branches to block 659 in Chart G.

Referring then to Chart G, in block 660, the program determines whether a "pending command" flag is set. If it is not, it sets the "pending command" flag in 667. If it had been set, it pulls the "pending command" flag address from the stack, and decides whether the "pull" flag is set. If it is not, the program proceeds to block 667 as described. If the "pull" flag is set, in block 663, the program pulls STOPI return address from the stack and resets the "pull" flag in 665. Following setting of the "command" flag, the program sets the reel revolution counters (it will be recalled the setting is 3), and jumps to CMD5 in block 669. If the "pull" flag is set, as determined in block 662, the program pulls STOP1 return address from the stack and resets the "pull" flag in block 665, preceding block 667 described above.

Returning to Chart H, if in block 610 it was determined that the "Advance to BOD" flag is set, the program jumps to the subroutine CKAA in the "Advance to BOD" program, as indicated in block 670.

Referring now to Chart K, the subroutine ALARM is shown. This subroutine is called by the mainline program FTOUT. It checks the status of the master and vacuum alarm lines (lines 6C3 and 6C8 in FIG. 11) and flashes an alarm indicator if needed.

Referring now to Chart L, in block 696 this subroutine checks to see if the "shuttle check" flag is set. If it is not, it returns to the mainline program. If the flag is set, a check is made to see whether the shuttle switch is on, and if it is, the program branches to the subroutine SHUT1, in block 700. If the shuttle switch is not on, the program clears the "shuttle check" flag in block 698 and returns to the mainline program.

Referring now to Chart M, there is shown a flow chart for the subroutine CKMC which checks the status of signals of the tape deck and changes codes in the indicator memory locations or changes control signals fed to the tape deck. This flow chart is self-explanatory.

Referring now to Chart N, subroutine DPIN controls the front panel displays except for the numeric indicator display 31. Turning now to Chart O, subroutine CONDX controls display for EOT, SEARCH, SHUTTLE, and TSEN.

Chart P is a flow chart for subroutine POLL which determines what the system does in the event of an interrupt. This subroutine determines the source of the interrupt (in block 762, 764, 766, 768 and 770 respectively), and depending upon the source branches to the appropriate subroutine as indicated.

Referring now to Chart Q, this subroutine is entered as a capstan interrupt. Capstan pulse interrupts (CAP, FIG. 11) occur at the rate of 100 pulses per foot of tape motion, resulting from the output of the division circuit from the capstan tachometer described above. The subroutine checks the direction of tape motion, then either increments or decrements the footage number stored in memory. In addition, it increments the EOT/BOT pulse counter until it reaches 255 pulses and once each foot of tape passes, it sets the "shuttle check" flag. The footage placed in memory is displayed by the mainline program FTOUT. RETURN block 809 sends the program back to the next instruction after the one completed before the interrupt was recognized. This returns control to the mainline program.

Referring now to Chart R, the flow chart for the subroutine SHUT1 is disclosed. In blocks 811–818, the information stored in the footage memory location is compared to the information stored in the EOT memory location. If they are not equal, there is a branch to SHUT in block 836, to be discussed later.

If these two quantities are equal, the program Sets the "User Command" flag at EOD in block 819, and, in blocks 820–827 decodes the User Command retrieved (called the "flag" in the flow chart) and after it is decoded, proceeds to LDSC, block 831. This portion of the program stores the command in the command address and generates and stores the "new command" flag. The program then jumps to the subroutine CLIN and resets the "shuttle check" flag in block 829, and then returns to the mainline program in block 830. Referring now to block 836, this portion of the subroutine acts in a manner similar to that just described in connection with checking for End of Data, to determine whether the tape is at Beginning of Data. If it is, then the User Command that is stored is decoded and action is taken as disclosed in blocks 842–853. If the program determines that the tape is neither at End of Data nor at Beginning of Data, it proceeds via block 841 to block 829 to reset the "shuttle check" flag and return to the main line program. It will be recalled that the program proceeded to the subroutine SHUT1 only if the "shuttle check" flag was set (block 696 in Chart L) and the shuttle switch was on, in block 697.

Referring now to Chart S, the subroutine EOT1 is entered each time the program goes through "footage out". In blocks 861–872, the program determines wheterh the tape is at the EOT position. If the tape is at EOT and the EOT switch is turned on (block 870), then the program proceeds to decode the User Command that is entered at EOT, this occurs in blocks 875–883, and appropriate action is taken depending upon the User Command that had been entered into memory by the operator.

If EOT was on, referring to Chart V, after the User Command is decoded, the program jumps to LDFC and stores the command and the command address, generates and stores a "new command" flag, and jumps to subroutine CLIN, and branches to CLRI11, block 886 in Chart T, thereby setting the capstan count to 0 in block 887, and returns to the mainline program.

Turning now to Chart U, if EOT were determined to be OFF, in block 870, the system (block 894) sends a command of 240 IPS to the tape deck if FAST were on (block 890) and, in block 895 loads the FORWARD command and branches to LDFC, described above. This portion of the program just described is useful in setting an upper limit of tape speed for the exit speed fo the trailing portion of the tape in emptying a reel. If FAST were not on as a command, the tape speed would not change from that set by the operator after EOT (or BOT) were sensed.

Referring now to Chart W, the subroutine BOT1 operates in a manner similar to the previously described subroutine EOT1 (Chart S), except that in this case, the takeup reel rather than the source reel is being emptied. It will be observed that if a User Command is detected, the subroutine brances to LDFC in Chart V as described in connection with Chart S.

Turning now to Chart X, the subroutine BOTOFF is similar to the subroutine EOTOFF described above in connection with Chart U, but again, it is used when the take-up reel, rather than the source reel is being emptied. Referring now to Chart Y, this portion of the program is entered at block 940 if a remote command has been entered and at block 946 if a command was entered at the Control Panel of the system. The flow chart discloses in detail how the particular command is decoded, and depending upon that decoding, branches to the appropriate subroutine.

Referring now to the particular branches to which the program proceeds depending upon which command is being executed, the commands are handled in three basic manners. The first type of command [which includes FTRST, block 956 (fottage reset), THDRDX, block 958 (thread ready), CONDR, block 960 (condition of alternate action switch register), SPEED, block 964 (a speed setting command), LTDW, blocks 968 and 933 (load data switches)], is executed immediately if possible. The subroutines for these various commands are shown in Charts BB, DD, CC, EE, and GG.

If the command detected is a second type of command, as indicated in block 954, the program branches to CMD3, block 974 in Chart Z. This subroutine then stores the command in the command address and sets the "new command" flag. During normal operation of the mainline program FTOUT it will be detected that the "new command" flag has been set and program control is then transferred to CMD5 which has already been described.

A third type of command (for instance, those listed in block 962 and block 971) causes the program to branch to the routine DIS. DIS in Chart AA, block 993 returns the program from the interrupt. The DIS function, however, is scanned in FTOUT, the mainline program, for display commands. The display will be switched to the proper program during each scan for as long as a switch is held closed. This display routine has been previously explained in connection with the FTOUT mainline program.

The LDTW routine as shown in Chart GG, block 1075 will now be described. This was entered as one of the Type 1 commands, previously described, to be immediately executed. This command is compared to the last control panel command. If the command is the same as the last one entered, it is ignored. The command numbers are compared to various fixed numbers in the program in blocks 1079 through 1083 and 1093 through 1096. If a match occurs in blocks 1079 through 1081 a pointer is set to the 10,000 foot digit. It may be the beginning of footage, it may be the Beginning of Data or the End of Data. If the comparison occurs in blocks 1082 or 1083, the pointer is set to the tens digit of either BOT or EOT. If comparison occurred in blocks 1093 through 1096 it is a single digit User Command. If it is a single digit User Command, a digit indicator is set to code 71 and then that number is stored in a selected memory location which corresponds to the units digits in the Data Entry Switch. Similarly if it is a five digit command, a 75 code is stored in that location, and if it is a two digit command code, 72 is stored in that location. The number that is stored in the memory location is a code that allows the CPU to select (address) the proper digit to be read from the Data Entry Switch. This is sent to the control panel via a subroutine display. It is then determined whether the command originated from the remote or local control panel. If it originated from the local control panel the selected digit of the local data entry switch (as shown in block 1108) is read. If the data originated from the remote control panel, the local control panel switch is ignored, the remote data entry switch (or equivalent) is read. The digit, for example the 10K digit read in, is stored in the location indicated by the pointer previously described. The pointer is the decremented and the digit indicator is also decremented.

The program then compares to see if whether the digit indicator is equal to 70. If it is not, the new digit indicator is stored in the data entry switch digit select location and the process is repeated until the digit indicator has been decremented to 70. It will be seen from the above that if the original digit indicator were a 75, five digits would have been read from the manual data entry switches. Similarly if it were a 71, only the units digit would have been read from the manual data entry switches. Then, according to block 1113, there is a jump to the subroutine DEX HEX which converts the decimal digit to a hexidecimal digit and then returns from the interrupt. If a Type three command (as previously described) had been entered, there is a jump to Chart HH, block 1175 labeled CMD4. In this case, the command number is multiplied by four and the new command is stored in a low order command address. A high order command address is generated and stored, and the "new command" flag is set as shown in blocks 1116 through 1119. Various flags are then reset, particularly A to B SPEED FLAGS as shown in block 1120. Next, there is a jump to subroutine CLIN, and after that, to block 1122 to send the indicated speed to the tape deck. The program then returns from the interrupt. The previous multiplication by four spaces commands properly in the jump table when Chart JJ CMD5 block 1124 is entered. The particular command number will cause a jump to occur to the appropriate routine such as STOP, RECORD FORWARD, RECORD REVERSE, etc.

Referring now to Chart KK, STOP block 1144 as with all of the following commands, the command indicator code is loaded and stored. Then, there is a jump to subroutine DISPLAY to display that code as shown in blocks 1145 and 1146. In this particular case, STOP, the status of tape deck is obtained, and there is a check to see whether READY and RECORD are the only commands. If they are not, there is a jump to subroutine STOP 1 to remove all other commands. Assuming READY and RECORD are the only commands present for the moment, the program goes to block 1150 to check that READY is on. If it is on, the READY command is loaded which would remove RECORD had it been on and send that to the tape deck. If it is not on, the thread command is loaded which also removes RECORD if it is set. The program then sends that signal to the tape deck, clears the "pending command" flag, and then jumps to the mainline program FTOUT.

Referring now to Chart LL, block 1160, labeled STOP 1, the stop is entered from the mainline program FTOUT if the "new command" flag is set and the STOP ADDRESS is maintained in the COMMAND ADDRESS. STOP 1 is entered as a subroutine from STOP, FORWARD, FAST FORWARD, REVERSE, FAST REVERSE, RECORD FORWARD and RECORD REVERSE, if required. The only time it would be required to enter STOP 1 is if the new command is going to change the direction of tape travel. It is not required if the new command merely changes speed or other functions.

Returning to Chart LL, block 1160 STOP 1, the program first gets the command signals that are going to the tape deck, sets the "pull" flag and then gets the tape deck status in blocks 61-63. It then checks to see if the tape is in motion in block 1164. If tape is not in motion, it branches to stop 9 and 8 by block 1165. This jumps us to block 1200. In block 1201 the status of the tape deck is again obtained, and a check is made to see that all signals are off except TAPE TENSION. If all signals are not off, the program goes to block 1188 where it obtains the signals from the tape deck again. It drops OPERATE and REVERSE it they are on, and sends the remaining signals back to the tape deck and then again checks to see that all of the signals except TAPE TENSION are off coming from the tape deck.

The program remains in this loop until all status signals from the tape deck are off with the exception of TAPE TENSION. When this is achieved, it goes to block 1203 where it loads the tape motion and reverse drop delay. It then, in block 1204, jumps to subroutine DPIN and uses it as a delay and then jumps to subroutine FTOUT, uses it as a delay, and then decrements a delay counter. If the delay counter is not equal to zero, the program stays in this delay routine jumping to subroutine DPIN and FTOUT until the delay counter has reached zero. When it reaches zero, the program goes to block 1208 and resets the "pull" and "speed change lockout" flags, and then loads the indicated speed and sends it to the tape deck.

The program then returns from this subroutine to the program that called it. Referring back to block 1164, if tape is in motion, the program then drops FAST, RECORD, TSEN, and DRFS signals. In block 1167 it adds the DRCS signal and sends the signals to the tape deck in block 1168. Also, it sets the "speed change lockout" flag in block 1169, and then in 1170, changes the tape deck speed to 15/32 inches per second. The speed indicator 31 on the front panel of the recorder does not change, but remains at the previously set speed. The program is now going to decelerate the tape to a speed of 15/32 inches per second, and when it has achieved phase lock at 15/32 ips as determined by block 1175. If phase lock is on, the program will get command signals going to the tape deck and then drop the DRCS signal which disengages the drive rollers from the capstan. In block 1183, it then sets a delay counter to allow sufficient time for this disengagement to occur. It jumps to subroutine DPIN and FTOUT and uses those as delays and decrements the delay counter. In block 1187, a check is made to see whether the delay counter has now been counted down to zero. If it has not been counted down to zero, the program returns to block 1184 and repeats the process in blocks 1184 through 1187 until the counter is zero, at which time the program proceeds to block 1188, gets the signals that are being sent to the tape deck, drops OPERATE and REVERSE if they are on (to cause the capstan to come to a stop) and sends these signals to the tape deck.

The program gets the status of the tape deck and checks to see if all signals are off except TAPE TENSION. The program at this time is in the same routine as was previously described concerning the "STOP 9 plus 8" routine, and the program proceeds from this point as it did previously.

Turning now to Chart MM, block 1120, ROUTINE FORWARD, as with the previous command, the program loads and stores the FORWARD indicator code and then displays it by jumping to subroutine DISPLAY. Upon return, it gets the status of the tape deck and checks to see if REVERSE is on in block 1224. If the REVERSE relay is energized, it branches to subroutine STOP 1 which has already been discussed, and upon return from that, it jumps to subroutine FSTRT, which will be explained shortly. If REVERSE is not on, it immediately goes to block 1227 to check whether the TAPE SYNC ENABLE is on. If TAPE SYNC ENABLE is on, it loads FORWARD TENSION tape and TAPE SYNC ENABLE signals and the branches to SEND M. If it is not on, the program loads FORWARD and TENSION TAPE signals and branches to SEND M, to be explained presently.

Turning now to Chart NN, block 1231, REVERSE, the program again loads and stores the indicator code, jumps to subroutine DISPLAY, gets tape deck status and checks to see if REVERSE is on. In this case, if REVERSE is not on, it branches to subroutine STOP 1 and then jump to subroutine RSTART which will be explained shortly. If REVERSE is on, it checks to see if TAPE SYNC ENABLE is on. If it is on, the program loads REVERSE, TENSION TAPE and TSEN signals. If not on, we load REVERSE and TENSION TAPE signals only and then in both cases branch to SEND M.

Turning now to Chart OO, block 1242, FAST REVERSE, this command is handled similarly to the two just described except that the program eventually gets to block 1249 where it checks to see whether SEARCH is on. If SEARCH is not on, the program loads the FAST REVERSE signal only and branches to SEND M. If SEARCH is on, it changes the tape deck speed to 240 inches per second loads FAST REVERSE and SEARCH signals and then branches to SEND M.

Chart PP is a flow chart for FAST FORWARD. In block 1255, the program proceeds in the same manner as in the immediately preceding one, except that if REVERSE is on, the program takes the path that it took for REVERSE OFF in the previous one.

Chart QQ, starting at block 1270, illustrates the command RECORD. In this case, the program proceeds as previously except it checks to see if the tape is tensioned. If the tape is tensioned, it loads the RECORD and TENSION TAPE signals and then jumps to SEND M, while if it is not, it loads the RECORD signal only and jumps to SEND M.

Chart RR, starting at block 1278 illustrates the command RECORD FORWARD. In this case, the program proceeds in the same manner as in FORWARD except it loads and displays the RECORD indicator and then jumps to SEND M. In addition, it stores the RECORD indicator code.

Chart SS, block 1289 begins RECORD REVERSE. In this case, the program proceeds in the same manner as in the immediately previous case, except that now the Tape is moving in the reverse direction and the program jumps to SEND M.

Chart VV, beginning at block 1370 illustrates SEND M. First the program sends the signal to the tape deck, gets the status of the tape deck, checks to see whether MOTION is on or RECORD is on. If neither are on, it jumps to subroutine FTOUT, then again gets the status of the tape deck and keeps repeating this loop. When finally MOTION comes on in block 1273 or RECORD comes on in block 1274, the program clears the "pending command" flag and then jumps to mainline routine FTOUT in block 1377. With this, a command has now been completely executed.

Chart UU, beginning at block 1347 illustrates the subroutine FSTART. The program generates the FORWARD NO ROLLER command signal. In block 1350 which commences subroutine RSTART, the program generates a REVERSE NO ROLLER signal. In both cases, the program goes to block 1352 and sends speed command signals of 15/32 inches per second to the tape deck. The program then delays and checks to determine whether phase lock comes on, at which time it retrieves the signal that had been sent to the tape deck, combines it with a DRUM DRIVE (DRFS or DRCS) signal, and sends them to the tape deck in block 1358. The program then checks to see whether the ADVANCE TO BEGINNING OR DATA speed is set. If not, it sends the indicated speed to the tape deck, clears the "speed change" flag and returns to the program that called this subroutine. If the ADVANCE TO BEGINNING OF DATA speed is set, the program sends the operator-set speed for Advance to BOD to the tape deck and then returns.

Chart TT, commencing at block 1305, illustrates A TO B (ADVANCE TO BEGINNING OF DATA). In block 1306, it loads and stores the ADVANCE TO BEGINNING OF DATA code and flag, jumps to subroutine DISPLAY and then sets the pointer to ten thousands digit for FOOTAGE. In blocks 1310 through 1316, the program compares all of the footage digits against the corresponding digits for BEGINNING OF DATA, and if a comparison does not occur, it stores the condition code register temporarily, and checks to see if the "A TO B NEAR" flag is set. If it is set, the program checks to see if the "A TO B SPEED CHANGE" flag is set. If this flag is set, it jumps to FTOUT. It will be recalled that in FTOUT, the program jumped to CKAA from time to time. This is to reenter A TO B at this point and see whether the footage digits on BEGINNING OR DATA are equal to the actual footage digits. If the "A TO BE NEAR" flag (blocks 1318, 1319) is not set, the program sends 240 IPS speed command to the tape deck and stores that speed in memory. The program then gets the condition code register and checks to see if the footage digit is less than the BEGINNING OF DATA digit in block 1325. If it is less than the BEGINNING OR DATA digit, the program generates a FAST FORWARD command. If not, it generates a FAST REVERSE command. In either case, it generates and stores the STOP INDICATOR OFF code, and generates and stores the low order command address and high order command address, sets the "command" flag, clears the "pending command" flag, and jump to FTOUT where this command will be handled as any other command in block 1332.

If the "A TO B SPEED CHANGE" flag was not set in block 1320, the program goes to block 1333, gets the "A TO B SPEED CHANGE" flag, decrements the A TO B speed, gets the contents of the condition code register which was previously stored, and then checks to see if the footage digit is less than the corresponding BOD digit. In this case, in block 1336, if the footage digit is less than the BOD digit, the program generates a FORWARD command. If the footage digit is not less than the BOD digit, the program generates a REVERSE command; and in both cases, it proceeds to block 1328 to generate a STOP INDICATOR OFF code and then to block 1328 to generate command addresses as immediately previously pointed out.

Returning to block 1316, if the footage pointer were not equal to zero, the program loops to block 1310 to obtain the lower order digits of FOOTAGE and BEGINNING OF DATA and compares them. If it is equal to zero, the program to block 1317, sets the "ADVANCE TO BEGINNING OF DATA NEAR" flag as labeled set A TO B NEAR flag, then checks to see whether the tape is in motion. If tape is in motion, the program generates and stores an OFF code for FORWARD REVERSE, FAST FORWARD and FAST REVERSE indicators, clears the "A TO B SPEED CHANGE" flag and loads the STOP command in block 1346. It then goes to block 1328 and generates and stores the command address, as previously described.

Returning to block 1339, the program checks to see whether the tape is in motion as it previously did. If it were not in motion, the program clears a group of flags-namely, "A TO B", "A TO B NEAR", "A TO B SPEED CHANGE", and "A TO B SPEED" flags. The program also clears the "pending command" flag, loads and stores the ADVANCE TO BEGINNING TO DATA OFF code, and jumps to the mainline program FTOUT since command has been completed.

I claim:

1. In combination with tape recorder means including first and second reels, transducer means and transport means for transporting tape from one of said reels in predetermined relation with said transducer means onto the other of said reels, control apparatus comprising: signal entry means selectively operable for generating function signals representative of functions desired to be performed by said recorder means when a location parameter of said tape attains a predetermined value; sensing means associated with said recorder means for sensing said parameter and for generating value signals representative of the value of said parameter; data processor circuit means responsive to said function signals and said value signals for generating command signals when said value signals indicate said parameter has attained said predetermined value; and control means for effecting said desired function in said recorder means in response to said command signals.

2. The apparatus of claim 1 wherein said signal entry means comprises function switch means selectively operable to a command at footage position for generating signals for identifying at least one command at footage location on said tape, and data entry means for selectively generating command signals representing a command function desired to be performed at said command at footage location; said data precessor circuit means being responsive to said signals identifying said command at footage location for transmitting a command signal to said control means of said tape transport to execute said command when said tape reaches the footage location associated with said command at footage location.

3. The apparatus of claim 2 wherein said function switch means is further selectively operable to a footage position for generating signals for identifying said footage location; said data entry means being operative when said function switch means is actuated to identify said footage location for generating signals representative of a desired footage location; said data processor circuit means being responsive to said desired footage location signals for storing the same and for comparing said stored signals with signals representative of the actual tape footage, whereby said footage locations and said command signal at an associated command at footage location may be changed under operator control.

4. The apparatus of claim 3 further comprising visual display means; and display switch means; said data processor circuit means transmitting signals to said display means for displaying actual tape footage when said display switch means is not actuated and transmitting signals to said display means for displaying respectively said preset footage location and said command signals when said display switch means is actuated and said function switch means is at said footage position and said command at footage position.

5. The apparatus of claim 4 wherein function switch means comprises a multiposition switch including command at footage positions for User Command at Beginning of Data and User Command at End of Data, said system further comprising LOAD switch means actuatable by an operator when said function switch is at a command at footage position and said data entry switches indicate a desired command code for loading said command code into said data processor circuit means, said data processor circuit means storing the command code and transmitting an associated command signal to said control means when said sensing means indicates an associated one of said Beginning of Data and End of Data footage locations.

6. The apparatus of claim 5 wherein said function switch means further includes positions representative of Beginning of Data and End of Data footage locations, said data processor means being responsive to said footage location positions on said function switch means, and the actuation of said LOAD switch means for storing the contents of said data entry switches at the selected footage location, whereby the footage at said Beginning of Data and End of Data locations is changeable under operator control.

7. The apparatus of claim 3 wherein said footage locations include a Beginning of Data and an End of Data location; said system further including record electronic circuit means adapted when energized by a RECORD signal to be operatively associated with said transducer means for recording the signal on said tape; said transport means further comprising tape drive means for operating said tape in a forward direction in response to a FORWARD signal and a reverse direction in response to a REVERSE signal; means for operating said tape drive means at a predetermined fast speed in response to a FAST signal; said system further comprising ENABLE FIRST MODE switch means; said data processor circuit means being responsive to the actuation of said ENABLE FIRST MODE switch means for transmitting command code signals to said transport means when said tape reaches the End of Data location representative of the user-entered command at said End of Data location, said commands including a FAST REVERSE command comprising said FAST signal and said REVERSE signal.

8. The apparatus of claim 7 wherein said user-entered command codes at said end of data location further comprise a STOP command comprising said STOP signal for stopping the motion of said tape drive means; a reverse command comprising said REVERSE signal for driving said tape drive means in a reverse direction; and a REVERSE RECORD command comprising said REVERSE signal and said RECORD signal for driving said tape drive means in the reverse direction and for actuating said record circuit means.

9. The apparatus of claim 7 wherein said data processor circuit means is further responsive to said tape's being in the Beginning of Data location for executing the user-entered command at said Beginning of Data location, said user commands at Beginning of Data including a FORWARD mode comprising said FORWARD signal.

10. The apparatus of claim 9 wherein said user commands at Beginning of Data further comprise a FAST FORWARD mode comprising said FAST signal and said FORWARD signal; a STOP mode comprising said STOP signal; and a FORWARD RECORD mode comprising said FORWARD signal and said RECORD signal.

11. The apparatus of claim 7 further comprising an ENABLE SECOND MODE switch, said data processor circuit means being responsive to the actuation of said ENABLE SECOND MODE switch means for executing the user command at said user command End of Tape and said user command Beginning of Tape values, said user commands at said End of Tape location including a STOP mode comprising said STOP signal.

12. The apparatus of claim 11 wherein said user commands at said End of Tape position further comprise a FAST REVERSE mode comprising said FAST and said REVERSE signals; a REVERSE mode comprising said REVERSE signal; and a REVERSE RECORD mode comprising said REVERSE and said RECORD signals.

13. The apparatus of claim 11 wherein said ser commands at said Beginning of Tape value comprise a STOP mode comprising said STOP signal for stopping said tape drive means.

14. The apparatus of claim 13 wherein said user commands at said Beginning of Tape value further include a FAST FORWARD mode comprising said FAST and said FORWARD signals; a FORWARD mode comprising said FORWARD signal; and a FORWARD RECORD mode comprising said FORWARD and sadi RECORD signals.

15. The apparatus of claim 7 wherein said data processor circuit means is responsive to said ENABLE FIRST MODE switch's not being actuated for reducing the speed of said tape to a predetermined value if the operating speed of said tape is greater than said predetermined value when said End of Tape value is reached.

16. The apparatus of claim 1 or 2 wherein said signal entry means further comprises function switch means selectively operable to a command at parameter position wherein said parameter is other than footage for generating signals for identifying at least one command at parameter position on said tape, and data entry means for selectively generating command signals representing a command function desired to be performed at said command at parameter location; said data processor circuit means being responsive to said signals identifying said command at parameter location for transmitting a command signal to said control means of said tape transport to execute said command when said sensing means indicates that said parameter has reached the value associated with said command at function value.

17. The apparatus of claim 16 wherein said function switch means is further selectively operable to a parameter position other than footage for generating signals for identifying the value of said parameter; said data entry means being operative when said function switch means is actuated to identify said parameter value for generating signals representative of a desired parameter value; said data processor circuit means being responsive to said desired parameter value signals for storing the same and for comparing said stored signals with signals representative of the actual value of said parameter, whereby said parameter values and said command signal at an associated command at parameter value may be changed under operator control.

18. The apparatus of claim 17 further comprising visual display means and display switch means; said data processor circuit means transmitting signals to said display means when said display switch means is actuated for displaying respectively said preset parameter value and said command signals when said function switch means is at said parameter position and said command at parameter position.

19. The apparatus of claim 18 wherein said parameter comprises Beginning of Tape, said function switch means further comprising an End of Tape position and a command at End of Tape position, said sending means including first tachometer means responsive to capstan rotation for generating a first signal representative of tape footage displacement; second tachometer means responsive to angular displacement of a motor driving said first reel for generating a signal representative thereof; and third transducer means responsive to the angular displacement of a motor driving said second reel for generating a signal representative thereof, said Beginning of Tape and End of Tape parameters being defined by a comparison of the signals of said first tachometer means and one of said second and third tachometer means associated with the reel being emptied.

20. The apparatus of claim 16 wherein said function switch means includes command at footage positions representative of command at Beginning of Data and command at End of Data locations, said apparatus further including LOAD switch means, said data processor circuit means being responsive to the actuation of said LOAD switch means for storing a command signal entered in said data entry means representative of a command to be executed at the respective command at footage location selected.

21. The apparatus of claim 20 wherein said function switch means includes positions for command at End of Tape and command at Beginning of Tape, said data processor means being responsive to said LOAD switch means for storing signals representative of the contents of said data entry switch means to identify the respective commands entered.

22. The apparatus of claim 21 wherein said recorder means includes a capstan for moving tape, a motor for driving said capstan including first sensor means for generating output signals representative of angular displacement of said capstan motor; first and second reel motors for driving said first and second reels respectively; second and third sensor means for generating signals representative of the angular displacement of the said first and second reel motors respectively, said data processor circuit means being responsive to said output signals of said first, second and third sensor means for generating signals representative of the ratio of the output signals of said first sensor means to the output signals of one of said second and third sensor means associated with the reel being emptied, said ratio defining an End of Tape location for said first reel and a Beginning of Tape location for the said second reel.

23. The apparatus of claim 16 wherein said function switch means includes a FOOTAGE position; said system further comprising load switch means; said data processor means being responsive to said function switch means in the FOOTAGE position and to the actuation of said load switch means for entering the contents of said data entry means into a storage location representative of tape footage.

24. The apparatus of claim 23 further comprising visual display means; and display switch means; said data processor circuit means transmitting signals to said display means for displaying tape footage when said display switch means is not actuated, and transmitting signals to said display means for displaying a preset footage location when said display switch means is actuated and said function switch means is at one of said footage location positions.

25. The apparatus of claim 24 further comprising actuatable reset switch means; said data processor circuit means being responsive to the actuation of said reset switch means for resetting to zero the contents of the storage location containing signals representative of footage.

26. The apparatus of claim 1 further comprising speed selection switch means for selecting one of a plurality of speeds for said tape by said tape transport means and for generating speed select signals representative of a selected speed; said system further comprising an oscillator; division circuit means receiving the output of said oscillator; tape drive servomechanism means receiving the output of said divider circuit means as a signal input and said tape speed signal as a reference input for driving said tape; and decoder circuit means receiving the speed select signals from said data processor circuit means for decoding the same, the output of said decoder circuit means being coupled to said divider circuit means to define the value by which the repetition rate at which said oscillator circuit means is divided to thereby define the operating speed of said tape drive means.

27. The apparatus of claim 26 further comprising a switch interposed between said oscillator circuit means and said divider circuit means and responsive to an OPRT signal from said data processor circuit means for coupling the output of said oscillator to said divider circuit means, said data processor circuit means generating said OPRT signal in response to a signal from said transport means indicating that the tape is properly tensioned.

28. The apparatus of claim 1 wherein said first and second reels comprise source and take up reels respectively, each having reel servo drive means, and said control means further comprises first and second vacuum systems for tensioning said tape on either side of said transducer; a READY pushbutton for generating a ready signal to said data processor circuit means; said data processor circuit means transmitting a TENSION command to said transport in response to said ready signal for driving said take up reel motor in an open loop configuration; enable circuit means responsive to said TENSION signal and to an output signal of said sensing means representative of motion of the supply reel for actuating said reel servo drive means and for actuating said first and second vacuum systems, said system further comprising logic circuit means responsive to the position of tape loops in said vacuum systems in a normal range for generating a TAPE TENSIONED signal and transmitting the same to said data processor circuit means with said capstan in an idle position, said data processor circuit means being responsive to said TAPE tensioned signal for transmitting speed select signals and an OPRT signal to couple the said speed select signals to said capstan drive means, said data processor circuit means further generating programmed speed select signals representative of a predetermined slow speed and communicating the same to said capstan drive means, whereby said capstan is driven at a programmed speed; said capstan drive means generating a PHASE LOCK signal and transmitting the same to said data processor circuit means when said capstan reaches said programmed speed, said data processor circuit means being responsive to said PHASE LOCK signal for generating a signal for placing the tape in one of said read and transport positions, and thereafter transmitting speed select signals to said capstan drive means for driving said tape at the speed set by the operator.

29. In combination with tape recorder means including supply and take up reels, read/record transducer means and transport means for transporting tape from one of said reels past said transducer means and onto the other of said reels, control apparatus comprising: data entry means selectively operable for generating first signals; function generator means for generating second signals which define whether said first signals are data signals or user command signals and which are associated with at least first and second footage locations on said tape; sensing means associated with said transport means for generating footage signals representative of the length of tape passing through said transport means; data processor circuit means responsive to said first and second signals for storing data signals representative of predetermined footages of tape entered via said data entry means for said first and second footage locations, and for storing command signals representative of predetermined functions to be performed by said tape recorder means at said first and second footage locations respectively, and for transmitting said command signals to said transport means to implement the associated function when said footage signals indicate said tape footage location has attained a predetermined value; and control means for effecting said desired function in said recorder means in response to said command signals from said data processor circuit means.

30. The apparatus of claim 29 wherein said function switch means further comprises a FOOTAGE position, said data processor circuit means being responsive to said function switch means being in said FOOTAGE position for storing the contents of said data entry switch means as a representative of cumulative footage of said tape for the position of said tape when said footage representation is entered, said data processor circuit means thereafter being responsive to said footage signals of said sensing means for maintaining a cumulative record of footage for said tape, and for comparing said cumulative footage record with said first and second preset footage locations.

31. The apparatus of claim 30 wherein said first and second preset footage location signals represent respectively a Beginning of Data footage location and an End of Data footage location on said tape.

32. The apparatus of claim 31 wherein said command signals comprise an OPRT signal having a first and a second state representative of operate and stop respectively, a REVR signal having a first state representative of forward tape motion and a second state representative of reverse tape motion, and a FAST signal having a first state representative of a predetermined slew rate of tape motion; said transport means comprising tape drive means responsive to said OPRT signal for driving said tape; first switching means responsive to said REVR signal for applying power of predetermined polarity to said tape drive means; and second switching means responsive to said first state of said FAST signal for coupling a preset signal to energize said drive means at a slew rate, said user commands at Beginning of Data and End of Data locations comprising at least one of said OPRT, REVR and FAST signals.

33. The apparatus of claim 32 wherein said system further comprises speed select switch means for generating speed select signals representative of a desired operating speed for said transport; said data processor circuit means being responsive to said speed select signals for storing the same and for generating command speed signals and transmitting the same to said tape transport; said tape transport including circuit means responsive to said speed command signals for operating said tape drive means at a speed represented by said speed command signals.

34. The apparatus of claim 33 wherein said transport means includes a capstan and first and second drums adjacent said transducer means; and means for moving said first and second drums in response to a third signal to a read position in which said drums are in driving engagement with said capstan and a tape span supported between said drums is in operative relation with said transducer, said drum moving means being further responsive to a fourth signal for moving said drums to a transport position in which said drums are in driving engagement with said capstan and said tape span does not engage said transducer, said drums being in an idle position in the absence of said third and fourth signals in which said drums are disengaged from said capstan; said data processor circuit means being responsive to speed select signals from said speed select switch means for storing the same and for transmitting a predetermined programmed speed signal to said transport to operate said capstan upon start up at a predetermined program speed while said drums are in said idle position, said data processor circuit means thence transmitting one of said third and fourth signals to engage said drums with said capstan in a selected position, said data processor means thence transmitting speed command signals representative of a speed selected by the operator to accelerate said capstan to a desired speed.

35. The apparatus of claim 34 wherein said data processor circuit means initiates a predetermined delay between the time one of said third and fourth signals is transmitted to said tape transport and said operator-set speed command signals are transmitted to said capstan servo drive mechanism.

36. In combination with tape recorder means including first and second reels, transducer means and transport means for transporting tape from one of said reels in predetermined relation with said transducer means and onto the other of said reels in either a forward or a reverse direction, control apparatus comprising: selectively operable data entry means for generating first signals; function generator means for generating second signals which define whether said first signals are data signals or user command signals and which are associated with a Beginning of Tape condition or an End of Tape condition; sensing means associated with said reels for sensing said condition of tape and for generating value signals representative of the value of said condition; data processor circuit means responsive to said first and second signals for storing data signals representative of predetermined values of said conditions for Beginning of Tape and End of Tape respectively, entered via said data entry means for said respective conditions, and for storing command signals entered via said data entry means and representative of predetermined functions to be performed by said tape recorder means when said conditions are met respectively, said data processor circuit means transmitting said command signals to said tape transport means to implement the associated function when said condition signals indicate said condition has attained said predetermined value; and control means for effecting said desired function in said recorder means in response to said command signals from said data processor circuit means.

37. The apparatus of claim 36 wherein said first and second reels are supply and take up reels respectively, and said sensing means comprises a first sensing means for generating signals representative of angular displacement of said capstan, second sensing means for generating signals representative of the angular displacement of said supply reel, and third sensing means for generating signals representative of the angular displacement of said take up reel; said data processor means receiving said signals from said first, second and third sensing means for storing a first cumulative signal when said transport is operating in a FORWARD mode representative of a ratio of the signals from said first and second sensing means, and for storing a second cumulative signal when said transport is operating in a REVERSE mode representative of a ratio of signals from said first and third sensing means, said cumulative signals being representative of the tape pack diameter remaining in the reel being emptied, and being independent of capstan speed.

38. The apparatus of claim 36 wherein said system further comprises speed select switch means for generating speed select signals representative of a desired operating speed for said transport; said data processor circuit means being responsive to said speed select signals for storing the same and for generating command speed signals and transmitting the same to said tape transport; said tape transport including circuit means responsive to said speed command signals for operating said tape drive means at a speed represented by said speed command signals.

39. The apparatus of claim 36 further comprising ENABLE EOT means actuatable by an operator; said data processor circuit means being responsive to the actuation of said ENABLE EOT means for transmitting said command signals to said tape transport means when said conditions for Beginning of Tape and End of Tape are sensed; said data processor circuit means transmitting predetermined speed command signals for controlling the speed of said transport means when said ENABLE EOT means is not actuated for controlling the exit speed of the tail end of said tape after said End of Tape condition is determined.

* * * * *

UNITED STATES PATENT AND TRADEMARK OFFICE
CERTIFICATE OF CORRECTION

PATENT NO. : 4,214,284

DATED : July 22, 1980

INVENTOR(S) : Thomas J. Mussatt

It is certified that error appears in the above-identified patent and that said Letters Patent are hereby corrected as shown below:

In the Abstract, line 13, "parameter" should read -- parameters --.

In the Specification:

Column 4, line 39 "slight" should read -- sight --.

Columns 5 and 6, Charts Table, delete "CMD3II" in Chart I line.

Columns 5 and 6, Charts Table, insert -- SPEED -- in Chart CC line.

Column 7, line 29, "elemnt" should read -- element --.

Column 9, line 29, "line" should read -- lines --.

Column 9, line 49 "366" should read -- 306 --.

Column 10, line 38, "2 1/2" should read -- 2 1/2° --.

Column 11, line 1, "tube" should read -- tape --.

Column 13, line 12, "364" should read -- 364B --.

Column 13, line 62, "the" should read -- that --.

Column 16, line 8, "Divider" should read -- Divide --.

Column 16, line 18, "bu" should read -- by --.

UNITED STATES PATENT AND TRADEMARK OFFICE
CERTIFICATE OF CORRECTION

PATENT NO. : 4,214,284

DATED : July 22, 1980

INVENTOR(S) : Thomas J. Mussatt

It is certified that error appears in the above-identified patent and that said Letters Patent are hereby corrected as shown below:

Column 16, line 68, "436-436F" should read -- 436A-436F --.

Column 17, line 21, "483A" should read -- 438A --.

Column 17, line 57, "decoder" should read -- encoder --.

Column 19, line 42, "the" should read -- The --.

Column 24, line 17, "then" should read -- than --.

Column 24, line 57, "phase" should read -- signal --.

Column 25, line 47, "356A" should read -- 356D --.

Column 26, line 64, "11" should read -- 411 --.

Column 28, line 15, "356" should read -- 356C --.

Column 28, line 53, "CUP" should read -- CPU --.

Column 30, line 2, "621" should read -- 521 --.

Column 30, line 55, "preceeds" should read -- proceeds --.

Column 30, line 55, "(Chart H)" should read -- (Chart G) --.

Column 30, line 65, "were" should read -- was --.

Column 31, line 1, "I" should read -- J --.

UNITED STATES PATENT AND TRADEMARK OFFICE
CERTIFICATE OF CORRECTION

PATENT NO. : 4,214,284
DATED : July 22, 1980
INVENTOR(S) : Thomas J. Mussatt

It is certified that error appears in the above-identified patent and that said Letters Patent are hereby corrected as shown below:

Column 31, line 2, delete "set" in the first instance.

Column 31, line 3, "I" should read — J —.

Column 31, line 6, "514" should read — 614 —.

Column 31, line 23, "F"' should read — G —.

Column 31, line 36, "G" should read — H —.

Column 31, line 37, "G" should read — H —.

Column 31, line 52, "H" should read — G —.

Column 32, line 37, "SHUT" should read — SHUT2 —.

Column 32, line 38, "Sets" should read — sets —.

Column 32, line 63, "wheterh" should read — whether —.

Column 33, line 7, "CLRI11" should read — CRL511 —.

Column 33, line 12, "240" should read — 120 —.

Column 33, line 16, "fo" should read — of —.

Column 33, line 46, "LTDW" should read — LDTW —.

Column 33, line 47, "933" should read — 973 —.

UNITED STATES PATENT AND TRADEMARK OFFICE
CERTIFICATE OF CORRECTION

PATENT NO. : 4,214,284

DATED : July 22, 1980

INVENTOR(S) : Thomas J. Mussatt

It is certified that error appears in the above-identified patent and that said Letters Patent are hereby corrected as shown below:

Column 33, line 49, "CC, EE," should read -- EE, CC, --.

Column 34, line 35, "the" in the first instance should read -- then --.

Column 34, line 37, delete "whether".

Column 34, line 47, "DEX HEX" should read -- DECHEX --.

Column 34, line 51, "1175" should read -- 1115 --.

Column 35, line 31, "61-63" should read -- 1161-1163 --.

Column 35, line 39, "it" should read -- if --.

Column 36, line 24, "1120" should read -- 1220 --.

Column 36, line 37, "the" should read -- then --.

Column 36, line 46, "jump" should read -- jumps --.

Column 36, line 50, "we load" should read -- it loads --.

Column 36, line 51, "branch" should read -- branches --.

Column 36, line 57, delete "not".

Column 36, line 59, insert -- not -- between "is" and "on".

Column 37, line 23, "1273" should read -- 1373 --.

UNITED STATES PATENT AND TRADEMARK OFFICE
CERTIFICATE OF CORRECTION

PATENT NO. : 4,214,284
DATED : July 22, 1980
INVENTOR(S) : Thomas J. Mussatt

It is certified that error appears in the above-identified patent and that said Letters Patent are hereby corrected as shown below:

Column 37, line 24, "1274" should read -- 1374 --.

Column 37, line 41, "OR" should read -- OF --.

Column 37, line 64, "OR" should read -- OF --.

Column 38, line 39, "1328" should read -- 1328A --.

Column 38, line 48, "TO" should read -- OF --.

In the Claims:

Claim 2, column 39, line 8, "precessor" should read -- processor --.

Claim 13, column 40, line 54, "ser" should read -- user --.

Claim 14, column 40, line 63, "sadi" should read -- said --.

Claim 28, column 43, line 24, "tensioned" should read -- TENSIONED --.

Claim 38, column 46, line 24, "rape" should read -- tape --.

UNITED STATES PATENT AND TRADEMARK OFFICE
CERTIFICATE OF CORRECTION

PATENT NO. : 4,214,284  
DATED : July 22, 1980  
INVENTOR(S) : Thomas J. Mussatt Page 6 of 6

It is certified that error appears in the above-identified patent and that said Letters Patent are hereby corrected as shown below:

In the Drawings:

Fig. 11, circuit 411 should be labeled -- 200 -- rather than "-200".

Fig. 11, photodetectors "448" should be labeled -- 148 --.

Fig. 11, light sources "441" should be labeled -- 141 --.

Chart J, block 629, "ocation" should read -- location --.

Signed and Sealed this

Tenth Day of August 1982

[SEAL]

Attest:

GERALD J. MOSSINGHOFF

Attesting Officer  
Commissioner of Patents and Trademarks